United States Patent
Tashima et al.

(10) Patent No.: US 11,651,714 B2
(45) Date of Patent: May 16, 2023

(54) DISPLAY LIGHT EMISSION DEVICE, HEAD-UP DISPLAY DEVICE, IMAGE DISPLAY SYSTEM, AND HELMET

(71) Applicants: NS WEST Inc., Hiroshima (JP); SHOEI CO., LTD., Tokyo (JP)

(72) Inventors: Motoki Tashima, Shobara (JP); Naoya Matsuoka, Shobara (JP); Yuusuke Matsumoto, Shobara (JP); Manabu Yamada, Shobara (JP); Yoshimasa Tanaka, Shobara (JP); Masanori Hiramatsu, Shobara (JP); Hirotaka Asaoka, Shobara (JP); Kou Satou, Shobara (JP); Kousuke Aoi, Shobara (JP)

(73) Assignees: NS WEST Inc., Hiroshima (JP); SHOEI CO., LTD., Tokyo (JP)

( * ) Notice: Subject to any disclaimer, the term of this patent is extended or adjusted under 35 U.S.C. 154(b) by 15 days.

(21) Appl. No.: 17/352,175

(22) Filed: Jun. 18, 2021

(65) Prior Publication Data

US 2021/0312842 A1 Oct. 7, 2021

Related U.S. Application Data

(63) Continuation of application No. PCT/JP2019/049573, filed on Dec. 18, 2019.

(30) Foreign Application Priority Data

Dec. 20, 2018 (JP) .............................. JP2018-238198
Dec. 20, 2018 (JP) .............................. JP2018-238203
(Continued)

(51) Int. Cl.
*G09G 3/00* (2006.01)
*G01C 21/36* (2006.01)
*G06T 3/60* (2006.01)

(52) U.S. Cl.
CPC ......... *G09G 3/001* (2013.01); *G01C 21/3697* (2013.01); *G06T 3/60* (2013.01); *G09G 2320/0247* (2013.01)

(58) Field of Classification Search
CPC ........... G09G 3/001; G09G 2320/0247; G01C 21/3697; G06T 3/60
See application file for complete search history.

(56) References Cited

U.S. PATENT DOCUMENTS 9,445,639 B1 * 9/2016 Aloumanis .......... G02B 27/017
2012/0242701 A1 * 9/2012 Ingrassia, Jr. ............ G09G 5/00
345/649

(Continued)

FOREIGN PATENT DOCUMENTS

CN 103946732 A * 7/2014 ......... G02B 27/0093
CN 105278670 A * 1/2016 ......... G01C 21/3602
(Continued)

OTHER PUBLICATIONS

International Search Report issued in PCT/JP2019/049573; dated Mar. 10, 2020.

*Primary Examiner* — Ricardo Osorio
(74) *Attorney, Agent, or Firm* — Studebaker & Brackett PC

(57) ABSTRACT

If a distance from a current position to a guide point is less than a predetermined distance, a normal output process and a stop process of a guide image are repeatedly performed. If a priority display request for a guide image is performed, a priority output process of the guide image is performed prior to the stop process. If an interval between the priority output process and the normal output process performed after the priority output process is short, the priority output process continues until the normal output process starts.

17 Claims, 25 Drawing Sheets

(30) Foreign Application Priority Data

| Dec. 20, 2018 | (JP) | JP2018-238205 |
| Dec. 20, 2018 | (JP) | JP2018-238207 |
| Dec. 20, 2018 | (JP) | JP2018-238208 |
| Dec. 20, 2018 | (JP) | JP2018-238271 |
| Nov. 20, 2019 | (JP) | JP2019-209468 |
| Nov. 20, 2019 | (JP) | JP2019-209475 |
| Nov. 20, 2019 | (JP) | JP2019-209479 |

(56) References Cited

U.S. PATENT DOCUMENTS

| 2012/0268495 | A1* | 10/2012 | Lee | G06F 3/147 |
| | | | | 345/660 |
| 2017/0269364 | A1 | 9/2017 | Fujita et al. | |
| 2019/0155024 | A1* | 5/2019 | Tsutsumi | G09G 5/00 |

FOREIGN PATENT DOCUMENTS

| CN | 109690634 A | * | 4/2019 | G01C 21/26 |
| DE | 112018003314 T5 | * | 3/2020 | B60J 1/02 |
| EP | 2 698 968 A1 | | 2/2014 | |
| EP | 3144775 A1 | * | 3/2017 | G02B 27/0093 |
| JP | 2001021366 A | * | 1/2001 | |
| JP | 2005-292622 A | | 10/2005 | |
| JP | 2008-065593 A | | 3/2008 | |
| JP | 2014-098564 A | | 5/2014 | |
| JP | 2015-166232 A | | 9/2015 | |
| WO | WO-2013114617 A1 | * | 8/2013 | B60K 35/00 |
| WO | 2016/103937 A1 | | 6/2016 | |
| WO | 2017/086380 A1 | | 5/2017 | |
| WO | WO-2020174554 A1 | * | 9/2020 | G01C 21/3632 |

\* cited by examiner

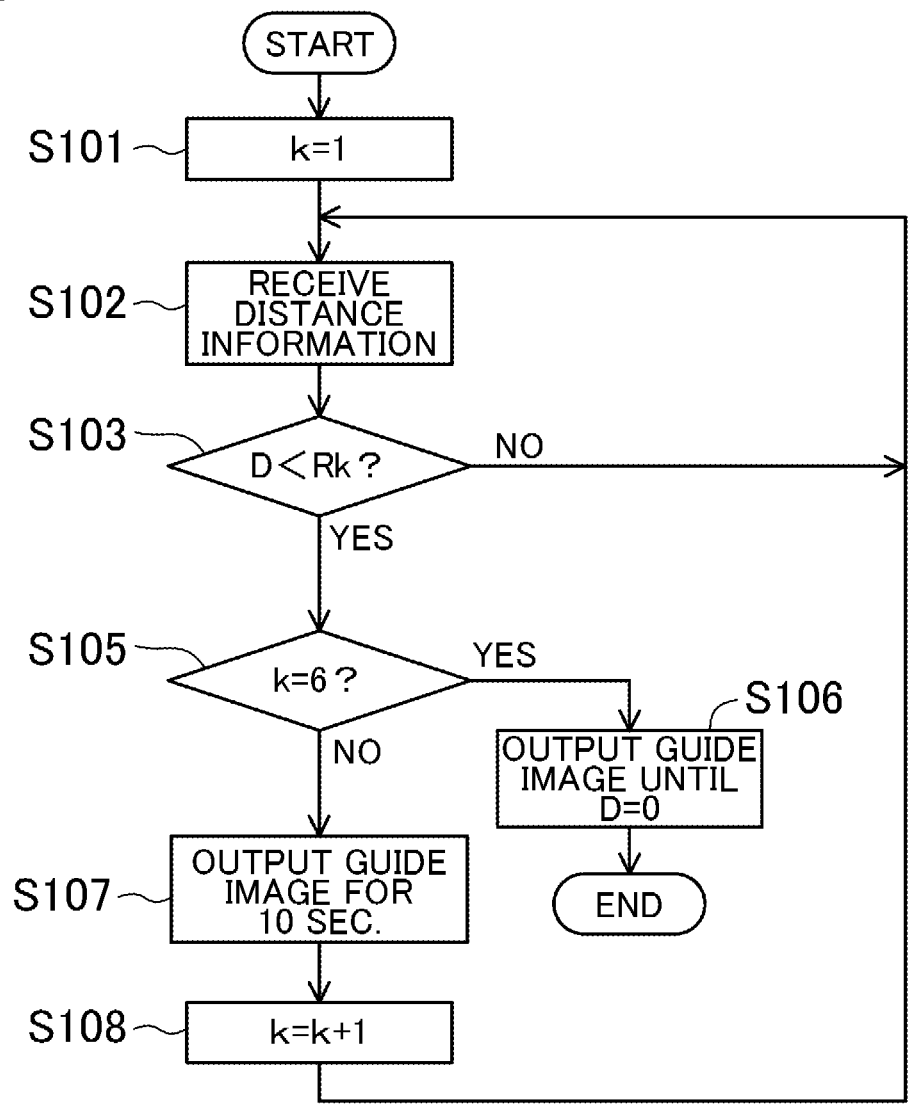

DISPLAY LIGHT EMISSION DEVICE, HEAD-UP DISPLAY DEVICE, IMAGE DISPLAY SYSTEM, AND HELMET

CROSS-REFERENCE TO RELATED APPLICATION

This is a continuation of PCT International Application PCT/JP2019/049573 filed on Dec. 18, 2019, which claims priority to Japanese Patent Applications No. 2018-238198 filed on Dec. 20, 2018, No. 2018-238203 filed on Dec. 20, 2018, No. 2018-238205 filed on Dec. 20, 2018, No. 2018-238207 filed on Dec. 20, 2018, No. 2018-238208 filed on Dec. 20, 2018, No. 2018-238271 filed on Dec. 20, 2018, No. 2019-209468 filed on Nov. 20, 2019, No. 2019-209475 filed on Nov. 20, 2019, and No. 2019-209479 filed on Nov. 20, 2019. The disclosures of these applications including the specifications, the drawings, and the claims are hereby incorporated by reference in their entirety.

BACKGROUND

The present disclosure relates to a display light emitting device that outputs an image to be displayed by a combiner provided on a helmet, a head-up display device, an image display system, and a helmet.

Japanese Patent Application Publication No. 2008-65593 proposes a display light emitting device including: a wireless communication section that receives distance information indicating a distance to a predetermined guide point and direction information indicating a traveling direction at the guide point from a communication equipment; and an image output section that generates a guide image representing a traveling direction at a guide point based on the distance information and the direction information received by the wireless communication section, and emits display light for causing a combiner provided on a helmet to display the guide image.

SUMMARY

Such a display light emitting device as proposed in Japanese Patent Application Publication No. 2008-65593 is configured to perform a normal output process of emitting display light for causing the combiner to display a guide image if a distance indicated by the distance information received by the wireless communication section is below a predetermined reference distance. With this configuration, a user of the helmet can check a route while checking traveling directions multiple times before reaching a guide point advantageously. When the condition that a switch provided on the helmet is pressed, such as a case where a user wants to check the next traveling direction, is satisfied, a priority output process of emitting display light for causing the combiner to display a guide image is performed so that the guide image can be thereby displayed in response to a request by the user. This can further enhance convenience.

In this case, however, in a case where a normal output process is performed immediately after the priority output process in response to the request by the user, a guide image by the priority output process disappears, and then, the same guide image is displayed by the normal output process. If the interval between these displays are short, the user might feel flickers, which is supposed to increase a burden on the eyes of the user.

It is therefore an object of the present disclosure to reduce a burden on the eyes of a user wearing a helmet.

The present disclosure provides a display light emitting device including: an information acquirer configured to acquire distance information and direction information, the distance information indicating a distance from a current position to a predetermined guide point, the distance information indicating a traveling direction at the guide point; and an image output section configured to generate a guide image representing a traveling direction at the guide point and to emit display light for causing a combiner provided on a helmet to display the guide image, based on the direction information acquired by the information acquirer, wherein the image output section is configured such that if it is determined that the distance from the current position to the guide point is less than a predetermined distance based on the distance information acquired by the information acquirer, the image output section repeatedly performs a normal output process of emitting display light for displaying the guide image and a stop process of stopping emission of display light, and when a priority display request for the guide image is detected, the image output section continuously performs a priority output process of emitting display light for displaying the guide image prior to the stop process, and the image output section is configured such that when the priority output process is performed, interval estimation of estimating an interval from end of the priority output process to start of the normal output process performed after the priority output process is performed, and if the interval obtained by the interval estimation is less than a predetermined value, the image output section continuously performs the priority output process until the normal output process starts.

With this configuration, in a case where the user gradually approaches the guide point and the distance from the current position to the guide point becomes less than the predetermined distance, the normal output process and the stop process of the guide image are repeatedly performed multiple times at predetermined timings. Thus, the user can check the next traveling direction before reaching the guide point. If the priority display request for the guide image is issued, the priority output process of the guide image is performed prior to the stop process, and thus, the user can check the next traveling direction when the user wants to check, for example. If the interval between the priority output process and its subsequent normal output process is short, the priority output process continues until the normal output process starts. Accordingly, the guide image can be kept displayed by the combiner, and thus, a burden on the eyes of the user wearing the helmet can be reduced, as compared to a process of displaying a guide image immediately after erasing the guide image.

The image output section may be configured to perform the interval estimation based on the distance information acquired by the information acquirer.

With this configuration, since the estimation is based on the distance information, the interval from end of the priority output process to start of the normal output process performed after the priority output process can be accurately performed.

The image output section may be configured to detect a display operation of a guide image performed by a ser as a priority display request for the guide image.

That is, in some cases, the user operates a switch or a button in order to check a guide image at the next guide point. This corresponds to the priority display request for the guide image. Thus, a display operation of the guide image performed by the user is detected as a priority display request for a guide image. Accordingly, the priority display request can be accurately detected.

The information acquirer may be connected to a cellular phone and is configured to acquire a state of the cellular phone, and the image output section may be configured to detect that the information acquirer acquires an incoming call state of the cellular phone as a priority display request for the guide image, and the guide image represents information indicating an incoming call state.

With this configuration, when the cellular phone comes into an incoming call state, the combiner displays information indicating the incoming call state together with a guide image. Thus, the user can know that the cellular phone is in the incoming call state and also know the next traveling direction. The information indicating an incoming call state can include a name and a title of a partner, for example.

A display light emitting device may include: an information acquirer configured to acquire distance information and direction information, the distance information indicating a distance from a current position to a predetermined guide point, the distance information indicating a traveling direction at the guide point; and an image output section configured to generate a guide image representing a traveling direction at the guide point and to emit display light for causing a combiner provided on a helmet to display the guide image, based on the direction information acquired by the information acquirer, wherein the image output section is configured such that if it is determined that the distance from the current position to the guide point is less than a predetermined distance based on the distance information acquired by the information acquirer, the image output section repeatedly performs a normal output process of emitting display light for displaying the guide image and a stop process of stopping emission of display light, and when a priority display request for the guide image is detected, the image output section continuously performs a priority output process of emitting display light for displaying the guide image prior to the stop process, and the image output section is configured such that when the priority output process is performed, interval estimation of estimating an interval from end of the priority output process to start of the normal output process performed after the priority output process is performed, and if the interval obtained by the interval estimation is less than a predetermined value, the image output section inhibits the normal output process.

With this configuration, in a case where the user gradually approaches the guide point and the distance from the current position to the guide point becomes less than the predetermined distance, the normal output process and the stop process of the guide image are repeatedly performed multiple times at predetermined timings. Thus, the user can check the next traveling direction before reaching the guide point. If the priority display request for the guide image is issued, the priority output process of the guide image is performed prior to the stop process, and thus, the user can check the next traveling direction when the user wants to check, for example. If the interval between the priority output process and the normal output process performed after the priority output process is short, the priority output process is performed and the normal output process is inhibited. Thus, the normal output process is not performed immediately after the priority output process. Accordingly, flickers can be prevented or reduced so that a burden on the eyes of the user wearing the helmet can be thereby reduced.

The image output section causes the guide image to be faded in at the start of display of the guide image, and causes the guide image to be faded out at the end of display of the guide image.

Accordingly, an image displayed by combiner gradually becomes bright at the start of display of the guide image, whereas the image displayed by the combiner gradually becomes dark at the end of display of the guide image. Thus, a burden on the eyes of the user of the helmet can be reduced.

A display light emitting device may include: an information acquirer configured to acquire distance information, direction information, and velocity information, the distance information indicating a distance from a current position to a predetermined guide point, the direction information indicating a traveling direction at the guide point, the velocity information indicating a moving velocity from the current position to the predetermined guide point; and an image output section configured to generate a guide image representing a traveling direction at the guide point and to emit display light for causing a combiner provided on a helmet to display the guide image, based on the direction information received by the information acquirer, wherein the image output section is configured to perform distance determination on whether the distance indicated by the distance information acquired by the information acquirer is less than a first predetermined distance or not and velocity determination on whether the moving velocity indicated by the velocity information acquired by the information acquirer is greater than or equal to a predetermined velocity or not, and the image output section is configured such that if the distance is determined to be less than the first predetermined distance in the distance determination and the moving velocity is determined to be greater than or equal to the predetermined velocity in the velocity determination, the image output section performs continuous output of continuously emitting display light for displaying the guide image, whereas if the distance is determined to be less than the first predetermined distance in the distance determination and the moving velocity is determined to be less than the predetermined velocity in the velocity determination, the image output section emits display light for displaying the guide image for a predetermined time and then performs a stop process of stopping emission of the display light.

With this configuration, in a case where the user as a helmet wearer gradually approaches the guide point and the distance from the current position to the guide point becomes less than the first predetermined distance, if the moving velocity is at a high velocity of a predetermined velocity or more, the guide image is continuously displayed. Thus, even if the time to reach the next guide point is short, the user can check a traveling direction at the next guide point. On the other hand, even in a case where the distance from the current position to the guide point is less than the first predetermined distance, if the moving velocity is at a low velocity less than the predetermined velocity, the guide image is displayed for a predetermined time and then erased. Thus, the user is less likely to feel annoyed.

The image output section may be configured to determine whether the distance indicated by the distance information acquired by the information acquirer is less than a second predetermined distance shorter than the first predetermined distance, and if the distance indicated by the distance information is determined to be less than the second predetermined distance, the image output section may perform continuous output of continuously outputting display light for displaying the guide image.

With this configuration, when the user further approaches the next guide point, the guide image is continuously displayed, and thus, the user is less likely to mistake the traveling direction at the guide point.

The image output section may be configured to continuously emit display light for displaying the guide image until a user wearing the helmet reaches the guide point, if the distance indicated by the distance information is determined to be less than the first predetermined distance in the distance determination and the moving velocity is determined to be greater than or equal to the predetermined velocity in the velocity determination.

With this configuration, if the moving velocity is the predetermined velocity or more, the user moves at high speed, and thus, the time to reach the next guide point is expected to be short. In this case, the guide image is kept displayed until the user reaches the guide point. Accordingly, the user is capable of check the traveling direction at the next point without feeling annoyed.

The image output section is may be configured such that if the distance indicated by the distance information is determined to be greater than or equal to the first predetermined distance in the distance determination, the image output section does not perform the velocity determination and emits display light for displaying the guide image for a predetermined time and then performs a stop process of stopping emission of the display light.

With this configuration, if the distance indicated by the distance information is greater than or equal to the first predetermined distance, the user is sufficiently away from the next guide point. Thus, the guide image is not continuously displayed, and is displayed for a predetermined time and then erased to avoid annoyance. Even in this case, the user does not feel inconvenience. The predetermined time can be set at a time of about several seconds to about 10 seconds, for example, which is sufficient for the user to check information. The information acquirer is connected to a cellular phone incorporating a GPS receiver, and is configured to acquire the distance information and the velocity information calculated based on positioning information by the GPS receiver.

With this configuration, the positioning information of the GPS receiver of the cellular phone is used to accurately calculate distance information indicating a distance from the current position to the predetermined guide point, and also accurately calculate velocity information indicating a moving velocity from the current position to the predetermined guide point. Since the distance information and the velocity information are acquired from the cellular phone, the configuration of the display light emitting device can be made simple, and a route guide easy to understand can be guided with high accuracy.

The image output section may be configured to continuously emit display light for displaying the guide image until a user wearing the helmet reaches the guide point, if the distance indicated by the distance information is determined to be less than the first predetermined distance in the distance determination and the moving velocity is determined to be greater than or equal to the predetermined velocity in the velocity determination, and then the moving velocity indicated by the velocity information acquired by the information acquirer decreases to be less than the predetermined velocity.

That is, in a possible case, the distance is determined to be less than the first predetermined distance in the distance determination and the moving velocity is determined to be greater than or equal to the predetermined velocity in the velocity determination so that a guide image is displayed, and then, the moving velocity decreases. In this case, when the guide image is erased, the temporary displayed guide image unexpectedly disappears, which provides the user with incongruity sense. With this configuration, even when the moving velocity decreases after the guide image is displayed, the display of the guide image can be continued. Thus, the user does not have incongruity sense.

A display light emitting device may include: an information acquirer configured to acquire information indicating a traveling direction at a guide point on a previously set path; and an image output section configured to perform an image output process before a user wearing a helmet reaches the guide point, the image output process being a process in which the image output section generates a guide image representing a traveling direction indicated by the information acquired by the information acquirer and emits display light for causing a combiner provided on the helmet to display the guide, wherein the information acquirer is configured to acquire first information and second information, the first information indicating a traveling direction at a first guide point closest to a current position, the second information indicating a traveling direction at a second point the user is to reach next after the first information, and the image output section is configured to perform interval estimation of estimating an interval between the first guide point and the second guide point, and if the interval obtained by the interval estimation is less than or equal to a predetermined value, the image output section generates, as the guide image, a plurality of display images representing the traveling direction indicated by the second information in addition to the traveling direction indicated by the first information.

With this configuration, in a case where the first guide point closest to the current position and the second guide point where the user is to reach next are present, if it is determined that the interval between the first guide point and the second guide point is short, both the traveling direction at the first guide point and the traveling direction at the second guide point are displayed on a guide image. Thus, even if the time from arrival at the first initial guide point to arrival at the next guide point is short, the user as a helmet wearer is capable of previously checking a traveling direction at the next guide point on the guide image.

The information acquirer may be configured to acquire inter-guide point distance information indicating a distance between the first guide point and the second guide point, and the image output section may be configured to perform interval estimation of estimating an interval between the first guide point and the second guide point based on the distance indicated by the inter-guide point distance information acquired by the information acquirer.

With this configuration, if the distance between the first guide point and the second guide point is long, it can be estimated that the first guide point and the second guide point are away from each other, whereas if the distance between the first guide point and the second guide point is short, it can be estimated that the first guide point and the second guide point are close to each other. The estimation based on the distance information can easily obtain an accurate estimation result.

The information acquirer may be configured to acquire inter-current position distance information indicating a distance from the current position to the first guide point, and the image output section may be configured to determine whether the distance indicated by the inter-current position distance information acquired by the information acquirer is less than a predetermined distance or not, and if the distance indicated by the inter-current position distance is determined to be greater than or equal to the predetermined distance, the image output section does not display the traveling direction indicated by the second information.

With this configuration, the situation where the distance between the current position and the first guide point closest to the current position is greater than or equal to the predetermined distance means that the current position and the first guide point are far from each other. At such a timing, it is determined that it is less necessary to indicate a traveling direction at the second guide point farther than the first guide point. In this case, the traveling direction at the second guide point is not displayed to reduce annoyance to the user.

The image output section may be configured to display the traveling direction indicated by the first information for a predetermined time if the distance indicated by the inter-current position distance information acquired by the information acquirer is determined to be greater than or equal to the predetermined distance.

With this configuration in a case where the distance between the current position and the first guide point closest to the current position is greater than or equal to the predetermined distance, the user can be previously notified of the traveling direction at the first guide point. Thus, the user is less likely to mistake the traveling direction at the first guide point. The image output section may be configured to continuously display the traveling direction indicated by the first information until a user wearing a helmet reaches the first guide point if the distance indicated by the inter-current position distance information acquired by the information acquirer is determined to be less than the predetermined distance.

With this configuration, the traveling direction at the first guide point closest to the current position is kept displayed until the user reaches the first guide point. Accordingly, the user is less likely to mistake the traveling direction at the first guide point.

The image output section may be configured to continuously display the traveling direction indicated by the first information and the traveling direction indicated by the second information until the user wearing the helmet reaches the first guide point if the distance indicated by the inter-current position distance information acquired by the information acquirer is determined to be less than the predetermined distance and the interval obtained by the interval estimation is less than or equal to the predetermined value.

With this configuration, the situation where the distance between the current position and the first guide point closest to the current position is less than the predetermined distance means that the current position and the first guide point are close to each other. In this case, not only the traveling direction at the first guide point but also the traveling direction at the second guide point are kept displayed until the user reaches the first guide point. Accordingly, the user is less likely to mistake the traveling directions at the first guide point and the second guide point.

The image output section may be configured to generate, as the guide image, the plurality of display images representing the traveling direction and the distance from the current position to the first guide point indicated by the first information and representing the traveling direction and the distance from the current position to the second guide point indicated by the second information.

With this configuration, not only the traveling direction at the first guide point and the distance to the first guide point but also the traveling direction at the second guide point and the distance to the second guide point are displayed at the same time. Thus, the user is less likely to mistake the traveling directions at the first guide point and the second guide point.

A HUD device may include: a display module configured to display a display image to a user; a calling module configured to provide a voice call to the user using an input/output device by communicating with an electronic equipment having a calling function, the input/output device being configured to receive and output audio information; an operation unit including a plurality of switches, each of the plurality of switches being configured to accept an operation concerning display by the display module and an operation concerning a voice call by the calling module; and a control module configured to control a display function by the display module and control a calling function by the display module in response to an operation on each of the switches. Upon an incoming call to the electronic equipment, the control module notifies the user of the incoming call based on an incoming call signal received through the calling module and allocates a call receiving function to at least two of the plurality of switches.

With this configuration, upon an incoming call at the electronic equipment, call receiving functions are allocated to at least two of the plurality of switches included in the operation unit. Thus, the user can take a call in response to the incoming call by operating at least two switches to which the call receiving functions are allocated. Accordingly, the possibility of erroneous operation of switches with other functions decreases, and thus, the user is less likely to fail to receive the call upon the incoming call at the electronic equipment. Thus, in the HUD device to be mounted on the helmet having the calling function, when an incoming call is received from a partner, a call receiving operation for receiving a call in response to the incoming call can be easily performed.

In the HUD device, upon an incoming call at the electronic equipment, the control module preferably allocates a call receiving function of receiving the incoming call to each of the plurality of switches.

With this configuration, upon an incoming call at the electronic equipment, the user can respond to the incoming call by operating one of the switches. Thus, the user does not incorrectly operate switches with other functions, and does not fail to respond to the incoming call.

The plurality of switches may include a display operation switch to which a display operation function of accepting an operation concerning display of the display module in the absence of an incoming call at the electronic equipment is allocated. The control module may allocate the call receiving function to the display operation switch when an incoming call is provided to the electronic equipment. In this case, the control module preferably allocates a call end function of finishing a call to the display operation switch during a call by the calling module and does not allocate the display operation function to the display operation switch until a predetermined time has elapsed from the end of the call by the calling module.

In the case of allocating the display operation function to the display operation switch immediately after end of a call by the calling module, when the user wearing the helmet is to operate the display operation switch to which the call end function is allocated in order to finish the call, if the partner of the call performs a call end operation before the call end operation by the user, since the display operation function has been already allocated to the display operation switch when the user operates the display operation switch, an operation concerning display is unintentionally performed. Such an unintended operation of the HUD device caused by a call end operation as described above might cause the user to feel uneasy.

On the other hand, in the configuration described above, the display operation function is not allocated to the display operation switch until a predetermined time has elapsed from the end of a call by the calling module. Thus, even if the user unintentionally operates the display operation switch in order to finish the call after the partner of the call has performed the call end operation, an operation concerning display is not performed unintentionally. Accordingly, unintentional operation of the HUD device caused by a call end operation can be prevented or reduced so that the user does not feel uneasy.

The HUD device may be switched between a display mode in which a display image representing predetermined information by the display module is displayed and a non-display mode in which the display image is not displayed.

With this configuration, since the HUD device can be switched between the display mode in which the display image representing predetermined information and the non-display mode in which the display image is not displayed, the non-display mode is selected when display of the display image is unnecessary. Thus, consumption of electric power for operating HUD device can be reduced.

In this case, in the non-display mode, the control module preferably temporarily displays a display image representing predetermined information by the display module by operation on the display operation switch to which an operation concerning display of the display module in the absence of an incoming call at the electronic equipment is allocated among the plurality of switches.

Even in the case where the HUD device is provided with the function of switching display modes as described above, the user might forget to switch to the non-display mode when display of the display image is unnecessary. In a case where predetermined information represented by a display image is information that does not need to be seen all the time during driving or only needs to be seen when the user wants to check, it is inconvenience to switch the device between the display mode and the non-display mode every when the user checks the predetermined information, and thus, the HUD device can be used while being kept in the display mode in some cases even when display of the display image is not necessary.

On the other hand, in the configuration described above, operation on the display operation switch is also performed in the non-display mode of the HUD device so that a display image representing predetermined information is temporarily displayed by the display module. Thus, switching operation between the display mode and the non-display mode can be omitted, and the display image can be temporarily displayed when necessary. In this manner, the user will not forget to erase display of a display image. The temporary display of a display image by the operation on the display operation switch is utilized so that consumption of electric power for operating the HUD device can be thereby reduced.

A HUD device may include: a display module configured to display a display image to a user; a calling module configured to provide a voice call to the user using an input/output device by communicating with an electronic equipment having a calling function, the input/output device being configured to receive and output audio information; an operation unit including a plurality of switches, each of the plurality of switches being configured to accept an operation concerning display by the display module and an operation concerning a voice call by the calling module; and a control module configured to control a display function by the display module and control a calling function by the display module in response to an operation on each of the switches. Upon an incoming call to the electronic equipment, the control module notifies the user of the incoming call based on an incoming call signal received through the calling module and allocates a call receiving function to at least two of the plurality of switches.

With this configuration, upon an incoming call at the electronic equipment, call receiving functions are allocated to at least two of the plurality of switches included in the operation unit. Thus, the user can take a call in response to the incoming call by operating at least two switches to which the call receiving functions are allocated. Accordingly, the possibility of erroneous operation of switches with other functions decreases, and thus, the user is less likely to fail to receive the call upon the incoming call at the electronic equipment. Thus, in the HUD device to be mounted on the helmet having the calling function, when an incoming call is received from a partner, a call receiving operation for receiving a call in response to the incoming call can be easily performed.

An image generator configured to generate a display image may determine whether a predetermined information deletion condition is satisfied or not, and if it is determined that the information deletion condition is not satisfied, the image generator operates in a first mode of generating an image representing first information and second information as the display image, whereas if it is determined that the information deletion condition is satisfied, the image generator operates in a second mode of displaying an image representing the first information but not representing the second information as the display image.

With this configuration, the image generator can be operated in the mode in which the display image does not represent the second information, and thus, the user is less likely to feel annoyed by the display image, as compared to the case where the display image always represents the first and second information.

The image generator acquires velocity information indicating a current velocity, and the information deletion condition is satisfied if a velocity condition including a condition that a velocity indicated by the acquired velocity information is greater than or equal to a predetermined threshold is established.

Accordingly, while the user is traveling at a velocity greater than or equal to the predetermined threshold, information represented by a display image can be reduced, as compared to traveling at a velocity less than the predetermined threshold. Thus, the helmet wearer is less likely to be hindered by a display image or feel annoyed by the display image in seeing outside scenery.

In addition, the helmet wearer is capable of checking the second information in a generally relatively safe state, such as a traveling state at a velocity less than the predetermined threshold or a stationary state.

The display light emitting device further includes a wireless communication section configured to receive velocity information indicating a current velocity of a communication equipment from the communication equipment, and the wireless communication section is provided on the helmet. The velocity information acquired by the image generator is velocity information received by the wireless communication section.

With this configuration, since no velocity sensor needs to be provided on the helmet in order to acquire velocity information. Thus, manufacturing costs of the helmet can be reduced, as compared to a case where the velocity sensor is provided on the helmet.

The velocity condition further includes a condition that operation in the second mode does not continue for a predetermined time.

With this configuration, in a case where operation in the second mode continues for the predetermined time, the image generator operates in the first mode. Thus, in a case where traveling at a velocity of the predetermined threshold or more continues for a long time, the helmet wearer can check the second information at every predetermined time.

The information deletion condition is satisfied if an acceleration/deceleration condition that an absolute value of the acceleration is greater than or equal to a predetermined threshold is established.

With this configuration, in a case where the absolute value of the acceleration is greater than or equal to the predetermined threshold, information represented by a display image can be reduced, as compared to a case where the absolute value of the acceleration is less than the predetermined threshold. Thus, the helmet wearer is less likely to be hindered by the display image or feel annoyed by the display image in seeing outside scenery.

In addition, the helmet wearer is capable of checking the second information in a generally relatively safe state, such as a traveling state at a constant velocity.

The display light emitting device further includes a wireless communication section configured to receive a detection result of an acceleration sensor provided on a communication equipment from the communication equipment, and is provided on the helmet. The image generator performs the determination based on the detection result received by the wireless communication section.

With this configuration, since no velocity sensor needs to be provided on the helmet in order to acquire an acceleration. Thus, manufacturing costs of the helmet can be reduced, as compared to a case where the acceleration sensor is provided on the helmet.

The information deletion condition is satisfied if a traveling direction condition that the user is passing at a corner point is established.

With this configuration, while the user is passing at a corner point, information represented by a display image can be reduced, as compared to a case where the user is not passing at the corner point. Thus, the helmet wearer is less likely to be hindered by the display image or feel annoyed by the display image in seeing outside scenery.

In addition, the helmet wearer is capable of checking the second information in a generally relatively safe state, such as a straight-traveling state.

The display light emitting device further includes a wireless communication section configured to receive guide information indicating a distance between a current position of the communication equipment and the corner point from the communication equipment, and the display light emitting device is provided on the helmet. The image generator performs the determination based on the guide information received by the wireless communication section.

With this configuration, since no gyro sensor needs to be provided on the helmet in order to determine whether the user is passing at the corner point or not. Thus, manufacturing costs for the helmet can be reduced, as compared to the case of providing the gyro sensor on the helmet.

The display light emitting device further includes a wireless communication section configured to receive a detection result of an gyro sensor provided on a communication equipment from the communication equipment, and the display light emitting device is provided on the helmet. The image generator performs the determination based on the detection result received by the wireless communication section.

With this configuration, since no gyro sensor needs to be provided on the helmet in order to determine whether the user is passing at the corner point or not. Thus, manufacturing costs for the helmet can be reduced, as compared to the case of providing the gyro sensor on the helmet.

An image display system may further include a detector configured to detect rotation in a left direction or a right direction when seen from the helmet wearer of the helmet, wherein when the detector detects the rotation, the head-up display device performs a displacement process of emitting display light such that a display position of the display image is rotated from the steady position in a direction opposite to a direction of the rotation detected by the detector.

With this configuration, even when the helmet wearer rotates his/her head to the left or right, a display image displayed by the head-up display device is rotated by the displacement process in a direction opposite to the direction of rotation of the head so that relative rotation of the display image to scenery outside the helmet caused by rotation of the helmet is reduced. Thus, the helmet wearer can easily see outside scenery.

When the helmet wearer rotates his/her head to the left and right for checking the left or right side with a viewpoint of the helmet wearer at the steady position, the display image displayed by the head-up display device moves away from the viewpoint of the helmet wearer, and thus, the helmet wearer is less likely to be hindered by the display image in seeing outside scenery.

The detector acquires an angle of the detected rotation, and the displacement process rotates a display position of the display image from the steady position by the angle acquired by the detector in a direction opposite to the direction of rotation detected by the detector.

With this configuration, relative movement of the display image to scenery outside the helmet caused by rotation of the helmet can be eliminated. Thus, the helmet wearer can feel as if the display image were a part of the outside scenery.

A detector for detecting a tilt in the left direction or the right direction when seen from the wearer of the helmet is further provided. When the tilt is detected by the detector, the head-up display device performs a displacement process of emitting display light such that the display position of the display image is tilted from the steady position in a direction opposite to the direction of the tilt detected by the detector.

With this configuration, even when the helmet wearer tilts his/her head to the left or right, a display image displayed by the head-up display device is tilted by the displacement process so that relative tilt of the display image to scenery outside the helmet caused by tilt of the helmet is reduced. Thus, the helmet wearer can easily see the outside scenery.

In addition, even in a case where the helmet wearer rides on, for example, a two-wheeled vehicle and tilts the entire body to the left or right, a display image displayed by the head-up display device tilts in a direction opposite to the direction of the tilt of the body by the displacement process, and a relative tilt of the display image to scenery outside the helmet caused by the tilt of the helmet can be reduced. Thus, sits or incongruity sense caused by the tilt of the display image to the outside scenery can be reduced.

The detector acquires an angle of the detected tilt, and the displacement process tils to display position of the display image from the steady position by the angle acquired by the detector in a direction opposite to the direction of the tilt detected by the detector.

With this configuration, a tilt of the display image to scenery outside the helmet caused by a tilt of the helmet can be eliminated. Thus, incongruity sense caused by the tilt of the display image relative to the outside scenery can be more effectively reduced.

According to the present disclosure, flickers of a guide image can be prevented or reduced so that a burden on the eyes of a user wearing a helmet can be thereby reduced.

BRIEF DESCRIPTION OF THE DRAWINGS

FIG. 8 is a flowchart depicting a steady operation executed by the display light emitting device according to the first embodiment of the present disclosure.

DETAILED DESCRIPTION

Embodiments of the present disclosure will be described with reference to the drawings.

First Embodiment

Figure 1:
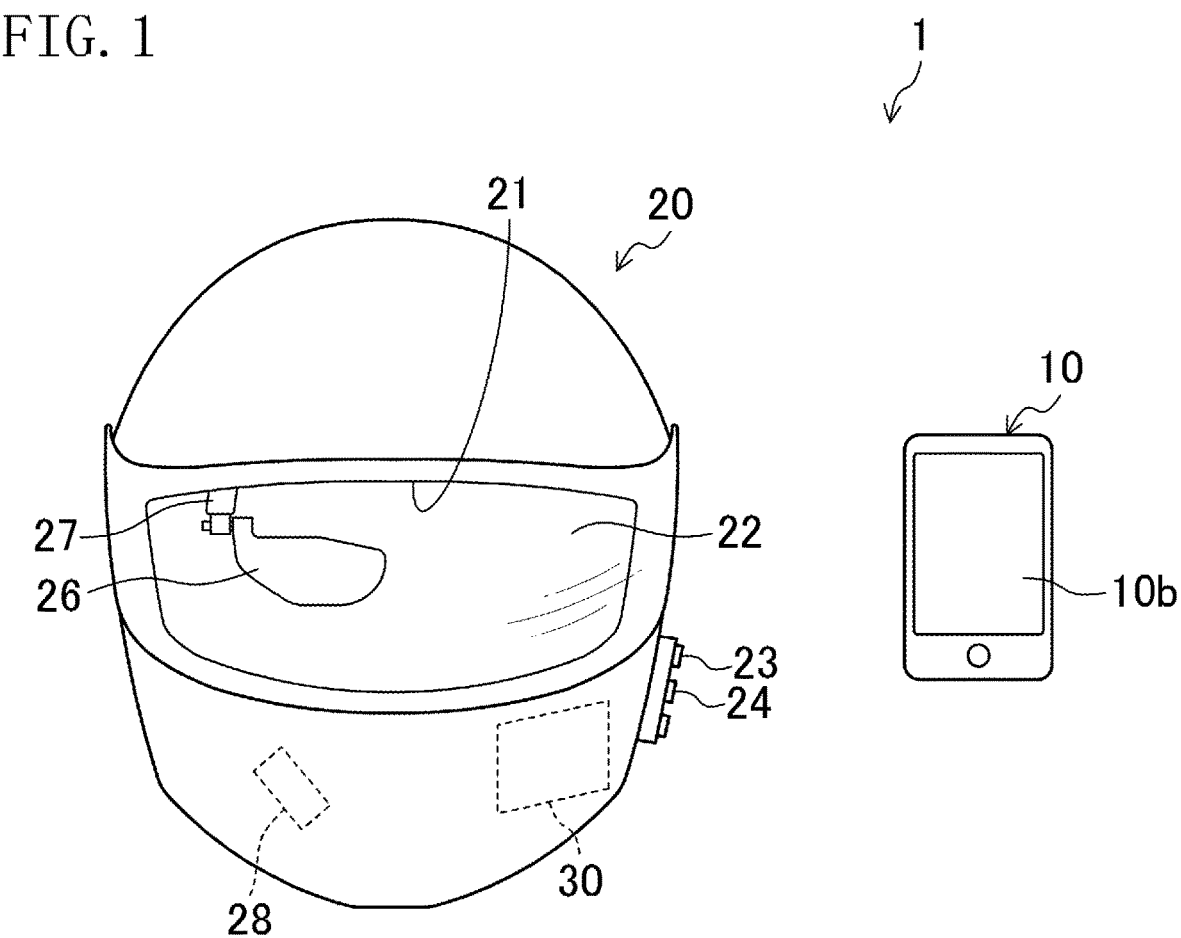
FIG. 1 is an outline view illustrating a configuration of a navigation system including a display light emitting device according to a first embodiment of the present disclosure.

FIG. 1 illustrates a navigation system 1 including a display light emitting device according to a first embodiment of the present disclosure. The navigation system 1 includes a smartphone (cellular phone) 10 as a communication equipment and a helmet 20, and is used for a motorcycle. The navigation system 1 is also applicable to vehicles other than motorcycles, such as a personal watercraft, a bicycle, and a snowmobile (snow bike).

Figure 2:
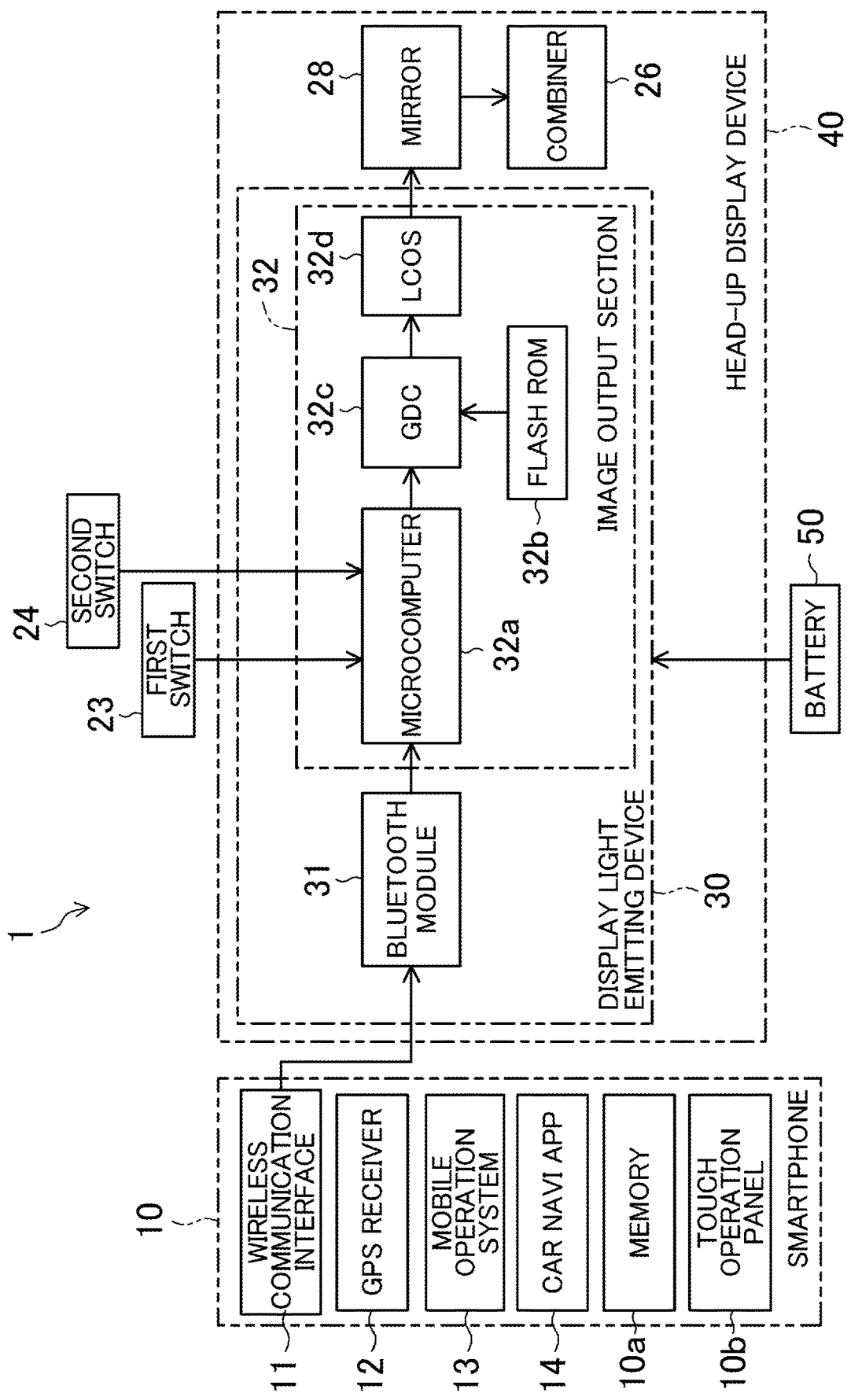
FIG. 2 is a functional block diagram illustrating a configuration of the navigation system including the display light emitting device according to the first embodiment of the present disclosure.

The smartphone 10 has a telephone function and a data communication function using a telephone line, and as illustrated in FIG. 2, includes a wireless communication interface 11 that performs wireless communication using Bluetooth (registered trademark), a GPS receiver 12, a memory 10a, and a touch operation panel 10b. The smartphone 10 is equipped with a mobile operation system 13 that is an OS of the smartphone 10, and a car navigation service application (hereinafter referred to as a "car navi app") 14 that is operated on the mobile operation system 13 by using, for example, positional information acquired by the GPS receiver 12. The car navi app 14 may store its own map information, may use map information stored in the memory 10a of the smartphone 10, or may use necessary map information downloaded through the Internet. Programs for the mobile operation system 13 and the car navi app 14 and map information can be stored in the memory 10a beforehand. The map information includes, for example, road information and names of intersections.

The touch operation panel 10b includes, for example, a liquid crystal display, and is configured to display a user interface generated by the mobile operation system 13, various images, an execution screen of the car navi app 14, and various setting screens, for example. The touch operation panel 10b also includes, for example, a pressure sensitive operation detecting unit, and is configured to receive a touch operation by a user.

The GPS receiver 12 is a device for positioning a current position known to date, and is configured to determine a current position accurately substantially in real time. Positional information obtained by the GPS receiver 12 is used for the mobile operation system 13 and the car navi app 14. Based on the positional information obtained by the GPS receiver 12, a moving velocity can also be calculated. The premise is that the smartphone 10 is held by a user (a rider of a motorcycle) wearing the helmet 20, and thus, current position information and velocity information of the user, that is, the motorcycle, can be acquired. The smartphone 10 may be detachably attached to the motorcycle, or may be housed in, for example, a bag capable of receiving a GPS signal.

The smartphone 10 is configured to use the car navi app 14, search for a route from a current position to a destination automatically based on the positional information (current position information) obtained by the GPS receiver 12 and destination information input on the touch operation panel 10b, and set the route. The smartphone 10 also has a so-called auto-reroute function of automatically rerouting a path if the current position is deviated from a previously set path during guidance. The smartphone 10 is also configured to calculate a distance from the current position to the destination (remaining distance) and an estimated arrival time. A plurality of guide points such as intersections and branch points are present on a route from the current position to the destination, and a traveling direction at each guide point is determined by setting of the route. The car navi app 14 is configured to calculate a distance from the current position to a next guide point and a time to reach from the current position to the next guide point based on the map information and the current position information. Thus, the car navi app 14 is capable of acquiring the various types of information described above, such as distance information indicating a distance from the current position to a predetermined guide point, direction information indicating a traveling direction at the guide point, and velocity information indicating a moving velocity on a road from the current position to the predetermined guide point, at predetermined time intervals (e.g., at every second).

The smartphone 10 is configured to transmit the information acquired by the car navi app 14, such as the distance information, the direction information, the velocity information, and the remaining distance through wireless communication by the wireless communication interface 11. The direction information includes lane guide information guiding a lane on which the user is to travel. If the guide point has a name, this name is also transmitted through wireless communication by the wireless communication interface 11. If the destination is not set (path setting is not provided), the distance information and direction information are not transmitted.

The car navi app 14 is configured to acquire real-time information indicating, for example, whether traffic congestion is present on a set path or not, through a communication line. The acquire real-time information is also transmitted through wireless communication by the wireless communication interface 11.

The smartphone 10 transmits, through wireless communication by the wireless communication interface 11, an incoming call state if an incoming call is received at the smartphone 10, a state during a call if the user is talking on the phone, or a state at the end of a call if the smartphone 10 finishes a phone call. A remaining capacity of the battery of the smartphone 10 is also transmitted through wireless communication by the wireless communication interface 11. These states of the smartphone 10 are transmitted by using the Bluetooth.

As illustrated in FIG. 1, the front surface of the helmet 20 has a window opening 21 between the forehead and the chin of a wearer of the helmet 20 such that the window opening 21 faces the wearer. A shield 22 having transparency to light is attached to the left and right sides of a peripheral portion of the window opening 21 such that the window opening 21 can be opened and closed by upward and downward pivots of the shield 22. First and second switches 23 and 24 are disposed at the left of the window opening 21 on the outer surface of the helmet 20 when seen from the wearer of the helmet 20, that is, at a position corresponding to an ear of the wearer of the helmet 20. A translucent plate-shaped combiner 26 is attached, from the inner side, to a right portion of the center in the left-right direction when seen from the wearer of the helmet 20 on an upper edge portion of the window opening 21 of the helmet 20, with an attachment member 27 interposed between the combiner 26 and the right portion. A display light emitting device 30 according to the first embodiment of the present disclosure and a mirror 28 for projecting display light from the display light emitting device 30 to a combiner 26 are incorporated below the window opening 21 of the helmet 20. A guide image is generated by the display light emitting device 30, and display light in accordance with the guide image is emitted from the display light emitting device 30 and then reflected on the mirror 28. The display light reflected on the mirror 28 is projected to the combiner 26, and further reflected by the combiner 26 to enter a field of view of the helmet wearer. Accordingly, the helmet wearer can visually recognize a display image by display light as a virtual image with the display image superimposed on scenery of a forward field of view through the combiner 26.

The display light emitting device 30, the combiner 26, and the mirror 28 constitute a head-up display device 40. The head-up display device 40 is supplied with electric power from a battery 50 illustrated in FIG. 2. The battery 50 can be incorporated in the helmet 20.

As illustrated in FIG. 2, the display light emitting device 30 includes a Bluetooth module 31 as a wireless communication section capable of communicating with the smartphone 10 using Bluetooth, and an image output section 32 that generates an image to be displayed by the combiner 26 and causes the combiner 26 to display the generated image, based on information received by the Bluetooth module 31. The display light emitting device 30 is configured to detect operation states of the first and second switches 23 and 24, and to be actuated when detecting that the first switch 23 is pressed and held (e.g., kept to be pressed for several seconds or more).

The Bluetooth module 31 is an information acquirer connected to the wireless communication interface 11 of the smartphone 10 and configured to acquire various types of information transmitted from the wireless communication interface 11. Examples of various types of information transmitted from the wireless communication interface 11 of the smartphone 10 include distance information indicating a distance from the current position to a predetermined guide point, direction information (including lane guidance information) indicating a traveling direction at the guide point, a velocity information indicating a current velocity, a remaining distance, an estimated arrival time, and a name of a guide point. The Bluetooth module 31 also acquires information concerning an incoming call state, a state during a call, and end of call, information on a remaining battery capacity, and other information, as states of the smartphone 10. These types of information may be acquired at every update of information, or may be acquired with time intervals. In the first embodiment, the information is acquired every second. If no destination is set (no path is set), none of distance information and direction information is acquired.

The image output section 32 includes a microcomputer 32a, a flash read only memory (ROM) 32b, a graphics display controller (GDC) 32c that generates a guide image (display image) by combining a figure and/or a pattern, for example, stored on the flash ROM 32b based on an instruction by the microcomputer 32a, and a liquid crystal on silicon (LCOS) 32d that emits display light for causing the combiner 26 to display the guide image generated by the GDC 32c. The GDC 32c is an image generator that generates a display image. The LCOS 32d is an emitter that emits display light for projecting a display image generated by the GDC 32c onto a field of view of the helmet wearer. The configuration of the image output section 32 is not limited to the example described above, and any configuration used as a head-up display device may be employed.

Figure 3:
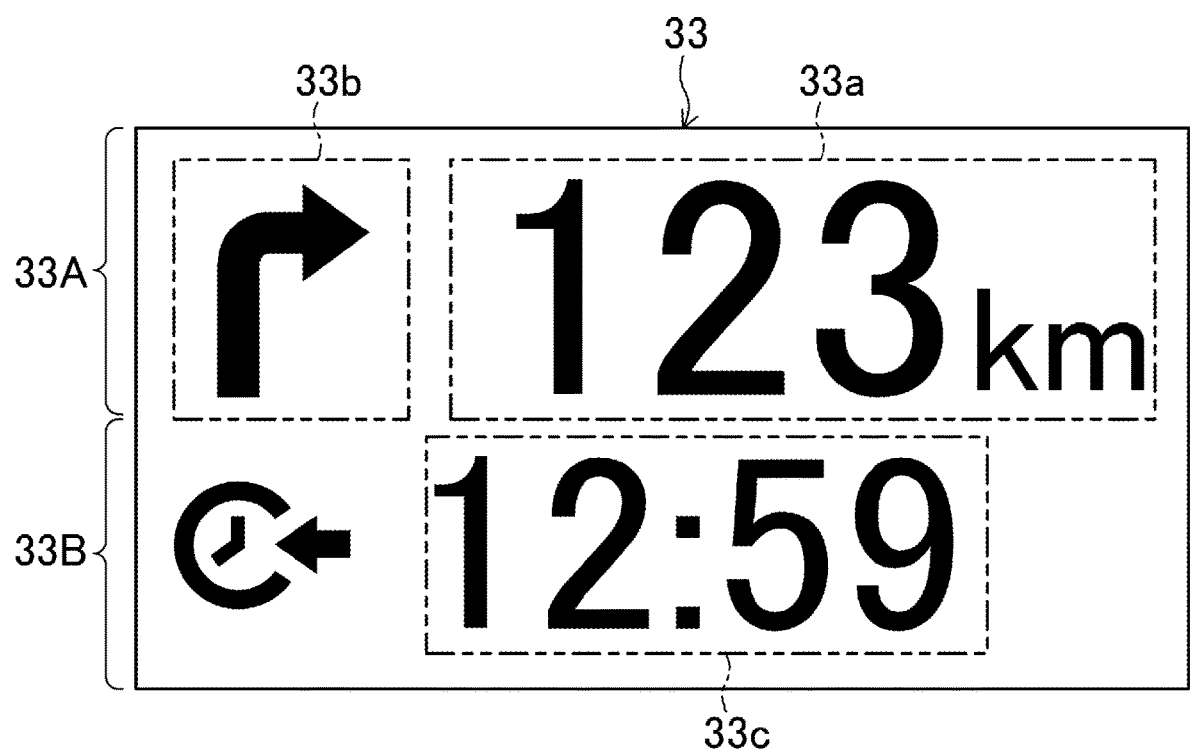
FIG. 3 illustrates an example of a guide image output from an image output section.

Specifically, based on information acquired by the Bluetooth module 31, the image output section 32 generates a guide image 33 as illustrated in FIG. 3, for example, and emits display light for causing the combiner 26 to display the guide image 33. The guide image 33 can be divided into a direction/distance display region 33A and a various types of information display regions 33B. In this example, the direction/distance display region 33A is set in an upper half of the guide image 33, and the various types of information display regions 33B are set in a lower half of the guide image 33. However, the present disclosure is not limited to this example.

In the direction/distance display region 33A, a distance display region 33a displaying a distance from combined a current position to a predetermined guide point and a direction display region 33b displaying a traveling direction at the predetermined guide point are disposed side by side. The distance display region 33a may be configured such that if the distance to the predetermined guide point is long, the unit is represented by "km" and if the distance to the predetermined guide point is less than 1 km, the unit is represented by "m." The direction display region 33b displays a traveling direction indication image such as an arrow. The various types of information display regions 33B can display an estimated value of a required time from the current position to a destination (estimated arrival time 33c). The various types of information display regions 33B may display a current time. The current time may be acquired from the smartphone 10, or may be acquired from time information held by the display light emitting device 30.

Figure 4A:
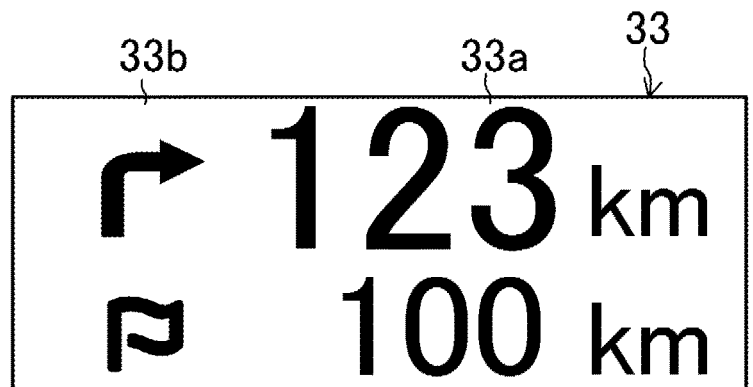
FIG. 4A illustrates an example of a guide image representing a distance from a current position to a destination.
Figure 4B:
FIG. 4B illustrates an example of a guide image representing a name of a guide point.
Figure 4C:
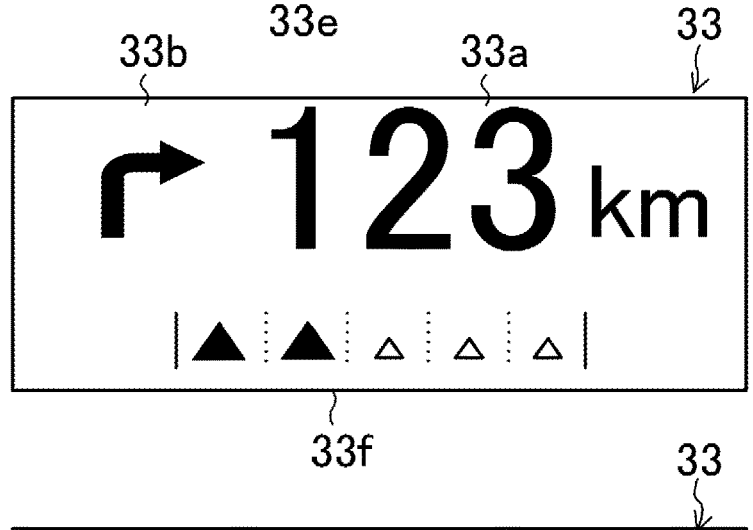
FIG. 4C illustrates an example of a guide image representing lane guide information.
Figure 4D:
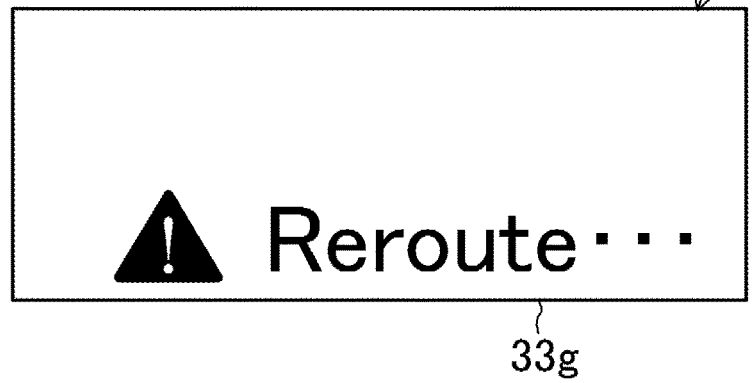
FIG. 4D illustrates an example of a guide image representing a reroute state.

As illustrated in FIG. 4A, in the various types of information display regions 33B, a remaining distance 33d from the current position to the destination may be displayed. As illustrated in FIG. 4B, in the various types of information display regions 33B, a name 33e of a guide point may be displayed. As illustrated in FIG. 4C, in the various types of information display regions 33B, lane guide information 33f may be displayed. As illustrated in FIG. 4D, in the various types of information display regions 33B, reroute information 33g indicating that the user is in a reroute state may be displayed. One of the estimated value 33c of the required time, the remaining distance 33d, the name 33e of the guide point, or the lane guide information 33f can be selected by, for example, user's operation on the first and second switches 23 and 24 and the smartphone 10, for example. The reroute information 33g is automatically displayed instead of other displays while rerouting is performed.

Figure 5A:
FIG. 5A illustrates an example of a guide image representing an incoming call state.
Figure 5B:
FIG. 5B illustrates an example of a guide image representing an outgoing call state.
Figure 5C:
FIG. 5C illustrates an example of a guide image representing a state during a call.
Figure 5D:
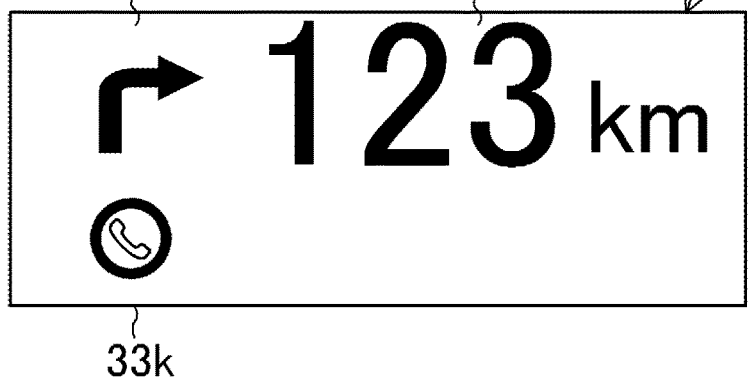
FIG. 5D illustrates an example of a guide image representing end of call.

As illustrated in FIG. 5A, in the various types of information display regions 33B, an incoming call mark 33h indicating that the telephone is an incoming call state may be displayed during an incoming call. As illustrated in FIG. 5B, in the various types of information display regions 33B, an outgoing call mark 33i indicating that the telephone is an outgoing call state may be displayed during an outgoing call. As illustrated in FIG. 5C, in the various types of information display regions 33B, a talking mark 33j indicating that the telephone is in a talking state may be displayed during a call. Together with each of the incoming call mark 33h, the outgoing call mark 33i, and the talking mark 33j, information on a person to whom the user calls (hereinafter referred to as a "partner"), such as a name and a title of the partner, can also be displayed. The information on the partner can be acquired from the smartphone 10. As illustrated in FIG. 5D, in the various types of information display regions 33B, an call end mark 33k indicating that the call is finished may be displayed only for a short time of about several seconds. The incoming call mark 33h, the outgoing call mark 33i, the talking mark 33j, and the call end mark 33k are automatically displayed based on information on a call transmitted from the smartphone 10, and have priorities to the other displays. When the incoming call mark 33h, the outgoing call mark 33i, the talking mark 33j, and the call end mark 33k are erased, previous information is displayed again.

Figure 6A:
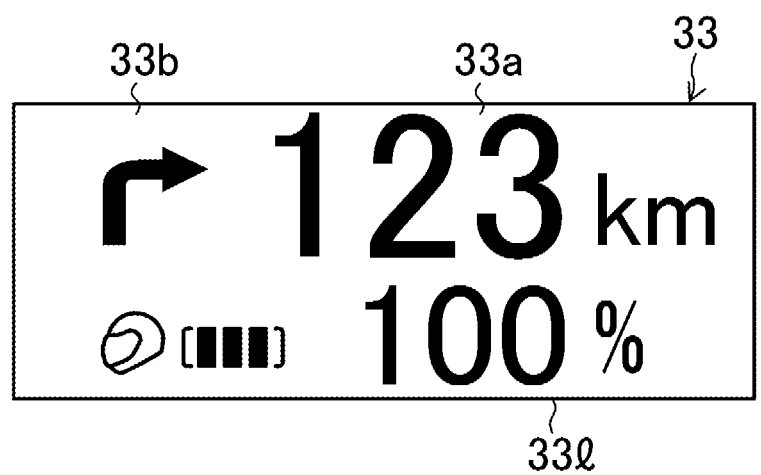
FIG. 6A illustrates an example of a guide image representing a battery remaining capacity of a head-up display device.
Figure 6B:
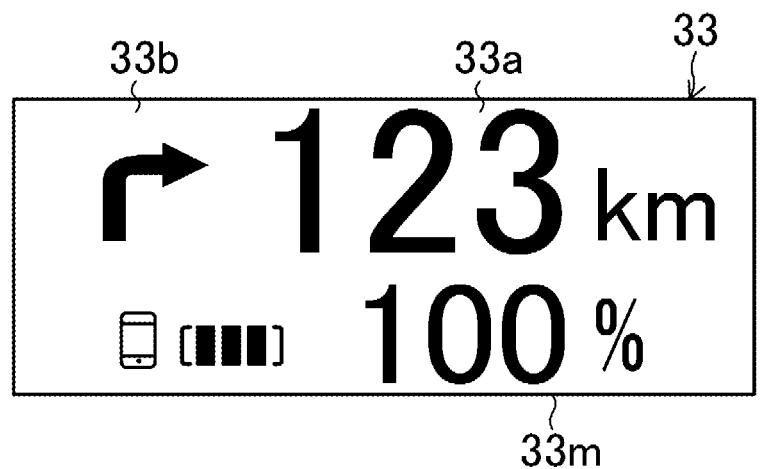
FIG. 6B illustrates an example of a guide image representing a battery remaining capacity of a smartphone.

As illustrated in FIG. 6A, in the various types of information display regions 33B, a battery remaining capacity 33l of the head-up display device 40 may be displayed. As illustrated in FIG. 6B, in the various types of information display regions 33B, a battery remaining capacity 33m of the smartphone 10 may be displayed. The battery remaining capacities 33l and 33m can be displayed using a combination with numerical values. The battery remaining capacities 33l and 33m are displayed instead of other displays by user's operation on the first and second switches 23 and 24, for example. After the display, the battery remaining capacities 33l and 33m disappear after display in a short time of about several seconds, and then, information before the display is displayed again.

Figure 7A:
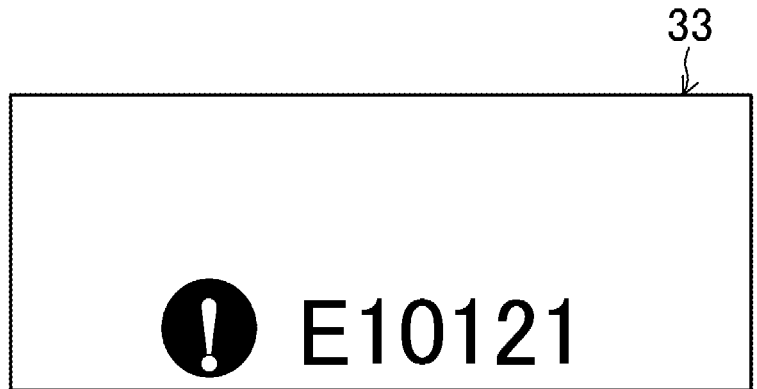
FIG. 7A illustrates an example of a guide image representing an error.
Figure 7B:
FIG. 7B illustrates an example of a guide image representing a state were communication is connected.
Figure 7C:
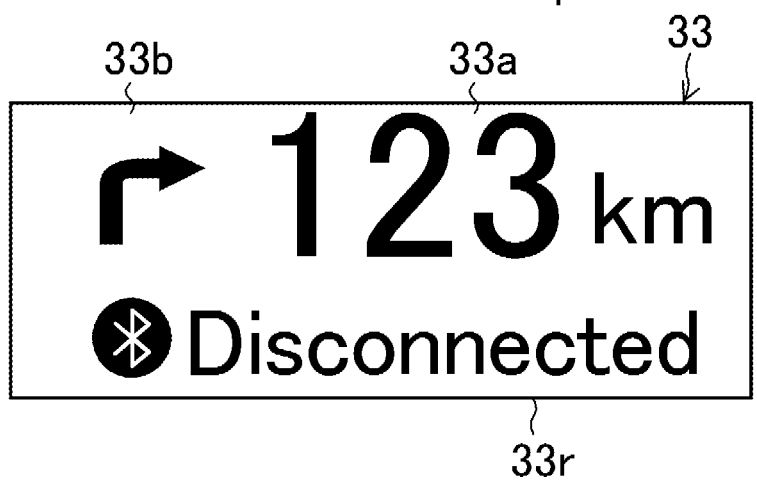
FIG. 7C illustrates an example of a guide image representing a state where communication is disconnected.

As illustrated in FIG. 7A, in the various types of information display regions 33B, an error mark 33n may be displayed. The error mark 33n is displayed instead of other displays in the event of, for example, malfunction of the device, and may be displayed for a long time or for a short time depending on the degree of the malfunction. The error mark 33n may include an error number. The error number is, for example, a number indicating a malfunction part of the device. As illustrated in FIG. 7B, in the various types of information display regions 33B, a connection mark 33p indicating that communication is connected may be displayed, specifically, the connection mark 33p may be displayed only for a short time of several seconds from a point of time when communication connection by the Bluetooth module 31 succeeded. As illustrated in FIG. 7C, in the various types of information display regions 33B, a disconnection mark 33r indicating a state where communication is disconnected may be displayed, and specifically, the disconnection mark 33r may be displayed only for a short time of several seconds from a point of time when communication by the Bluetooth module 31 is disconnected for some reason. While the error mark 33n, the connection mark 33p, and the disconnection mark 33r are displayed, a distance and a traveling direction are erased.

An output of a guide image by the image output section 32 can be forcibly stopped by pressing the first switch 23 shortly.

An operation of the thus-configured navigation system 1 will be described.

First, when a driver of, for example, a motorcycle wears the helmet 20 and presses and holds the first switch 23 while the smartphone 10 with the car navi app 14 running is held by the driver or attached to the motorcycle, for example, the display light emitting device 30 is actuated. The smartphone 10 with the car navi app 14 running transmits various types of information updated every second through wireless communication by the wireless communication interface 11. When wireless communication with the smartphone 10 by the Bluetooth module 31 succeeded after start-up, the display light emitting device 30 generates and outputs a guide image representing the connection mark 33p, as illustrated in FIG. 7B. While wireless communication with the smartphone 10 in which a path has been set is performed, a steady operation depicted in the flowchart of FIG. 8 is repeatedly performed. When the path is erased, the steady operation is stopped.

After the start of the steady operation, first, in step S101, the microcomputer 32a of the image output section 32 initializes a count value k to one. This value is set for convenience only.

Next, in step S102, the Bluetooth module 31 receives various types of information transmitted by the smartphone 10, such as various types of information including distance information to a next guide point. Thereafter, the process proceeds to step S103. In step S103, the microcomputer 32a of the image output section 32 determines whether a distance D (distance to a next guide point) indicated in the distance information received by the Bluetooth module 31 in step S102 is less than a predetermined reference distance R k or not. Here, R 1 to R 6 are set 5 km, 4 km, 3 km, 2 km, 1 km, and 0.5 km, respectively. That is, R 1 is the longest, and R 6 is the shortest. The distances of R 1 to R 6 are not limited to the distances described above, and may be set at any distances. The number of R k is not limited to six, and may be any number of two or more.

If the determination result is NO in step S103, the distance D to the next guide point is the predetermined reference distance R k or more, and in this case, the process proceeds to step S102. If R k is R 1, which is the longest, the reference distance is 5 km. The determination result NO in step S103 in this case means that the distance from the current position to the next guide point is 5 km or more. That is, the distance from the current position to the next guide point is sufficiently long, guidance to the next guide point is unnecessary. In this state, the process does not proceed to the guide image output step of step S106 or step S107, and returns to step S102, and distance information is received from the smartphone 10. Thereafter, the process proceeds to step S103, and the microcomputer 32a of the image output section 32 determines whether the distance D is less than the predetermined reference distance R k or not. The longest reference distance of R 1 is preferably 10 km or less, for example, and is preferably 8 km or less, and more preferably 5 km or less. Here, R 1 is preferably 3 km or more.

On the other hand, in step S103, if the determination result is YES in step S103 and the distance D is less than the predetermined reference distance R k, the process proceeds to step S105, and the microcomputer 32a of the image output section 32 determines whether count value k=6 or not. The state where the process proceeds to step S105 means that the distance D from the current position to the next guide point is less than 5 km, and the time before reaching the next guide point is short. If the determination result is NO in step S105 and it is determined that the relationship of k=6 is not established, that is, count value k=1 to 5, the process proceeds to step S107, and the image output section 32 continues to generate a guide image and emit display light for causing the combiner 26 to display the guide image. Accordingly, the guide image is displayed and the time of this display can be set at, for example, 10 seconds, but the display time may be changed depending on the type of the guide image. Specifically, for 10 seconds, the GDC 32c of the image output section 32 generates a guide image upon an instruction of the microcomputer 32a and the LCOS 32d emits display light for causing the combiner 26 to display the guide image generated by the GDC 32c. In addition, since the distance information received by the Bluetooth module 31 is updated every second, the generated guide image is also updated at every second. After a lapse of 10 seconds from the start of emission of display light, the emission of display light is finished. This process in step S107 is a normal output process of emitting display light for displaying a guide image. After a lapse of 10 seconds from the start of emission of display light, the normal output process is finished, and the process transitions to a stop process of stopping emission of display light. The stop process is performed without constant display of a guide image, and thus, power consumption can be reduced.

In step S108 subsequent to step S107, the microcomputer 32a of the image output section 32 increments the count value k by one, and the process returns to step S102, and distance information is received from the smartphone 10. Thereafter, the process proceeds to step S103. In step S103, if R k is equal to R 2, it is determined whether the distance D from the current position to the next guide point is less than 4 km or not, if R k is equal to R 3, it is determined whether the distance D from the current position to the next guide point is less than 3 km or not, if R k is equal to R 4, it is determined whether the distance D from the current position to the next guide point is less than 2 km or not, if R k is equal to R 5, it is determined whether the distance D from the current position to the next guide point is less than 1 km or not, and if R k is equal to R 6, it is determined whether the distance D from the current position to the next guide point is less than 0.5 km or not.

For example, supposing that the distance D from the current position to the next guide point is 5 km or more and the user is traveling from the current position toward the next guide point. A reference distance in the determination in step S103 is R 1. If the distance D from the current position to the next guide point becomes less than 5 km, the determination result is YES in step S103, the determination result is NO in step S105, a guide image is displayed only for 10 seconds in step S107 (normal output process), and in step S108, R k is R 2, and the process proceeds to step S102. Before start of the normal output process and after end of the normal output process, the stop process of stopping emission of display light is performed.

If the user further approaches the guide point and the distance D from the current position to the guide point becomes less than 4 km, the determination in step S103 uses R 2 as the reference distance, and thus, the determination result is YES in step S103, and the determination result is NO in step S105. Then, in step S107, a guide image is displayed only for 10 seconds, and R k is R 3 in step S108, and the process proceeds to step S102.

If the user further approaches the guide point and the distance D from the current position to the guide point becomes less than 3 km, the determination in step S103 uses R 3 as the reference distance, and thus, the determination result is YES in step S103, and the determination result is NO in step S105. Then, in step S107, a guide image is displayed only for 10 seconds, and R k is R 4 in step S108, and the process proceeds to step S102. Thereafter, if the user further approaches the guide point and the distance D from the current position to the guide point becomes less than 2 km, the determination in step S103 uses R 4 as the reference distance, and thus, the determination result is YES in step S103, and the determination result is NO in step S105. Then, in step S107, a guide image is displayed only for 10 seconds, and R k is R 5 in step S108, and the process proceeds to step S102. Thereafter, if the user further approaches the guide point and the distance D from the current position to the guide point becomes less than 1 km, the determination in step S103 uses R 5 as the reference distance, and thus, the determination result is YES in step S103, and the determination result is NO in step S105. Then, in step S107, a guide image is displayed only for 10 seconds, and R k is R 6 in step S108, and the process proceeds to step S102. That is, if it is determined that the distance from the current position to the next guide point is less than 5 km, the image output section 32 repeatedly performs the normal output process of emitting display light for displaying a guide image and the stop process of stopping emission of display light at predetermined timings. Thus, the user can check the next traveling direction multiple times before reaching the guide point.

Then, if the user further approaches the guide point and the distance D from the current position to the next guide point becomes less than 0.5 km, determination in step S103 uses R 6 as the reference distance, and thus, the determination result is YES in step S103, and count value k=6 in step S105, and thus, the determination result is YES, and the process proceeds to step S106.

In step S106, the image output section 32 continues to emit display light for causing the combiner 26 to display a guide image until the distance D indicated by the distance information received by the Bluetooth module 31 becomes zero. Accordingly, the next traveling direction can be continuously presented to the user from a point close to the guide point to the guide point. During this presentation, the distance information received by the Bluetooth module 31 is updated every second, and thus, the generated display image is also updated at every second. When the distance D indicated by the distance information reaches zero, the image output section 32 erases the display light to thereby finish display of the guide image in the steady operation. In this manner, the steady operation is finished. After the end of the steady operation, the guide point is switched to another guide point, and thus, the steady operation described above is continuously performed. In some cases, the guide point is a destination. In such cases, the distance D is a distance from the current position to the destination.

The image output section 32 of the display light emitting device 30 is configured such that while the operation depicted by the flowchart of FIG. 8 is repeatedly performed and no guide image is output, that is, while the stop process of stopping emission of display light is performed, when a priority display request for a guide image is detected, the priority output process of emitting display light for displaying the guide image prior to the stop process is continuously performed for a given time.

The priority display request for the guide image is, for example, a display operation of the guide image performed by the user. In this case, the image output section 32 detects a display operation of the guide image performed by the user as the priority display request of the guide image. The display operation of a guide image is, for example, an operation performed when the user wants to check a next traveling direction, and specifically, an operation of pressing one of the first and second switches 23 and 24, for example. When the operation of pressing one of the first and second switches 23 and 24 is detected while the image output section 32 performs the stop process, the priority output process is continuously performed for a given time.

Examples of the priority display request include, as well as the operation of pressing one of the first and second switches 23 and 24, a state where wireless communication of the smartphone 10 with the wireless communication interface 11 by the Bluetooth module 31 is disconnected and then connected again, a state where the display light emitting device 30 is actuated, a state where emission of display light by the image output section 32 is restarted from a forcibly stopped state, a state where the guide point is switched, a state where rerouting is performed, a state where the telephone comes to be in an incoming call state, a state where the telephone comes to be in an outgoing call state, a state where the telephone comes to be in a talking state, a state where the call ends, and a state where traffic congestion information is received. When the image output section 32 detects one of these states, the image output section 32 determines that a priority display request for a guide image is issued, and continuously performs the priority output process for a given time.

Figure 9:
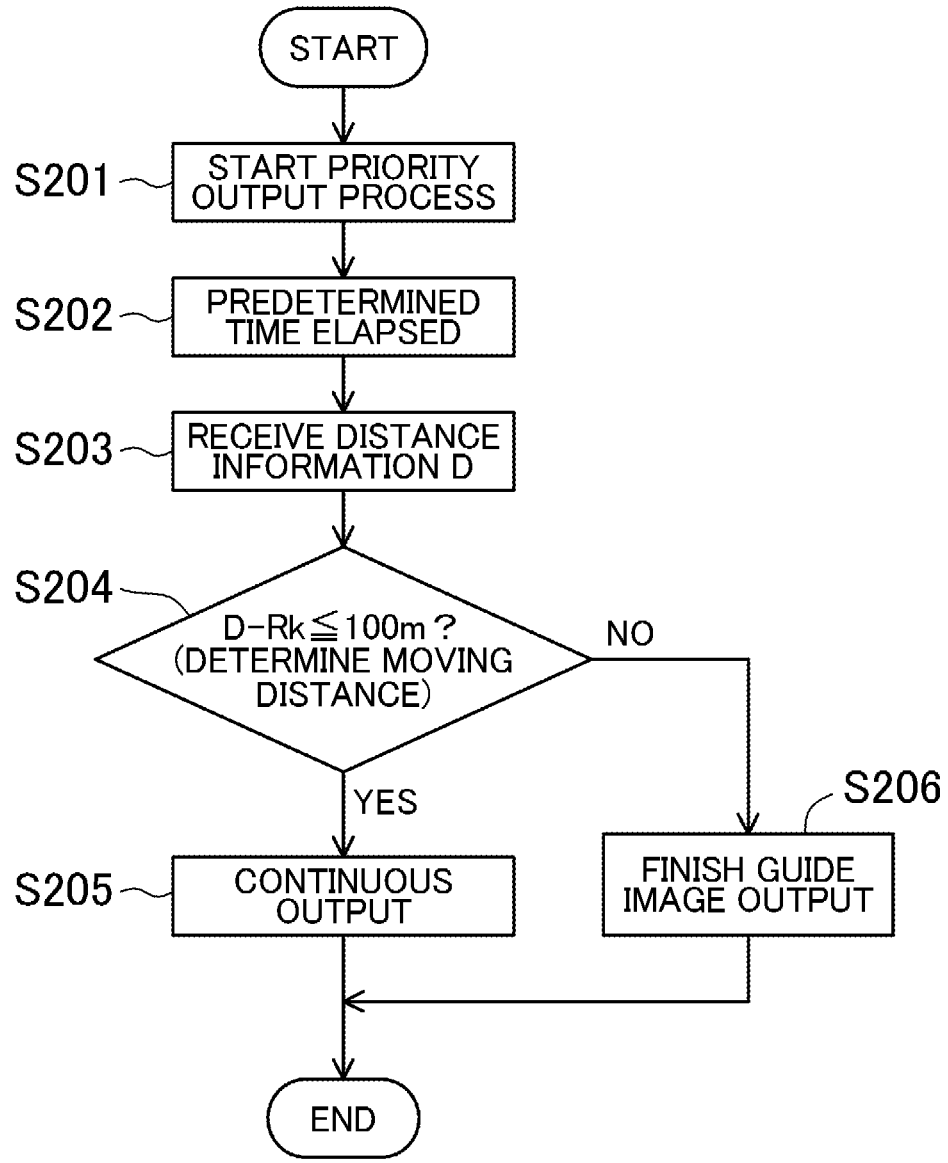
FIG. 9 is a flowchart depicting a temporary operation executed by the display light emitting device according to the first embodiment of the present disclosure.

Specifically, this process is depicted in the flowchart of FIG. 9, and the operation depicted by the flowchart of FIG. 9 can also be referred to as a temporary operation in order to distinguish the operation from a normal operation depicted by the flowchart of FIG. 8. The operation depicted by the flowchart of FIG. 9 is executed in parallel with the process depicted by the flowchart of FIG. 8, and is started when a priority display request for a guide image is detected while the image output section 32 performs the stop process. After the start, in step S201, the image output section 32 starts emission of display light for causing the combiner 26 to display a guide image. Step S201 is a priority output process start step.

Next, in step S202, the microcomputer 32a of the image output section 32 waits for a lapse of a predetermined time (e.g., any time from several seconds to 10 seconds) from the start of emission of display light in step S201. After a lapse of the predetermined time, the process proceeds to step S203. The predetermined time in step S202 is a minimum display time of a guide image, and can be changed for each guide image. Since distance information received by the Bluetooth module 31 is updated every second, a guide image generated during waiting for a lapse of the predetermined time is also updated every second.

Thereafter, in step S203, the Bluetooth module 31 receives distance information transmitted from the smartphone 10, and the process proceeds to step S204.

In step S204, the microcomputer 32a of the image output section 32 obtains a distance calculated by subtracting R k from the distance D from the current position to the next guide point received by the Bluetooth module 31 in step S203, and determines whether the obtained distance is less than or equal to 100 m or not. For example, if the distance D from the current position to the next guide point is 1100 m and R k is R 5 (1 km), the distance calculated by subtracting R 5 from the distance D is 100 m, and thus, the determination result is YES in step S204. On the other hand, if the distance D from the current position to the next guide point is 1200 m and R k is R 5 (1 km), the distance calculated by subtracting R 5 from the distance D is 200 m, and thus, the determination result is NO in step S204.

The state where the distance calculated by subtracting R k from the distance D is 100 m or less means that the time necessary for the user to reach R k is short. The state where the distance calculated by subtracting R k from the distance D exceeds 100 m means that the time necessary for the user to reach R g is long. As shown in FIG. 8, when the distance D becomes less than R k, the normal output process starts. Thus, in step S204 in FIG. 9, when the priority output process is performed (step S201), an interval estimation of estimating an interval from the end of the priority output process to the start of the normal output process performed after the priority output process, can be performed based on the distance information. The interval estimation may be performed based on time information. For example, since a display time of a guide image by the priority output process is previously determined, the end time of the priority output process can be calculated. The start time of the normal output process can be calculated based on velocity information and distance information. Thus, the interval estimation described above may be performed by calculating the end time of the priority output process and the start time of the normal output process performed after the priority output process, and obtaining an interval between these times.

If the interval obtained by the interval estimation in step S204 is less than a predetermined value, the determination result is YES, and the process proceeds to step S205. In step S205, a guide image output in the priority output process started in step S201 is continuously output until the next normal output process is started. That is, if the interval between the priority output process and its subsequent normal output process is short, the priority output process continues until the normal output process starts. Accordingly, the guide image can remain displayed by the combiner 26, and thus, a burden on the eyes of the user wearing the helmet 20 can be reduced, as compared to a process of displaying a guide image immediately after erasing the guide image.

On the other hand, if the distance obtained by the interval estimation in step S204 is the predetermined or more, the determination result is NO, and the process proceeds to step S206. In this case, a sufficient time can be obtained from the end of the priority output process to the start of the next normal output process, and thus, an output of a guide image by the priority output process can be finished at a predetermined time.

After the end of step S202 and before the start of step S205 or step S206, the image output section 32 continues emission of display light. The time from the end of the step S202 to the start of step S205 or step S206 may be a short time of several milliseconds. That is, step S203 and step S204 can be performed immediately before step S205 or step S206 is performed.

If emission of display light by the steady operation (step S106 or step S107) is started while the temporary operation is performed, the temporary operation is finished, and priority is given to the normal output process.

Figure 10:
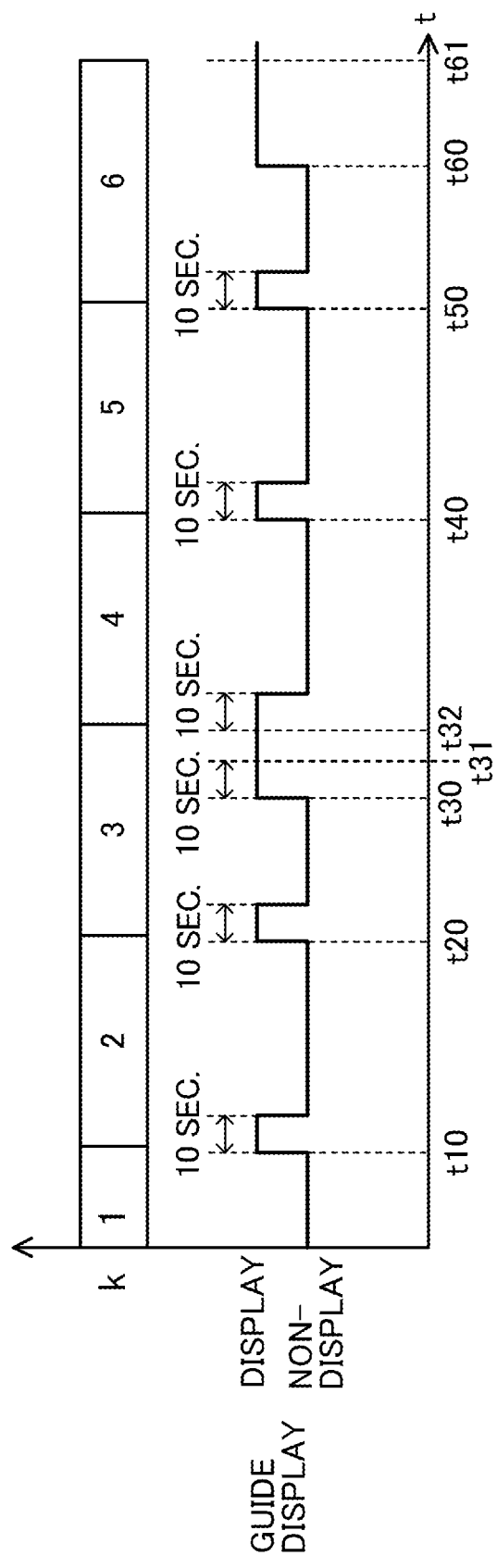
FIG. 10 is a timing chart showing an example operation of the display light emitting device according to the first embodiment of the present disclosure.

Thus, the display light emitting device 30 according to the first embodiment operates as depicted by the timing chart of FIG. 10, for example, while wireless communication with the smartphone 10 by the Bluetooth module 31 is connected after start-up. In FIG. 10, t10, t20, t32, t40, t50, and t60 are timings when a normal output process is performed. Specifically, t10 is a timing when the distance D from the current position to the next guide point becomes less than 5 km, t20 is the timing when the distance D from the current position to the next guide point becomes less than 4 km, t32 is the timing when the distance D from the current position to the next guide point becomes less than 3 km, t40 is the timing when the distance D from the current position to the next guide point becomes less than 2 km, t50 is the timing when the distance D from the current position to the next guide point becomes less than 1 km, and t60 is the timing when the distance D from the current position to the next guide point becomes less than 0.5 km. In addition, t61 is a timing when the distance D from the current position to the next guide point becomes zero.

In the chart, t30 is a timing when the image output section 32 detects a priority display request for a guide image and starts a priority output process. An end time of the priority display request is a time when 10 seconds has elapsed from the start of the priority output process (t30), that is, t31. An interval between the end time of the priority display request (t31) and the timing of starting a next normal output process (t32) is estimated (step S204). In this example, since the interval is short, a case where display of a guide image by the priority output process continues to t32 is shown.

Thus, in the first embodiment, if the user gradually approaches the next guide point and the distance from the current position to the guide point becomes less than the predetermined distance during traveling, since the normal output process and the stop process of guide images are repeatedly performed multiple times at predetermined timings, the user can check the next traveling direction before reaching the guide point.

If a priority display request for a guide image is issued, the priority output process of the guide image is performed prior to the stop process of stopping output of the guide image, the user can check the next traveling direction when the user wants to check, for example. If the interval between the priority output process and its subsequent normal output process is short, the priority output process continues until the normal output process starts. Accordingly, the guide image can be kept displayed by the combiner, and thus, a burden on the eyes of the user wearing the helmet can be reduced, as compared to a process of displaying a guide image immediately after erasing the guide image.

Second Embodiment

Figure 11:
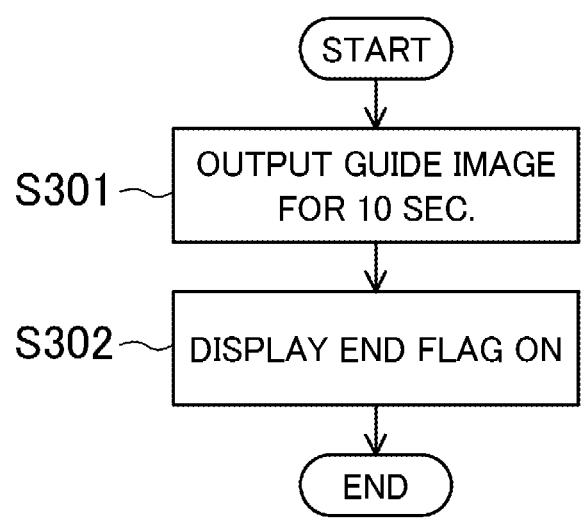
FIG. 11 is a view for a second embodiment and corresponds to FIG. 9.
Figure 12:
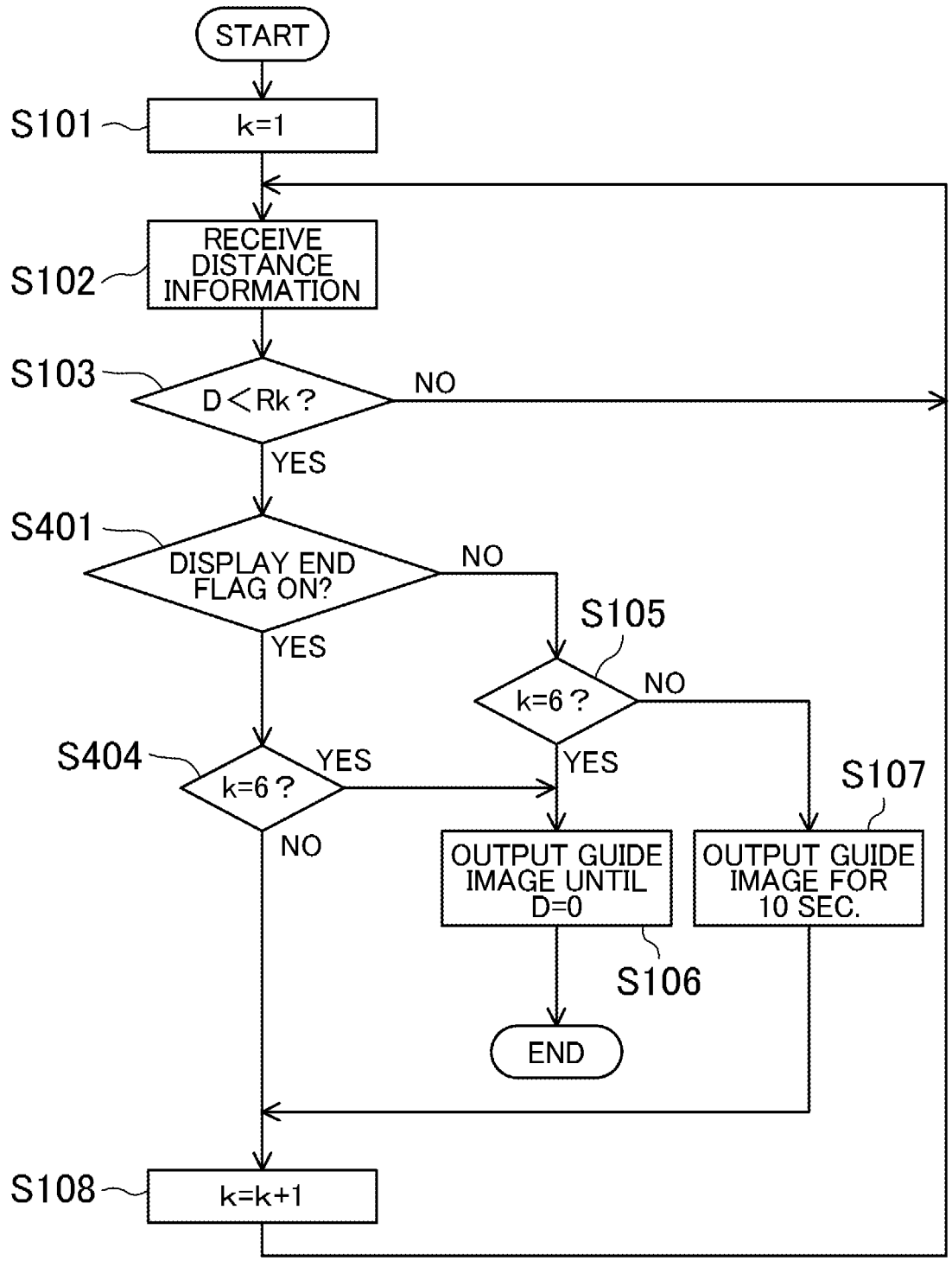
FIG. 12 is a view for the second embodiment and corresponds to FIG. 8.
Figure 13:
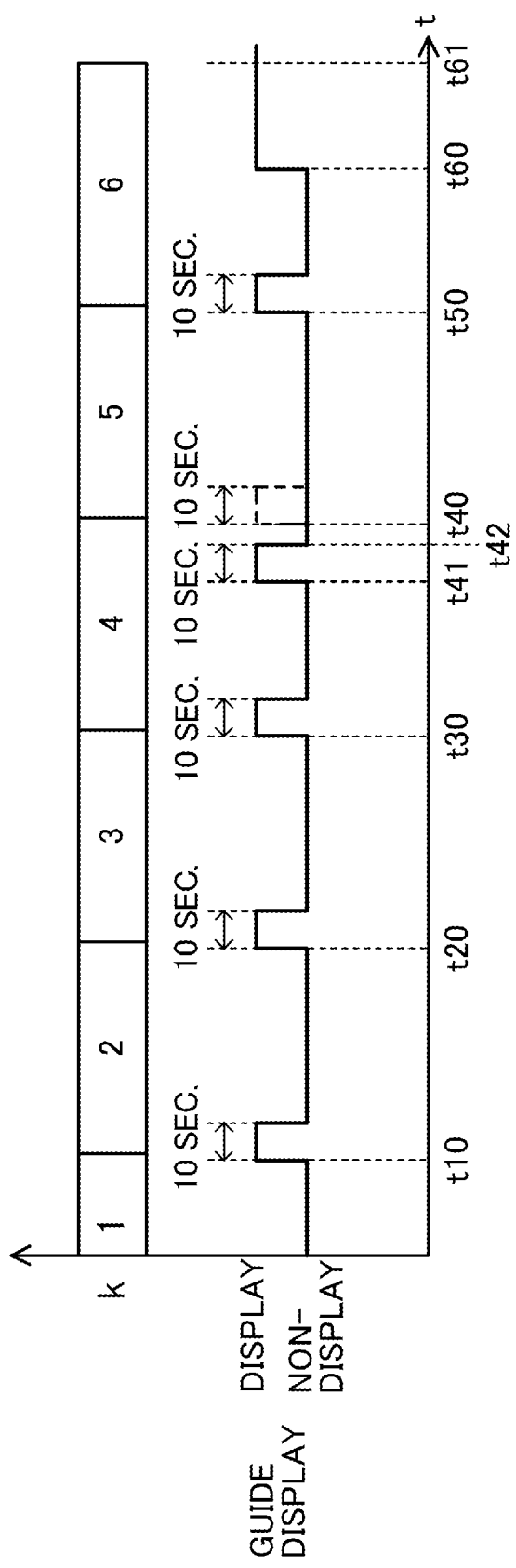
FIG. 13 is a view for the second embodiment and corresponds to FIG. 10.

FIGS. 11 through 13 are directed to a second embodiment of the present disclosure. The second embodiment is the same as the first embodiment in that an interval after end of a priority output process to start of a normal output process performed after the priority output process is estimated. However, the second embodiment is different from the first embodiment in that the image output section 32 is configured to inhibit the normal output process if the estimated interval is less than a predetermined value. In the following description, components already described in the first embodiment are denoted by the same reference characters, and only different components will be described in detail.

FIG. 11 is a flowchart depicting a temporary operation of a display light emitting device 30 according to the second embodiment of the present disclosure. In the second embodiment, when the priority output process starts, first, in step S301, an image output section 32 of the display light emitting device 30 continues to emit display light for causing a combiner 26 to display a guide image for 10 seconds. Distance information received by a Bluetooth module 31 is updated every second, and thus, a generated guide image is also updated every second. After a lapse of 10 seconds from the start of emission of display light, the emission of display light is finished.

Next, in step S302, a microcomputer 32a of the image output section 32 turns a display end flag on, and finishes a temporary operation.

In a steady operation, as depicted by the flowchart of FIG. 12, if the microcomputer 32a of the image output section 32 determines YES in step S103, the process proceeds to step S401. In step 401, the microcomputer 32a of the image output section 32 determines whether the display end flag is ON or not, and if the display end flag is ON, the process proceeds to step S404, whereas if the display end flag is OFF, the process proceeds to step S105.

In step 404, the microcomputer 32a of the image output section 32 determines whether a count value k is six or nor. If the count value k is six, the process proceeds to step S106, and output of a guide image continues until a distance D from a current position to a next guide point becomes zero. Then, the steady operation finishes, and the display end flag is turned off. After the end of the steady operation, the guide point is switched to another end point, and the next steady operation continues to be performed. If the count value k is not six, the process proceeds to step S108.

As described above, in the second embodiment, conditions for performing emission of display light in the steady operation include a display interval condition in addition to a distance condition.

The display light emitting device 30 according to the second embodiment operates as depicted by the timing chart of FIG. 13, for example, while wireless communication with a smartphone 10 by the Bluetooth module 31 is connected after start-up. In FIG. 13, t41 is a timing when the image output section 32 detects a priority display request for a guide image and starts a priority output process, and t42 is a timing when the priority output process is finished. First, when the priority output process is performed, the image output section 32 estimates an interval from the end of the priority output process (t42) to the start of the normal output process performed after the priority output process (t40). This interval estimation can be performed similarly to the first embodiment.

If the interval obtained by the interval estimation is less than a predetermined value and t42 is close to t40, the image output section 32 inhibits a normal output process that was expected to start at t40. That is, the process of step S107 is not performed. If t40 is performed after t42, the normal output process is performed at t40 in the middle of the priority output process started at t41.

Thus, in the second embodiment, if the interval between the priority output process and its subsequent normal output process is short, the priority output process is performed and the normal output process is inhibited. Thus, the normal output process is not performed immediately after the priority output process. Accordingly, flickers can be prevented or reduced so that a burden on the eyes of the user wearing the helmet can be thereby reduced.

The microcomputer 32a of the image output section 32 determines whether a value obtained by subtracting R k from the distance D is 100 m or less in the time estimation in step S204. Alternatively, the microcomputer 32a may determine whether the obtained value is less than or equal to other predetermined set distances (e.g., any distance between 50 m to 200 m) or not.

The time estimation in step S204 is performed only based on a distance indicated by distance information, but may be performed based on a velocity indicated by velocity information received by the Bluetooth module 31 in addition to the distance indicated by the distance information. Specifically, a required time may be calculated by dividing the distance indicated by the distance information by velocity indicated by velocity information such that if the calculated required time is less than a predetermined reference value, the required time is determined to be short, whereas if the calculated required time is less than the predetermined reference value, the required time is determined not to be short. In this case, a more accurate determination result can be obtained, as compared to the case of performing time estimation only based on the distance indicated by the distance information.

In the second embodiment, the display interval condition is a condition that the moving distance from the end of emission of display light in the previous temporary operation is 100 m or more, but may be a condition that the moving distance is greater than or equal to a predetermined value other than 100 m. The display interval condition may be a condition that a time elapsed from the end of emission of display light in the previous temporary operation is greater than or equal to a predetermined value.

In the first and second embodiments, the image output section 32 may emit display light such that a guide image may be faded in at the start of display of a guide image by the steady operation and the temporary operation, and the guide image is faded out at the end of display of the guide image by the steady operation and the temporary operation. Accordingly, an image displayed by the combiner 26 gradually becomes bright at the start of display of the guide image, whereas the image displayed by the combiner 26 gradually becomes dark at the end of display of the guide image. Thus, a burden on the eyes of the user wearing a helmet 20 can be reduced.

Third Embodiment

Figure 14:
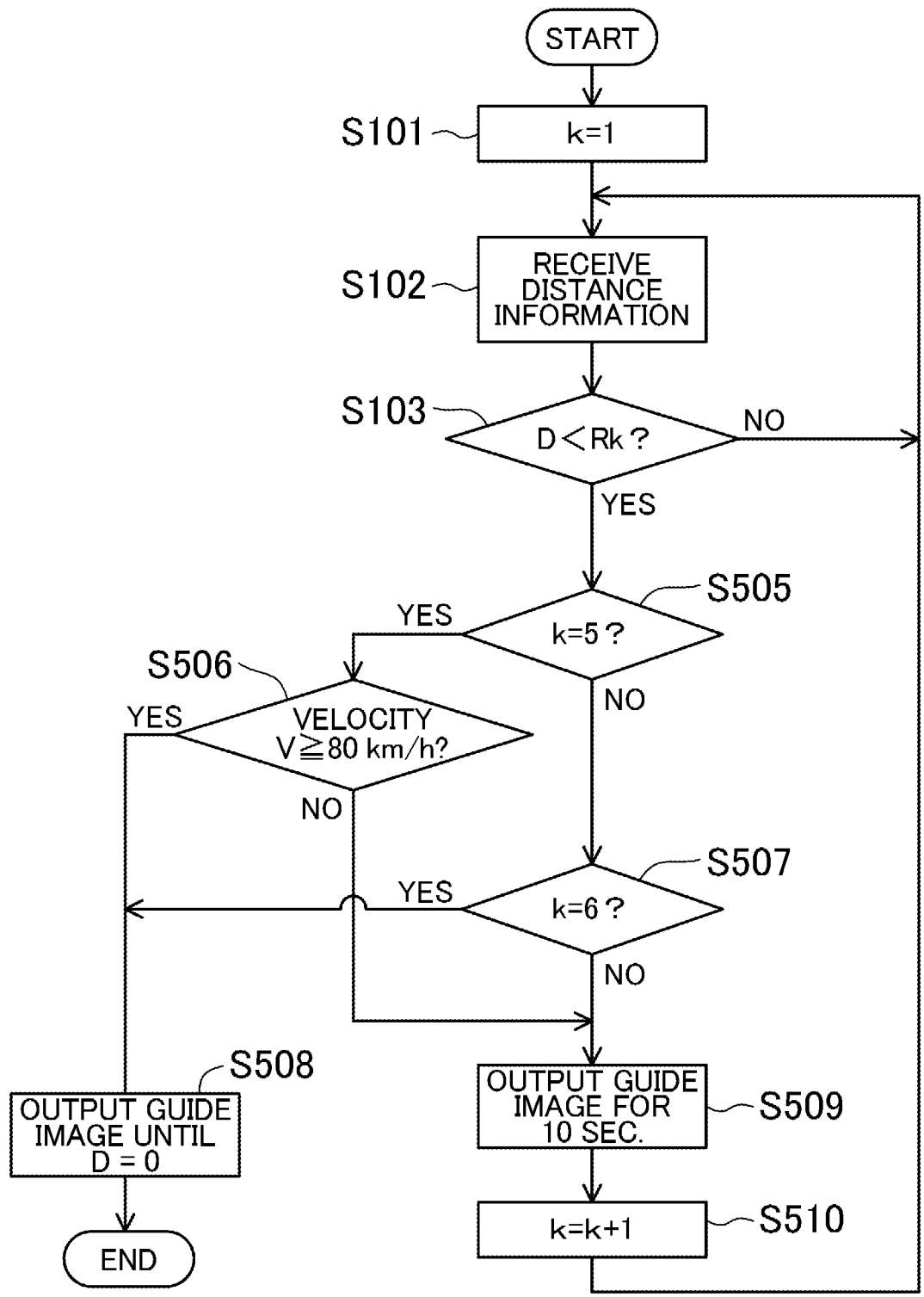
FIG. 14 is a view for a third embodiment and corresponds to FIG. 8.

FIG. 14 is a flowchart according to a third embodiment of the present disclosure. The third embodiment is different from the first embodiment in that distance determination on whether a distance indicated by distance information acquired by an information acquirer is less than a first predetermined distance or not and velocity determination on whether a moving velocity indicated by velocity information acquired by the information acquirer is greater than or equal to a predetermined velocity or not are performed, and if the distance is determined to be less than the first predetermined distance in the distance determination and the moving velocity is determined to be greater than or equal to the predetermined velocity in the velocity determination, continuous output of continuously emitting display light for displaying a guide image is performed, whereas if the distance is determined to be less than the first predetermined distance in the distance determination and the moving velocity is determined to be less than the predetermined velocity in the velocity determination, a stop process of emitting display light for displaying a guide image for a predetermined time and then stopping the emission is performed. The other part of the third embodiment is the same as that in the first embodiment, and thus, the same components as those in the first embodiment are denoted by the same reference characters, and different components will be described in detail.

While wireless communication with a smartphone 10 in which a path has been set is performed, an operation depicted in the flowchart of FIG. 14 is repeatedly performed. When the path is erased, the operation is stopped. Steps S101 through S103 are the same as those in FIG. 12.

On the other hand, in step S103, if the determination result is YES and a distance D is less than a predetermined reference distance R k, the process proceeds to step S505, and a microcomputer 32*a* of an image output section 32 determines whether a count value k is five or not. Here, R 5 is 1 km, and the distance represented by R 5 is a first predetermined distance. In Step S505, an image output section 32 performs distance determination on whether a distance indicated by velocity information received by a Bluetooth module 31 is less than a first predetermined distance or not.

In step S505, if the determination result is YES and the count value k is five, the process proceeds to step S506. The proceeding to step S506 means that a distance D from a current position to a next guide point is less than 1 km, and a time to reach the next guide point is short. In step S506, the microcomputer 32*a* of the image output section 32 performs velocity determination on whether a velocity V indicated by velocity information received by the Bluetooth module 31 in step S102 is greater than or equal to 80 km per hour (predetermined velocity) or not. If the velocity V is 80 km per hour or more, that is, a velocity condition is satisfied, the process proceeds to step S508, whereas if the velocity V is less than 80 km per hour, that is, the velocity condition is not satisfied, the process proceeds to step S509. Step S506 is a velocity determination step.

In step S508, the image output section 32 starts continuous output of continuously emitting display light for causing a combiner 26 to display a guide image until the distance D indicated by distance information received by the Bluetooth module 31 reaches zero, that is, a user reaches a guide point. That is, the image output section 32 is configured to continue emission of display light for displaying a guide image until the user reaches the guide point if the distance indicated by the distance information received by the Bluetooth module 31 is determined to be less than 1.0 km (first predetermined distance) and the velocity is determined to be the predetermined velocity or more in the velocity determination in step S506. After proceeding to step S508, the velocity V can decrease below 80 km per hour in some cases. In such cases, the image output section 32 continuously emits display light for causing the combiner 26 to display a guide image. In step S508, the guide image illustrated in FIG. 3, the guide image of the name of a guide point illustrated in FIG. 4B, and the guide image of the lane guide information illustrated in FIG. 4C, for example, can be displayed, and these guide images can be switched by the user. The guide images illustrated in FIGS. 5A through 5D, for example, are displayed instead of the guide images illustrated in, for example, FIGS. 3, 4B, and 4C when a display timing arrives.

During the continuous output of a guide image, a GDC 32*c* of the image output section 32 generates a guide image based on an instruction of the microcomputer 32*a*, and a LCOS 32*d* emits display light for causing the combiner 26 to display the guide image generated by the GDC 32*c*. While the continuous output is performed, since the distance information received by the Bluetooth module 31 is updated every second, the generated guide image is also updated every second. When the distance D indicated by the distance information becomes zero, the image output section 32 puts off display light, thereby finishing the continuous output.

On the other hand, if the determination result is NO and the count value k is not five in step S505, that is, it is determined that the count value k is 1 to 4, or 6, the process proceeds to step S507. In step S507, the microcomputer 32*a* of the image output section 32 determines whether the count value k is six or not. Here, R 6 is 0.5 km, and the distance represented by R 6 is a second predetermined distance shorter than the first predetermined distance. In step S507, the image output section 32 determines whether the distance indicated by velocity information received by the Bluetooth module 31 is less than the second predetermined distance or not.

If the determination result is YES and the count value k is six in step S507, the process proceeds to step S508. The proceeding from step S507 to step S508 means that the distance D from the current position to the next guide point is less than 0.5 km and the time to reach the next guide point is shorter.

On the other hand, if the determination result is NO and the count value k is not six in step S507, the process proceeds to step S509. The proceeding to step S509 means a situation where the distance D from the current position to the next guide point is 1.0 km or more and the distance from the current position to the next guide point is long. In step S509, the image output section 32 continuously emits display light for causing the combiner 26 to display a guide image for a predetermined time (e.g., several seconds to about 10 seconds). During this emission, the distance information received by the Bluetooth module 31 is updated every second, and thus, the generated display image is also updated at every second. After a lapse of the predetermined time from the start of emission of display light, emission of display light is finished, and the process proceeds to step S510. In step S510, the microcomputer 32*a* of the image output section 32 increments the count value k by one, and the process returns to step S102. In this manner, the series of operations described above are finished. After the end of the operations, the guide point is switched to another guide point, and the next operation continues to be performed.

Specific examples will be described below. For example, supposing that the distance D from the current position to the next guide point is 5 km or more and the user is traveling from the current position toward the next guide point Immediately after the start of operation, a reference distance of determination in step S103 is R 1.

Thereafter, when the user approaches the next guide point and the distance D from the current position to the next guide point becomes less than 5 km, the determination result is YES in step S103, the determination result is NO in step S505, and the determination result is also NO in step S507. Then, the process proceeds to step S509, and a guide image is displayed for, for example, 10 seconds. This is a normal output process. Specifically, if the distance is determined to be 1.0 km (first predetermined distance) or more in distance determination, the image output section 32 does not perform velocity determination in step S506, and emits display light for displaying a guide image for a predetermined time, and then performs a stop process of stopping the emission. Thereafter, R k changes to R 2 in step S510, and the process proceeds to step S102. Before start of the normal output process and after end of the normal output process, the stop process of stopping emission of display light is performed.

When the user further approaches the guide point and the distance D from the current position to the guide point becomes less than 4 km, determination is performed using R 2 as a reference distance in step S103, and thus, the determination result is YES, the determination result is NO in step S505, and the determination result is also NO in step S507. Then, the process proceeds to step S509, and a guide image is displayed for, for example, 10 seconds (normal output process). Thereafter, R k changes to R 3 in step S510, and the process proceeds to step S102.

When the user further approaches the guide point and the distance D from the current position to the guide point becomes less than 3 km, determination is performed using R 3 as a reference distance in step S103, and thus, the determination result is YES, the determination result is NO in step S505, and the determination result is also NO in step S507. Then, the process proceeds to step S509, and a guide image is displayed for, for example, 10 seconds (normal output process). Thereafter, R k changes to R 4 in step S510, and the process proceeds to step S102.

When the user further approaches the guide point and the distance D from the current position to the guide point becomes less than 2 km, determination is performed using R 4 as a reference distance in step S103, and thus, the determination result is YES, the determination result is NO in step S505, and the determination result is also NO in step S507. Then, the process proceeds to step S509, and a guide image is displayed for, for example, 10 seconds (normal output process). Thereafter, R k changes to R 5 in step S510, and the process proceeds to step S102.

When the user further approaches the guide point and the distance D from the current position to the next guide point becomes less than 1 km, determination in step S103 uses R 5 as the reference distance, and thus, the determination result is YES, and velocity determination is performed in step S506. As a result of the velocity determination, if the moving velocity is determined to be high, the guide image continues to be displayed in step S508, and thus, even if the time to reach the next guide point is short, the user can check a traveling direction at the next guide point. On the other hand, even in a case where the distance D from the current position to the guide point is less than 1 km, if the moving velocity is determined to be low, the guide image is displayed for a predetermined time in step S509, and then the stop process of display light is performed. Thus, the user is less likely to feel annoyed. Thereafter, R k changes to R 6 in step S510, and the process proceeds to step S102.

When the user further approaches the guide point and the distance D from the current position to the next guide point becomes less than 0.5 km, determination in step S103 uses R 6 as the reference distance, and thus, the determination result is YES, the determination result is NO in step S505, and the determination result is YES in step S507. Then, a guide image continues to be displayed until the user reaches the guide point in step S508. Specifically, the image output section 32 is configured to perform continuous output of continuously emitting display light for displaying a guide image without velocity determination in step S506, if the distance indicated by distance information received by the Bluetooth module 31 is determined to be less than 0.5 km (second predetermined distance).

Thus, in this embodiment, in a case where the user gradually approaches the guide point, the distance from the current position to the guide point becomes less than 1.0 km, and the moving velocity is as high as 80 km per hour or more, a guide image continues to be displayed. Thus, even if the time to reach the next guide point is short, the user is capable of checking a traveling direction at the next guide point. On the other hand, even if the distance from the current position to the guide point is less than 1.0 km, as long as the moving velocity is less than 80 km per hour, the guide image is displayed for a predetermined time and then erased. Thus, the user is less likely to feel annoyed.

In this embodiment, the velocity condition is that the velocity V indicated by the velocity information received by the Bluetooth module 31 is 80 km per hour or more, but may be a condition that the velocity V is greater than or equal to another predetermined reference velocity. The velocity V may be set within the range from 60 km per hour to 90 km per hour, both inclusive.

Fourth Embodiment

Figure 15:
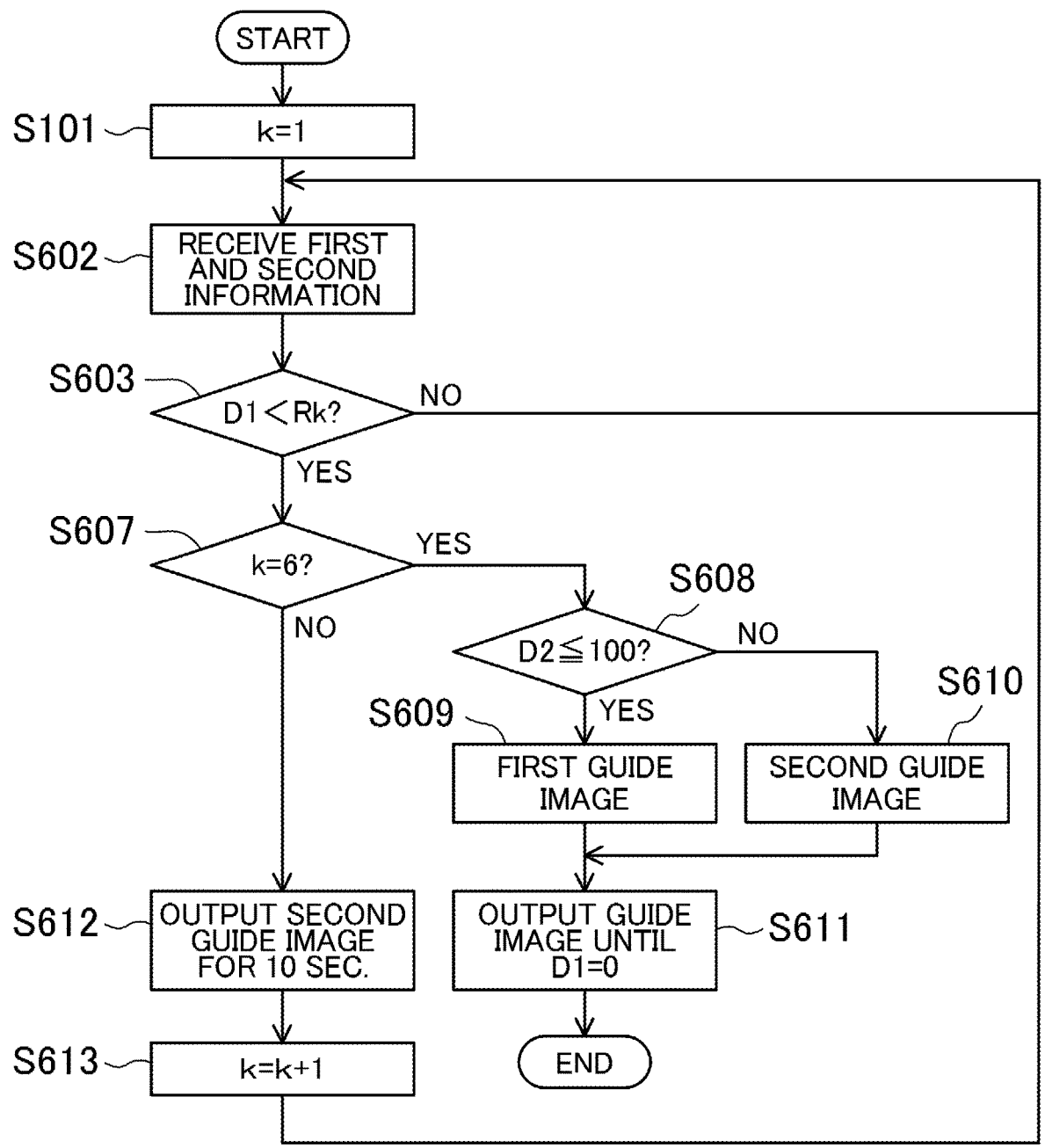
FIG. 15 is a flowchart depicting an operation executed by a display light emitting device according to a fourth embodiment of the present disclosure.
Figure 16:
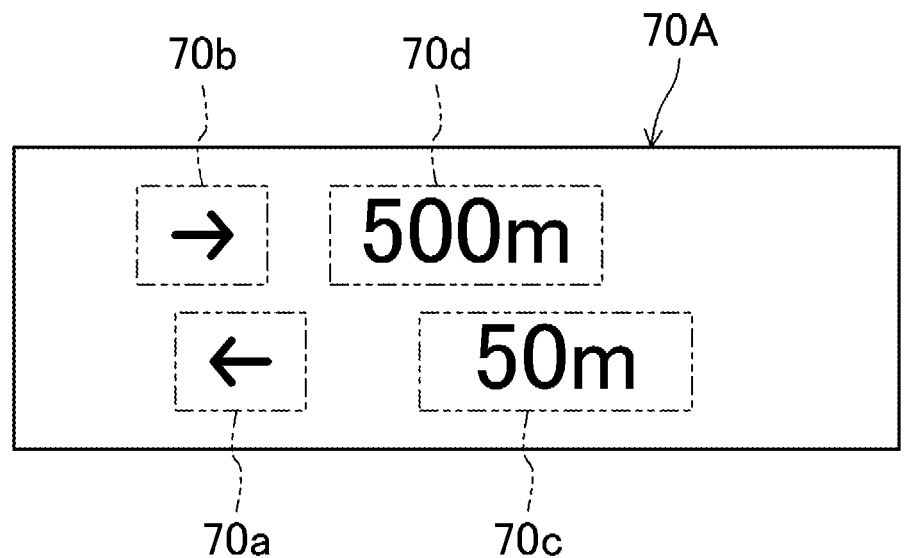
FIG. 16 illustrates a first guide image output by an image output section.
Figure 17:
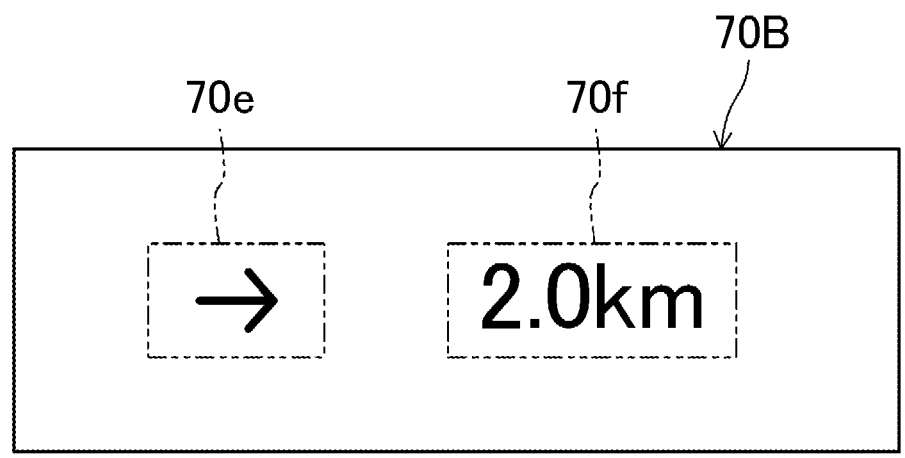
FIG. 17 illustrates a second guide image output by the image output section.

FIG. 15 is a flowchart according to a fourth embodiment of the present disclosure. The fourth embodiment is different from the first embodiment in that first information indicating a traveling direction at a first guide point closest to a current position and second information indicating a traveling direction at a second guide point where a user is to reach next to the first guide point are acquired, an interval between the first guide point and the second guide point is estimated, and if the estimated interval is a predetermined value or less, the traveling direction indicated by the second information is displayed in addition to the traveling direction indicated by the first information. The other part of the third embodiment is the same as that in the first embodiment, and thus, the same components as those in the first embodiment are denoted by the same reference characters, and different components will be described in detail.

While wireless communication with a smartphone 10 is performed, an operation depicted in the flowchart of FIG. 15 is repeatedly performed. When the path is erased, the operation is stopped. Step S101 is the same as the step in FIG. 12.

Next, in step S602, a Bluetooth module 31 receives the first and second information, inter-guide point distance information, and inter-current position distance information, for example, transmitted from the smartphone 10. Thereafter, the process proceeds to step S603. Specifically, a car navi app 14 generates inter-guide point distance information indicating a distance between a first guide point and a second guide point and inter-current position distance information indicating a distance from the current position to the first guide point, and the Bluetooth module 31 receives the inter-guide point distance information and the inter-current position distance information. Based on the inter-guide point distance information and the inter-current position distance information, the car navi app 14 can also generate distance information indicating a distance from the current position to the second guide point.

In step S603, a microcomputer 32a of an image output section 32 determines whether a distance D1 indicated by the first information previously received by the Bluetooth module 31 (i.e., the distance from the current position and the first guide point) is less than a predetermined reference distance R k or not or is greater than or equal to the predetermined reference distance or not.

If the determination result is NO in step S603, this means that the distance D1 from the current position to the first guide point is the predetermined reference distance R k or more. In this case, the process proceeds to step S602. If R k is the longest R 1, the reference distance is 5 km. In this case, the determination result of NO in step S603 means that the distance from the current position to the first guide point is 5 km or more. That is, since the distance from the current position to the first guide point is sufficiently long, no guidance to the first guide point is unnecessary. In this case, the process does not proceed to a guide image output step in step S611 or step S612. Accordingly, the user does not feel annoyed. If the determination result is NO in step S603, the process returns to step S602, and the first and second information, the inter-guide point distance information, and the inter-current position distance information, for example, are received from the smartphone 10. Direction information indicating a traveling direction does not change unless the guide point is changed. Thus, reception of the direction information can be omitted.

Thereafter, the process proceeds to step S603, and the microcomputer 32a of the image output section 32 determines whether the distance D1 is less than the predetermined reference distance R k or not as described above. The longest reference distance of R 1 is preferably 10 km or less, for example, and is preferably 8 km or less, and more preferably 5 km or less. Here, R 1 is preferably 3 km or more.

On the other hand, in step S603, if the determination result is YES and the distance D1 is less than the predetermined reference distance R k, the process proceeds to step S607, and the microcomputer 32a of the image output section 32 determines whether a count value k is six or not.

If the determination result is YES and the count value k is six in step S607, the process proceeds to step S608. The proceeding from step S607 to step S608 means that the distance D from the current position to the next guide point is less than 0.5 km and the time to reach the next guide point is short. In step S608, the microcomputer 32a of the image output section 32 determines whether a distance D2 indicated the second information by previously received by the Bluetooth module 31 (i.e., a distance from the first guide point to the second guide point) is a distance for interval estimation or less. The distance for interval estimation is set shorter than a reference distance of R 6, and can be set within the range from 1/3 to 1/5 of the reference distance of R 6, for example. In this embodiment, the distance for interval estimation is 100 m, but is not limited to this example, and the distance can be set within the range from 50 m to 200 m, for example.

In step S608, estimation of the interval between the first guide point and the second guide point can be performed based on the distance indicated by the inter-guide point distance information acquired by the Bluetooth module 31. Since the distance indicated by the inter-guide point distance information is the distance between the first guide point and the second guide point, the interval between the first guide point and the second guide point is directly represented. The interval estimation may also be performed based on time information. For example, the time to reach from the first guide point to the second guide point may be calculated from a moving velocity, a distance, and a path to thereby acquire a time interval between the first guide point and the second guide point. In this case, instead of the distance for interval estimation, a time for interval estimation is used. The time for interval estimation can be set at about 10 seconds to about 30 seconds, for example.

If the determination result is YES in step S608 and the distance D2 from the first guide point to the second guide point is the distance for interval estimation (100 m) or less, the process proceeds to step S609. The situation where the distance D2 from the first guide point to the second guide point is the distance for interval estimation or less means that it is estimated that the interval between the first guide point and the second guide point is a predetermined value or less, that is, the interval is short. In this case, in step S609, the image output section 32 generates a first guide image 70A illustrated in one of FIGS. 4A through 4D, and emits display light for causing a combiner 26 to display the first guide image 70A. The first guide image 70A represents a traveling direction at the first guide point and a traveling direction at the second guide point. Thus, even if the time from arrival at the first guide point to arrival at the second guide point is short, the user is capable of checking the traveling direction at the second guide point beforehand on the first guide image 70A.

On the other hand, if the determination result is NO in step S608 and the distance D2 from the first guide point to the second guide point is longer than the distance for interval estimation, the process proceeds to step S610. The situation where the distance D2 from the first guide point to the second guide point is longer than the distance for interval estimation or less means that it is estimated that the interval between the first guide point and the second guide point is long. In this case, in step S610, the image output section 32 generates a second guide image 70B illustrated in one of FIGS. 5A through 5D, and emits display light for causing the combiner 26 to display the second guide image 70B. The second guide image 70B represents the traveling direction at the first guide point, but does not represent the traveling direction at the second guide point. Thus, the user is less likely to feel annoyed. The situation where the determination result is NO in step S608 means that the distance to the second guide point is long. Thus, even if the traveling direction at the second guide point is not displayed, the user does not feel inconvenience.

After steps S609 and S610, the process proceeds to step S611. During these steps, the guide image is kept displayed, and the Bluetooth module 31 receives and updates various types of information every second. Thus, the guide image is also updated every second, and distances displayed on, for example, a first distance display region 70c, a second distance display region 70d, and a distance display region 70f are updated.

In step S611, the image output section 32 outputs the first guide image 70A by step S609 and the second guide image 70B by step S610 until the distance D1 from the current position to the first guide point reaches zero, that is reaches the first guide point. Specifically, the image output section 32 is configured to continue to display the traveling direction at the first guide point or the traveling direction at the second guide point until the user reaches the first guide point if it is determined that the distance indicated by the inter-current position distance information acquired by the Bluetooth module 31 is less than the reference distance (predetermined distance) at R 6. When the user reaches the first guide point, the guide image is erased. In this manner, the predetermined operation is finished. After the end of this operation, the guide point closest to the current position is switched to the second guide point, and thus, the second guide point serves as a new first guide point. Then, the next operation continues to be performed. In some cases, the guide point is a destination. In such cases, the second guide point is not present.

On the other hand, if the determination result is NO in step S607, the process proceeds to step S612. The proceeding from step S607 to step S612 means that the distance D1 from the current position to the next guide point is 0.5 km or more and the time to reach the next guide point is long. In step S612, the second guide image 70B illustrated in one of FIGS. 5A through 5D is output only for 10 seconds, and thus, the traveling direction at the second guide point is not displayed. That is, the image output section 32 is configured not to display the traveling direction at the second guide point if the distance indicated by the inter-current position distance information acquired by the Bluetooth module 31 is greater than or equal to the reference distance at R 6. Accordingly, the user is less likely to feel annoyed. The image output section 32 is also configured to display the traveling direction at the first guide point for a predetermined time if it is determined that the distance indicated by the inter-current position distance information acquired by the Bluetooth module 31 is greater than or equal to the reference distance at R 6. Thus, the user is capable of checking the traveling direction before reaching the first guide point. The output time of the second guide image 70B is not limited to 10 seconds, and may be set within the range from several seconds to 10 seconds.

In step S613, the microcomputer 32a of the image output section 32 increments the count value k by one, and the process returns to step S602, where various types of information are received from the smartphone 10. Thereafter, the process proceeds to step S603. In step S603, if R k is equal to R 2, it is determined whether the distance D from the current position to the next guide point is less than 4 km or not, if R k is equal to R 3, it is determined whether the distance D from the current position to the next guide point is less than 3 km or not, if R k is equal to R 4, it is determined whether the distance D from the current position to the next guide point is less than 2 km or not, if R k is equal to R 5, it is determined whether the distance D from the current position to the next guide point is less than 1 km or not, and if R k is equal to R 6, it is determined whether the distance D from the current position to the next guide point is less than 0.5 km or not.

For example, supposing that the distance D1 from the current position to the first guide point is 5 km or more and the user is traveling from the current position toward the first guide point. A reference distance in the determination of step S603 is R 1. If the distance D1 from the current position to the first guide point becomes less than 5 km, the determination result in step S603 is YES, the determination result is NO in step S607, the first guide image 7B is displayed only for 10 seconds in step S612 (normal output process), and R k becomes R 2 in step S613, and the process proceeds to step S602. Before start of the normal output process and after end of the normal output process, the stop process of stopping emission of display light is performed.

If the user further approaches the first point and the distance D1 from the current position to the first guide point becomes less than 4 km, the determination in step S603 uses R 2 as the reference distance, and thus, the determination result is YES in step S603, and the determination result is NO in step S607. Then, in step S612, the first guide image 70B is displayed only for 10 seconds, and R k becomes R 3 in step S613, and the process proceeds to step S602.

If the user further approaches the first point and the distance D1 from the current position to the first guide point becomes less than 3 km, the determination in step S603 uses R 3 as the reference distance, and thus, the determination result is YES in step S603, and the determination result is NO in step S607. Then, in step S612, the first guide image 70B is displayed only for 10 seconds, and R k becomes R 4 in step S613, and the process proceeds to step S602. Thereafter, if the user further approaches the first guide point and the distance D1 from the current position to the first guide point becomes less than 2 km, the determination in step S603 uses R 4 as the reference distance, and thus, the determination result is YES in step S603, and the determination result is NO in step S607. Then, in step S612, the first guide image 70B is displayed only for 10 seconds, and R k becomes R 5 in step S613, and the process proceeds to step S602. Thereafter, if the user further approaches the first guide point and the distance D1 from the current position to the first guide point becomes less than 1 km, the determination in step S603 uses R 5 as the reference distance, and thus, the determination result is YES in step S603, and the determination result is NO in step S607. Then, in step S612, the first guide image 70B is displayed only for 10 seconds, and R k becomes R 6 in step S608, and the process proceeds to step S602. That is, if it is determined that the distance from the current position to the first guide point is less than 5 km, the image output section 32 repeatedly performs the normal output process of emitting display light for displaying the first guide image 70B and the stop process of stopping emission of display light at predetermined timings. Thus, the user is capable of checking the next traveling direction multiple times before reaching the first guide point.

Then, if the user further approaches the first guide point and the distance D1 from the current position to the first guide point becomes less than 0.5 km, determination in step S603 uses R 6 as the reference distance, and thus, the determination result is YES in step S603. In step S607, the count value k is six, and thus, the determination result is YES, and the process proceeds to step S608. If the first guide point and the second guide point are close to each other, the first guide image 70A is displayed in step S609, whereas if the first guide point and the second guide point are far from each other, the second guide image 70B is displayed in step S610.

Figure 18:
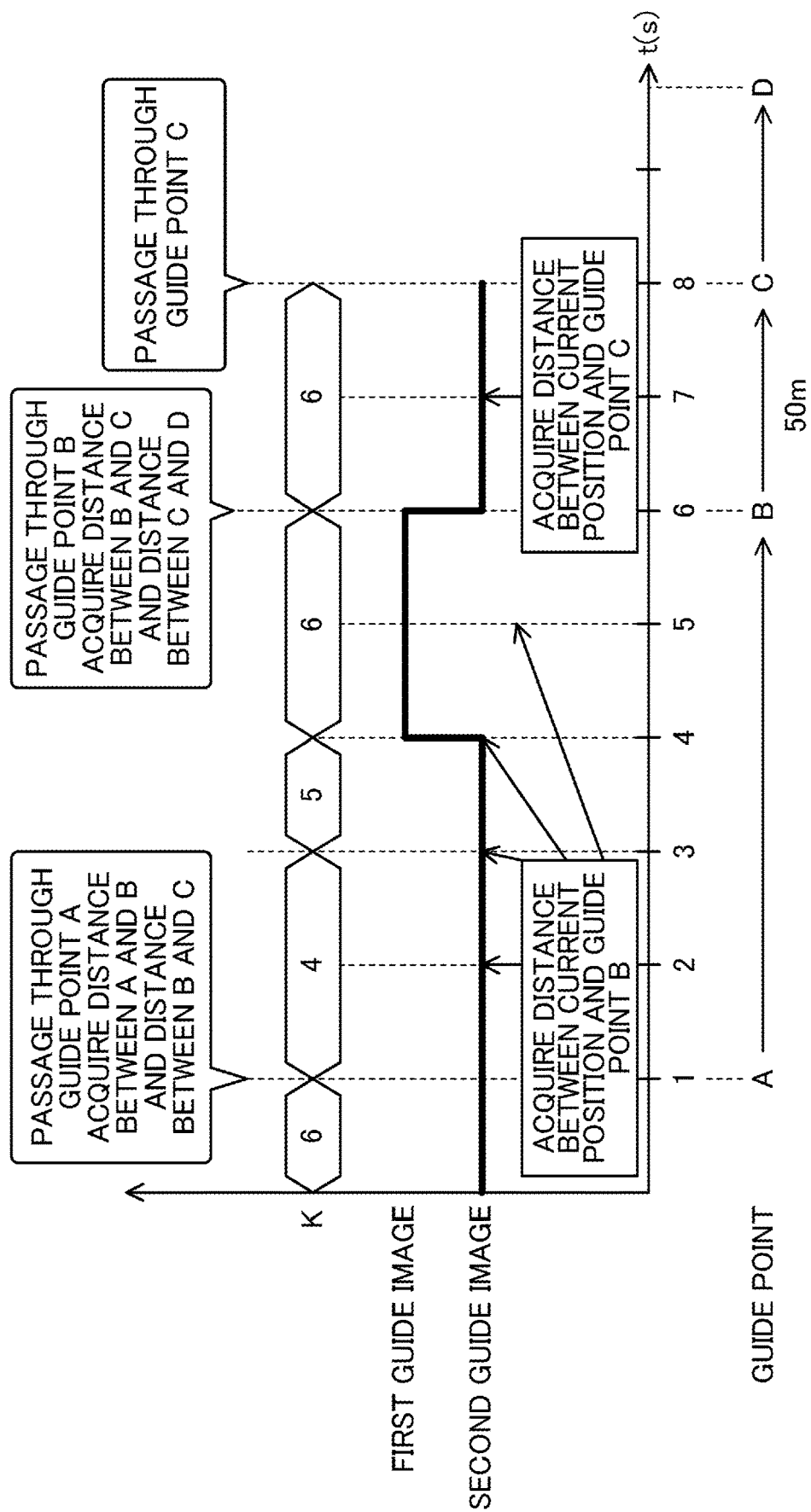
FIG. 18 is a timing chart showing an example operation of the display light emitting device according to the fourth embodiment.

Thus, as depicted by the timing chart in FIG. 18, for example, while the driver of, for example, a motorcycle having the smartphone 10 passes through guide points A, B, C, and D in this order, the display light emitting device 30 according to this embodiment operates as depicted by the timing chart.

Here, the distance between the guide points B and C is set at 50 m. In FIG. 18, t represents an elapsed time from start of operation of the display light emitting device 30. The display light emitting device 30 receives information at t=1, 2, 3, 4, 5, 6, 7, and 8.

At t=1, the display light emitting device 30 passes through the guide point A, receives first information indicating a distance between the guide points A and B and a traveling direction at the guide point B, and receives second information indicating a distance between the guide points B and C and a traveling direction at the guide point C. At t=2, 3, 4, and 5, the display light emitting device 30 receives only first information indicating a distance from the current position to the guide point B and a traveling direction at the guide point B. In a section where t=1 to 4, the distance from the current position to the guide point B is 500 m or more. Accordingly, the guide image is set at the second guide image 70B not indicating the traveling direction at the guide point C. In a section where t=4 to 6, the distance from the current position to the guide point B is less than 500 m. Since the distance between the guide points B and C is 100 m or less, the guide image is set at the first guide image 70A representing the traveling direction at the guide point B and the traveling direction at the guide point C. Thereafter, at t=6, the display light emitting device 30 passes through the guide point B, and at this time, receives the first information indicating the distance between the guide points B and C and the traveling direction at the guide point C, and also receives second guide information indicating a distance between the guide points C and D and a traveling direction at the guide point D. At t=7, the display light emitting device 30 receives a distance from the current position to the guide point C and the traveling direction at the guide point C. Thereafter, the display light emitting device 30 passes through the guide point C.

As described above, in this embodiment, in a case where the first guide point closest to the current position and the second guide point where the user is to reach next are present, if it is determined that the interval between the first guide point and the second guide point is short, both the traveling direction at the first guide point and the traveling direction at the second guide point are displayed on a guide image. Thus, even if the time from arrival at the initial guide point to arrival at the next guide point is short, the user is capable of previously checking a traveling direction at the next guide point on a guide image. This can prevent or reduce a failure in user's traveling in a traveling direction represented by a guide image at a guide point.

In the embodiment describe above, in step S608, the time from arrival at the first guide point to arrival at the second guide point is estimated only based on the distance D2, but may be estimated based on a velocity indicated by velocity information received by the Bluetooth module 31 in addition to the distance D2.

In the embodiment describe above, in step S608, it is determined whether the distance D2 is less than or equal to 100 m or not. Alternatively, it may be determined whether the distance D2 is less than or equal to another predetermined set value.

Fifth Embodiment

Figure 19:
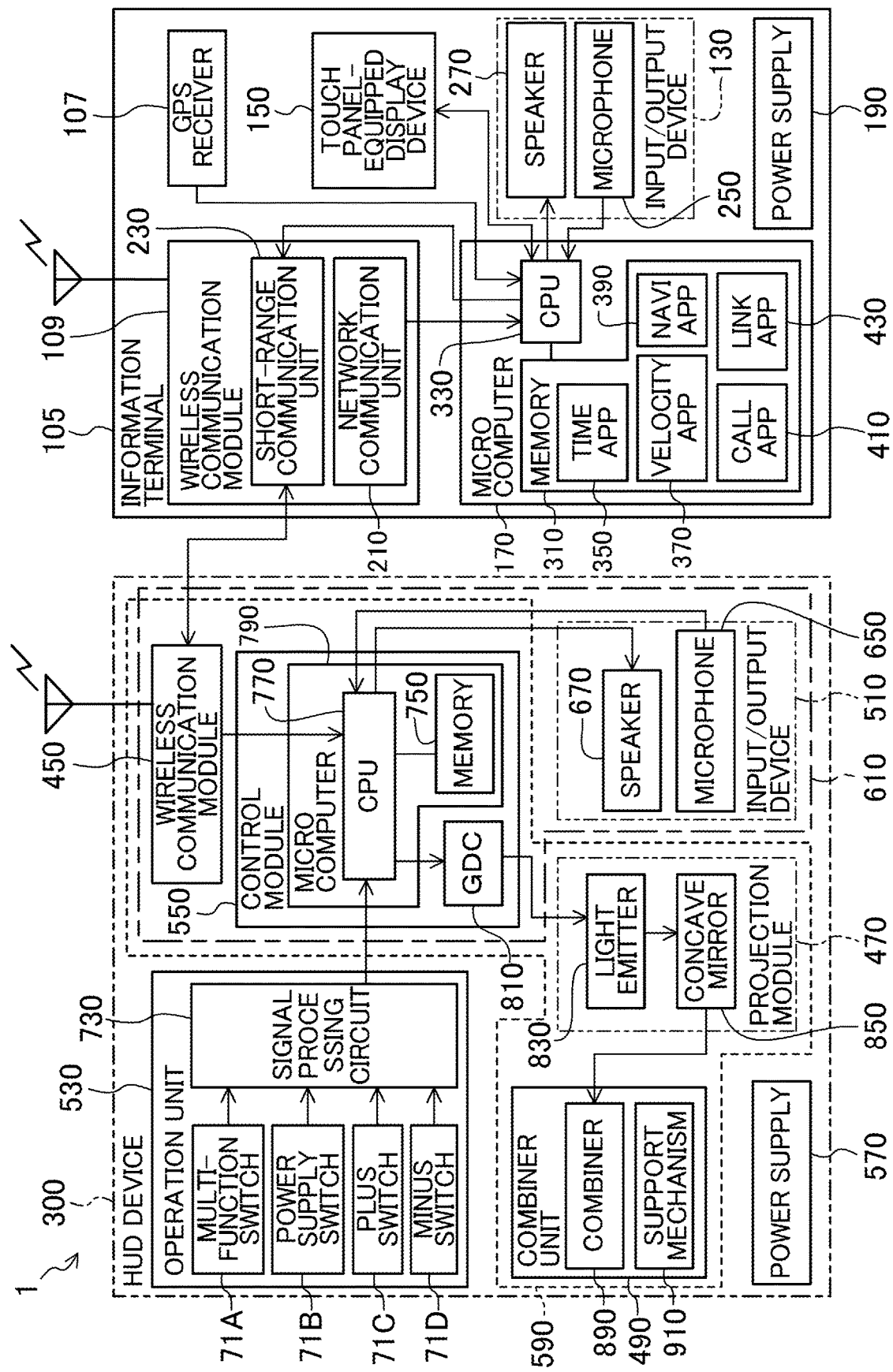
FIG. 19 is a functional block diagram illustrating a configuration of a navigation system according to a fifth embodiment.

FIG. 19 is a functional block diagram illustrating a configuration of a navigation system according to a fifth embodiment. The fifth embodiment is different from the first embodiment in a specific configuration and processing of a navigation system 1 A configuration according to the fifth embodiment will be described below.

As an information terminal 105, a small-size multi-function cellular phone called a smartphone is used. The information terminal 105 is electronic equipment having a calling function, and includes a GPS receiver 107, a wireless communication module 109, an input/output device 130 that inputs and outputs audio information, a touch panel-equipped display device 150, a microcomputer 170 that controls an overall operation of the information terminal 105, and a power supply 190 that supplies electronic power to the information terminal 105.

Based on a received GPS signal, the GPS receiver 107 acquires information on a current position (e.g., a latitude, a longitude, and an altitude) of the information terminal 105. The GPS receiver 107 stores the obtained positional information of the information terminal 105 in a memory 310 included in the microcomputer 170 and updates the information sequentially, in response to a request from the microcomputer 170.

The wireless communication module 109 includes a network communication unit 210 that communicates with an external network as a wide area network, such as the Internet or a telephone network, and a short-range communication unit 230 that communicates with an HUD device 300 wirelessly in a short range.

The network communication unit 210 has a wireless local area network (LAN) function such as wireless fidelity (WiFi, registered trademark) and a communication function in mobile communication standards such as a long time evolution (LTE, registered trademark). In response to a request from the microcomputer 170, the network communication unit 210 receives map information from the external network, road information concerning, for example, construction and traffic congestion, information on peripheral facilities based on the current position acquired by the GPS receiver 107, and net information such as disaster information, and temporarily stores the received information in the memory 310 included in the microcomputer 170.

In response to the microcomputer 170, the network communication unit 210 transmits and receives audio data to/from an external device having a calling function, such as another cellular phone or a landline telephone, by using an external network.

The short-range communication unit 230 has a communication function in a short-range wireless communication standard such as the Bluetooth. In response to a request from the microcomputer 170, the short-range communication unit 230 reads, from the memory 310, various types of information including positional information of the information terminal 105 acquired by the GPS receiver 107, net information acquired by the network communication unit 210, application software (hereinafter referred to as "app") information acquired by various types of apps described later, and information on display items of a display image displayed by the HUD device 300 and display setting such as brightness, and transmits the read-out information to the HUD device 300 by wireless communication.

In a case where the information terminal 105 is linked to the HUD device 300 and a call is made by using the calling function of the HUD device 300, the short-range communication unit 230 transmits and receives audio data to/from the HUD device 300 in response to a request from the microcomputer 170.

The input/output device 130 includes a microphone 250 and a speaker 270. The microphone 250 converts input sound to an electrical signal. The converted electrical signal is transmitted as audio data to an external network (telephone network) by the network communication unit 210. While the calling function of the information terminal 105 is used alone without a link to the HUD device 300, the speaker 270 converts an electrical signal as audio data received from an external network by the function of the network communication unit 210 to sound and outputs the sound.

The touch panel-equipped display device 150 is an electronic device obtained by combining a display device that displays an image on a screen of the information terminal 105 and a touch panel that detects a position (touched position) on the screen touched by the user. The touch panel-equipped display device 150 has the function of outputting an image and the function of receiving a user operation. In the information terminal 105, executions of the apps and display setting in the HUD device 300 in executing the linking app 430 described later can be performed by a touch operation on the touch panel-equipped display device 150.

The microcomputer 170 includes the memory 310 and a CPU 330. The memory 310 temporarily or permanently stores various types of information including programs for operating the information terminal 105. The memory 310 is typically implemented by a combination of a RAM and a ROM. Various programs stored in the memory 310 include a mobile operating system (OS) and a plurality of apps that operate to implement specific functions on the mobile OS.

The plurality of apps include, for example, a time app 350, a velocity app 370, a navigation app (hereinafter referred to as a "navi app") 390, a call app 410, and the link app 430. These apps 350, 370, 390, 410, and 430 are previously installed in the information terminal 105 and stored in the memory 310. The time app 350 and the velocity app 370 are not necessary apps, and may be omitted. For example, a time can be acquired by obtaining a system time from the OS, and a velocity can be calculated by using a moving time and a moving distance from GPS information. That is, a time acquisition function and a velocity acquisition function are necessary, and these functions are not necessarily implemented by apps.

The time app 350 is software for acquiring a current time. The time app 350 acquires a current time based on, for example, a time stamp acquired by communication with a base station or time information acquired by the GPS receiver 107, and further by using a time synchronization technique such as a network identity and time zone (NITZ) or a network time protocol (NTP).

The velocity app 370 is software for detecting a moving velocity of the information terminal 5. The velocity app 370 detects a moving velocity of the information terminal 105 based on, for example, positional information of the information terminal 105 acquired by the GPS receiver 107.

The navi app 390 is software for providing a route guide to a destination set by the user. The navi app 390 provides a route guide to a destination based on, for example, map information acquired by the network communication unit 210 or previously stored in the memory 310 and positional information of the information terminal 105 acquired by the GPS receiver 107.

The call app 410 is software for providing a call with the information terminal 105. The call app 410 transmits and receives audio data in conformity with a predetermined communication protocol by the function of the network communication unit 210, to thereby transmit audio data input from the microphone 250 to an external network and outputs sound based on audio data received from an external network from the speaker 270.

The link app 430 is software that is linked to the HUD device 300 using wireless communication by the short-range communication unit 230 and transmits, to the HUD device 300, various types of information such as app information, net information, and information on display setting in the HUD device 300 to implement a display function in the HUD device 300.

The link app 430 is used for display setting of the HUD device 300. Specifically, as the display setting, items displayed by the HUD device 300 can be selected from a plurality of items including a current time, a moving velocity, and route guide information (navigation information), and brightness of a display image displayed by the HUD device 3 can be set.

The link app 430 is used for mode setting concerning the display function of the HUD device 300. The modes for the display function include a display mode in which a display image representing predetermined information (information on set display items) and a non-display mode in which no display is performed. The link app 430 selects one of the display mode or the non-display mode. The information on display setting set by the link app 430 is stored in the memory 310.

The link app 430 is software for implementing a hands-free calling function enabling a call with the HUD device 300 without the need for the user to hold the information terminal 105.

The link app 430 is linked to the call app 410, and performs processing concerning a call, such as receiving an incoming call, increase and reduction of the volume during a call, and end of a call, in response to a switch operation on the HUD device 300. The link app 430 uses the function of the call app 410, and during a call, transfers audio data received from an external device of a partner to whom the user calls through the network communication unit 210 to the HUD device 300 by using wireless communication by the short-range communication unit 230. The link app 430 transmits the audio data received from the HUD device 300 through the short-range communication unit 230 to the external device of the partner by way of an external network by using wireless communication by the network communication unit 210.

The link app 430 transfers an incoming call at the information terminal 105 to the HUD device 300. Specifically, it is monitored whether the information terminal 105 receives an incoming call or not, and if the information terminal 105 receives an incoming call, an incoming call signal indicating the presence of an incoming call at the information terminal 105 is transmitted to the HUD device 300 using wireless communication by the short-range communication unit 230. The link app 430 monitors a communication state with the external device of the partner during the call. When communication to the external device of the partner is disconnected by the end operation of the partner, the link app 430 transmits an end call signal indicating the end of call to the HUD device 300 using wireless communication by the short-range communication unit 230.

The CPU 330 is typically implemented by an integrated circuit (IC), a large scale integration (LSI) circuit, or an application specific integration circuit (ASIC), for example. The CPU 330 performs computation for processing various types of data, and controls operations of the wireless communication module 109, the input/output device 130, and the touch panel-equipped display device 150 and execution of the apps 350, 370, 390, 410, and 430.

The microcomputer 170 causes the GPS receiver 107 to acquire information on a current position by the function of CPU 330, causes the network communication unit 210 to establish connection to an external network to collect net information, causes the short-range communication unit 230 to establish connection to the HUD device 300 by executing the link app 430, and transmits information, such as app information, net information, and information on display setting, acquired various processes in accordance with execution of the time app 350, the velocity app 370, and the navi app 390, to the HUD device 300. The microcomputer 170 transfers an incoming call at the information terminal 105 to the HUD device 300 by executing the link app 430, and performs the processing on the call described above in response to a switch operation on the HUD device 300.

The HUD device 300 is a projection type display device that projects visual information on a filed of view of a user wearing the helmet 20 (illustrated in FIG. 1), and has the communication function for implementing a hands-free incoming call by linking to the information terminal 105.

The HUD device 300 includes a wireless communication module 450 that performs wireless communication with an external device, a projection module 470 that generates and projects display light, a combiner unit 490 that causes a display image by display light projected from the projection module 470 to be visually recognized by a user as a virtual image, an input/output device 510 that receives and outputs audio information, an operation unit 530 for receiving an operation by the user to the HUD device 300, a control module 550 that controls a display function and a calling function of the HUD device 300, and a power supply 570 that supplies electric power to the HUD device 300.

The wireless communication module 450, the projection module 470, the combiner unit 490, and the control module 550 constitute a display module 590 that displays a display image through the combiner 890. The wireless communication module 450, the input/output device 510, and the control module 550 constitute a calling module 610 that provides a voice call using a microphone 650 and a speaker 670 included in the input/output device 510.

The wireless communication module 450 has a communication function in a short-range wireless communication standard such as Bluetooth. The wireless communication module 450 receives net information and app information from the short-range communication unit 230 of the information terminal 105 and display setting information, and stores the received information in the memory 750 included in the microcomputer 790, in response to a request from the microcomputer 790 included in the control unit 550.

The input/output device 510 includes the microphone 650 and the speaker 670. The microphone 650 transmits a converted electrical signal as audio data to the information terminal 105 having established communication by the function of the wireless communication module 450, in response to a request from the microcomputer 790 included in the control module 550. The speaker 670 is incorporated in a portion opposed to an ear of the user or a peripheral portion of the portion. The speaker 670 converts an electrical signal as audio data received from an external device having the calling function by the function of the network communication unit 210 to sound and outputs the sound, in response to a request from the microcomputer 790 included in the control module 550.

The operation unit 530 is disposed at the left of a chin portion and below the speaker 670 in the helmet 20. As described above, the operation unit 530 is located at a position at which the user wearing the helmet 20 cannot visually recognize the operation unit 530. The operation unit 530 includes a plurality of push-button (push-type) switches 71A, 71B, 71C, and 71D, and a signal processing circuit 730 that processes signals in response to input operations of the switches 71A, 71B, 71C, and 71D.

The plurality of switches 71A, 71B, 71C, and 71D are switches that receives operations concerning display and operations concerning voice calls. In the example of this embodiment, the switches 71A, 71B, 71C, and 71D are four switches of a multi-function switch 71A, a power supply switch 71B, a plus switch 71C, and a minus switch 71D.

A display switch function (display operation function) of switching a display content of a display image representing predetermined information displayed by the HUD device 300 is allocated to the multi-function switch 71A as a main function. An outcoming call function of issuing a call by the calling function of the HUD device 300 is allocated to the multi-function switch 71A as a main function. The display switch function and the outcoming call function are selectively used depending on the way of operations (a short pressing operation and a long pressing operation described later) on the multi-function switch.

A function of switching the power supply of the HUD device 300 between on and off is allocated to the power supply switch 71B as a main function. A function of switching display of the HUD device 300 between on and off is allocated to the power supply switch 71B as a sub-function. A function of increasing the volume of an output from the speaker 670 during a call, for example, is allocated to the plus switch 71C as a main function. A function of reducing the volume of an output from the speaker 670 during a call, for example, is allocated to the minus switch 71D as a main function.

The signal processing circuit 730 detects input operations by pressing the multi-function switch 71A, the power supply switch 71B, the plus switch 71C, and the minus switch 71D, and outputs operation signals in accordance with the input operations to a CPU 770 of the microcomputer 790 included in the control module 550. For the input operations on the multi-function switch 71A and the power supply switch 71B, the signal processing circuit 730 distinguishes a short pressing operation in which a pressing operation is performed for a time shorter than a predetermined field time (e.g., set at about two seconds to about five seconds) and a long pressing operation in which a pressing operation is performed for a time greater than or equal to the predetermined, and outputs different signals to the CPU 770 depending on the long and short pressing operations.

The control module 550 includes the microcomputer 790 including the memory 750 and the CPU 770, and a GDC 810 that is an integrated circuit in charge of processing concerning image display. The memory 750 temporarily or permanently stores various types of information including a program for operating the HUD device 300. The memory 750 also stores net information and app information received by the wireless communication module 450 and information on display setting. The memory 750 is typically implemented by a combination of a RAM and a ROM.

The CPU 770 is typically implemented by, for example, IC, LSI, or ASIC. The CPU 770 performs computation for processing various types of data, and controls operations of the wireless communication module 450, a light emitter 830 included in the projection module 470, an input/output device 510, and the GDC 810.

The GDC 810 generates data of a display image to be visually recognized by the user through the combiner 890 included in the combiner unit 490, based on net information and app information stored in the memory 750 and display setting information. Data of the display image generated by the GDC 810 is image data representing information of items set in display setting of the link app 430 of the information terminal 5. With the function of the CPU 770, the microcomputer 790 causes the GDC 810 to generate data of a display image and causes the light emitter 830 included in the projection module 470 to output an image signal, by the function of the CPU 770.

The projection module 470 is incorporated in a chin portion of the helmet 20. The projection module 470 includes the light emitter 830 that generates and emits display light corresponding to a display image based on an image signal input from the GDC 810, and a concave mirror 850 that reflects display light emitted from the light emitter 830 toward the combiner 890 included in the combiner unit 490. The light emitter 830 and the concave mirror 850 are individually provided in the right and left sides of the chin portion of the helmet 20.

The light emitter 830 is incorporated in a right side of the chin portion of the helmet 20. Although not shown, the light emitter 830 is obtained by combining a display element constituted by a light source such as a light emitting diode (LED) and a reflection type display panel such as a liquid crystal on silicon (LCOS) panel, an optical lens such as a convex lens or a concave lens, a diffusion plate, and a plurality of optical members such as total internal reflection (TIR) prisms. The light emitter 830 generates display light having an intensity at which a display image displayed by the HUD device 300 is at a brightness level set by the information terminal 105, and emits the generated display light to the concave mirror 850. The concave mirror 850 is incorporated in a right side of the chin portion of the helmet 20.

The combiner unit 490 includes the combiner 890 that receives display light reflected by the concave mirror 850 from below and reflects the display light to a direction in which the display light can be visually recognized by the user, and a support mechanism 910 that supports the combiner 890 in a position in front of an eye of the user.

The control module 550 causes the display module 590 to perform a predetermined display operation depending on whether the HUD device 300 is in the display mode or the non-display mode, based on a mode concerning the display function of the HUD device 300 included in information on display setting stored in the memory 750.

The control module 550 displays information on items set in the display setting of the link app 430 as predetermined information while the HUD device 300 is in the display mode, and the control module 550 displays an icon indicating the presence of an incoming call and information of a partner of a call as a display image when receiving an incoming call signal from the information terminal 105. On the other hand, the control module 550 does not display information on items set in the display setting of the link app 430 while the HUD device 300 is in the non-display mode, and the control module 550 displays an icon indicating the presence of an incoming call and information of the partner of the call as a display image when receiving an incoming call signal from the information terminal 105.

The control module 550 controls the display function by the display module 590 in response to the multi-function switch 71A included in the operation unit 530.

While the HUD device 300 is in the display mode, the control module 550 switches the display content on a display image representing predetermined information displayed by the HUD device 300, with a short pressing operation on the multi-function switch 71A. For example, in a case where a plurality of display items are set by the link app 430 in the information terminal 105, display items displayed by the HUD device 300 as display images are switched between all the display items set by the link app 430 and one of the display items, at every short pressing operation on the multi-function switch 71A.

While the HUD device 300 is in the non-display mode, the control module 550 causes the display module 590 to temporarily display a display image representing predetermined information for a predetermined time (e.g., about 10 seconds to about 15 seconds) with a short pressing operation performed on the multi-function switch 71A. In the HUD device 300, since this temporary display function is provided to the multi-function switch 71A, switching operation between the display mode and the non-display mode can be omitted, and a display image can be temporarily displayed when necessary. In this manner, the user will not forget erasing display of a display image when unnecessary.

The control module 550 controls a calling function by the calling module 610 in response to operations on the switches 71A, 71B, 71C, and 71D included in the operation unit 530.

The control module 550 allocates a call receiving function of receiving a call in response to an incoming call to each of the multi-function switch 71A, the power supply switch 71B, the plus switch 71C, and the minus switch 71D, when the information terminal 105 receives an incoming call. Accordingly, when the information terminal 105 receives an incoming call, the call can be received in response to the incoming call and a call with the calling module 610 can be started by operating one of the four switches 71A, 71B, 71C, and 71D.

In addition, during a call with the calling module 610, the control module 550 allocates the functions of the plus switch 71C and the minus switch 71D to the main functions, and restores the functions. Accordingly, even during a call, the volume output from the speaker 670 can be adjusted. At this time, the control module 550 allocates a call end function of finishing a call to the multi-function switch 71A. Accordingly, if the user wants to finish a call, the call can be finished by operating the multi-function switch 71A. The function of the power supply switch 71B is allocated to the main function and restored after reception of a call in response to an incoming call.

Until a predetermined time has elapsed from the end of a call with the calling module 610, the control module 550 continuously allocates the call end function to the multi-function switch 71A and does not allocate the display operation function to the multi-function switch 71A. Accordingly, even if the user unintentionally operates the multi-function switch 71A in order to finish a call after the partner of the call performs a call end operation, unintentional display switching operation can be prevented. Consequently, the user does not feel uneasy because of the unintentional display switching operation of the HUD device 300 at the call end operation.

While no incoming call is provided to the information terminal 105, the control module 550 activates the main function and the sub-function of the power supply switch 71B. At this time, the main function (on/off switching function of the power supply) of the power supply switch 71B is activated when a long pressing operation is performed, and the sub-function (on/off switching function of display) of the power supply switch 71B is actuated when a short pressing operation is performed. When no incoming call is provided to the information terminal 105, the control module 550 activates the main functions of the plus switch 71C and the minus switch 71D. Accordingly, the volume output from the speaker is increased by an input operation on the plus switch 71C, and reduced by an input operation on the minus switch 71D.

When the HUD device 300 is turned on and the link app 430 is executed on the information terminal 105, net information, app information, and information on display setting are received by the HUD device 300. Based on the received net information and app information, the GDC 810 generates data of a display image corresponding to items previously set and included in the information on display setting. At this time, if the HUD device 300 is in the display mode, the light emitter 830 of the projection module 470 generates display light corresponding to data of a display image generated by the GDC 810 at a light intensity corresponding to a brightness level of a display image set in the information terminal 105. The display light is emitted from the light emitter 830 and then reflected on the concave mirror 850 to be projected from the projection module 470 to the combiner 890, and further reflected on the combiner 890 to enter a field of view of the user. Accordingly, the user visually recognizes a display image by display light as a virtual image with the virtual image superimposed on the scenery in the forward field of view through the combiner 890.

When the information terminal 105 receives an incoming call, the user is notified of the call by display of a display image by the HUD device 300, and the user operates the operation unit 530 with the HUD device 300. Accordingly, the user receives the call in response to the incoming call, talks with a partner of a call, and then finishes the call, thus performing a hands-free call in response to the incoming call.

Figure 20:
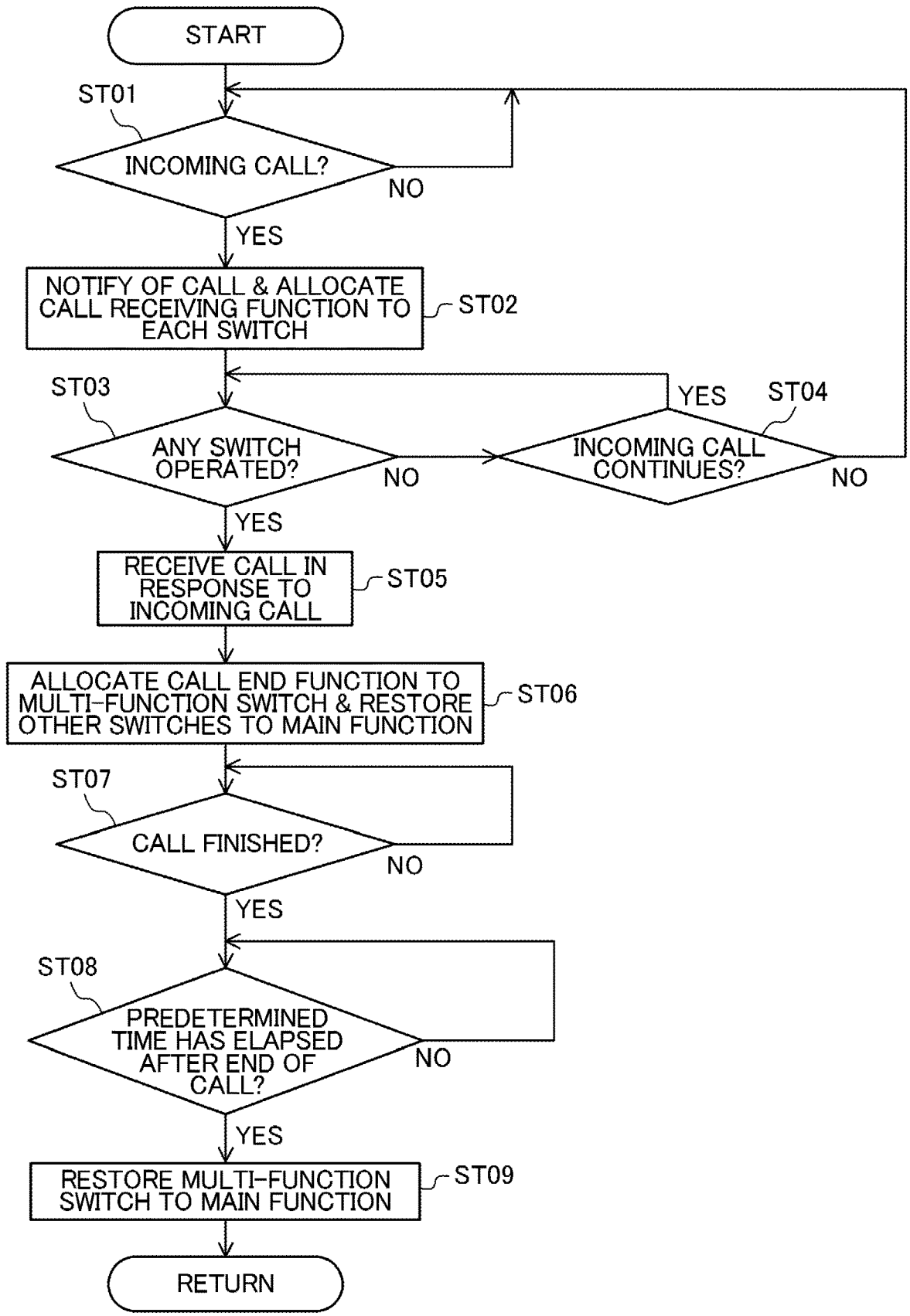
FIG. 20 is a flowchart depicting an example operation of the navigation system according to the fifth embodiment.

FIG. 20 is a flowchart depicting a flow of an incoming call by the calling function of the HUD device 300. In a process for performing an incoming call in the HUD device 300, the control module 550 first determines whether an incoming call is received at the information terminal 105 or not (step ST01). Specifically, if the control module 550 receives an incoming call signal transmitted from the information terminal 105 through the wireless communication module 450, it is determined that an incoming call is received at the information terminal 105, and if the control module 550 does not receive the incoming call signal, it is determined that no incoming call is received at the information terminal 105.

At this time, if it is determined that an incoming call is not received at the information terminal 105 (NO in step ST01), determination on whether an incoming call is received at the information terminal 105 or not continues until the control module 550 receives an incoming call signal. If it is determined that an incoming call is received at the information terminal 105 (YES in step ST01), the user is notified of the incoming call by displaying an icon indicating the presence of the incoming call at the information terminal 105 or information on a partner of the incoming call, and call receiving functions are allocated to all the four switches (the multi-function switch 71A, the power supply switch 71B, the plus switch 71C, and the minus switch 71D) of the operation unit 530 (step ST02).

Thereafter, it is determined whether any one of the four switches 71A, 71B, 71C, and 71D is operated or not (step ST03). Specifically, if the control module 550 receives an operation signal from the signal processing circuit 730 of the operation unit 530, it is determined that a switch operation is performed on the operation unit 530, whereas if the control module 550 does not receive a control signal from the signal processing circuit 730 of the operation unit 530, it is determined that no switch operation is performed on the operation unit 530.

At this time, if it is determined that no switch operation is performed on the operation unit 530, that is, none of the switches 71A, 71B, 71C, and 71D is operated (NO in step ST03), it is determined whether the incoming call continues at the information terminal 105 or not (step ST04). Whether the incoming call continues at the information terminal 105 or not is determined by determining whether the control module 550 continues to receive the incoming call signal or not.

Here, if it is determined that the incoming call does not continue at the information terminal 105 (NO in step ST04), the process returns the first step of determining whether an incoming call is received at the information terminal 105 or not again (step ST01). If it is determined that the incoming call continues at the information terminal 105 (YES in step ST04), determination on whether the switch operation is present or not continues until one of the four switches 71A, 71B, 71C, and 71D is operated.

If it is determined that one of the four switches 71A, 71B, 71C, and 71D is operated (YES in step ST03), in the HUD device 300, the control module 550 transmits a control signal for receiving the call in response to the incoming call at the information terminal 105 through the wireless communication module 450. Based on the control signal, the information terminal 105 receives the call in response to the incoming call by the function of the link app 430, thus starting talking (step ST05).

After talking in response to the incoming call as described above, that is, during the call, the call end function of finishing the call is allocated to the multi-function switch 71A, and the main functions are allocated to the other switches, that is, the power supply switch 71B, the plus switch 71C, and the minus switch 71D and restored (step ST06).

Subsequently, it is determined whether the call is finished (end of call) or not (step ST07). The call is finished by user's operation on the multi-function switch 71A or a call end operation by a partner of the call as long as a communication state with the partner through an external network is normal. Here, if the control module 550 receives an operation signal by input operation on the multi-function switch 71A from the signal processing circuit 730 of the operation unit 530 or if an end call signal is received through the wireless communication module 450, it is determined that the call is finished, whereas if the control module 550 receives none of the operation signal and the end call signal, it is determined that the call is not finished.

At this time, if it is determined that the call is not finished and continues, (NO in step ST07), determination on whether the call is finished or not continues until it is determined that the call is finished. If it is determined that the call is finished (YES in step ST07), it is then determined whether a predetermined time (e.g., about two seconds to above five seconds) has elapsed from the end of the call (step ST08).

If it is determined that the predetermined time has not elapsed after the end of the call (NO in step ST08), the determination on whether the predetermined time has elapsed from the end of the call continues until the predetermined time has elapsed from the end of the call. If it is determined that the predetermined time has elapsed from the end of the call (YES in step ST08), the main function (display mode switching function) is allocated to the function of the multi-function switch 71A and restored (step ST09). Thereafter, return is performed. In this manner, an incoming call is made by the calling function of the HUD device 300.

If an incoming call is received at the information terminal 105, since the call receiving function is allocated to each of the multi-function switch 71A, the power supply switch 71B, the plus switch 71C, and the minus switch 71D included in the operation unit 530, a call can be made in response to the incoming call by operating one of the switches.

In addition, switching can be performed between the display mode in which a display image representing predetermined information is displayed and the non-display mode in which the display image is not displayed depending on display setting in the information terminal 105, and thus, the non-display mode is selected when display of the display image is not needed. Accordingly, power consumption for operating the HUD device 300 can be reduced.

Furthermore even while the HUD device 300 is in the non-display mode, the display image representing predetermined information is temporarily displayed by the display module 590 by performing a short pressing operation on the multi-function switch 71A. Thus, switching operation between the display mode and the non-display mode can be omitted, and the display image can be temporarily displayed when necessary. In this manner, the user will not forget to erase display of a display image. The temporary display of a display image by the short pressing operation on the multi-function switch 71A is utilized so that consumption of electric power for operating the HUD device 300 can be thereby reduced.

For example, in the fifth embodiment, the HUD device 300 notifies the user of an incoming call at the information terminal 105 by display of a display image. The technique disclosed here is, however, not limited to this example. The use may be notified of arrival of an incoming call at the information terminal 105 by sound by, for example, outputting incoming sound from the speaker 670, or by vibrations of a small-size vibrator incorporated in the helmet 20.

The number of switches included in the operation unit 53 may be three or less as long as the number of switches is two or more, or may be five or more. In the configuration of the HUD device 300 described as an example in the fifth embodiment, the projection module 470 projects display light to the combiner 890 provided as a projection target different from the shield 22 of the helmet 20. The technique disclosed here is, however, not limited to this example. The HUD device 300 may display a display image by display light as a virtual image with the display image superimposed onto scenery in a forward field of view through the shield 22 of the helmet 20 by using the shield 22 as a projection target instead of the combiner 890 and projecting display light to the shield 22 from the projection module 470.

Sixth Embodiment

Figure 21:
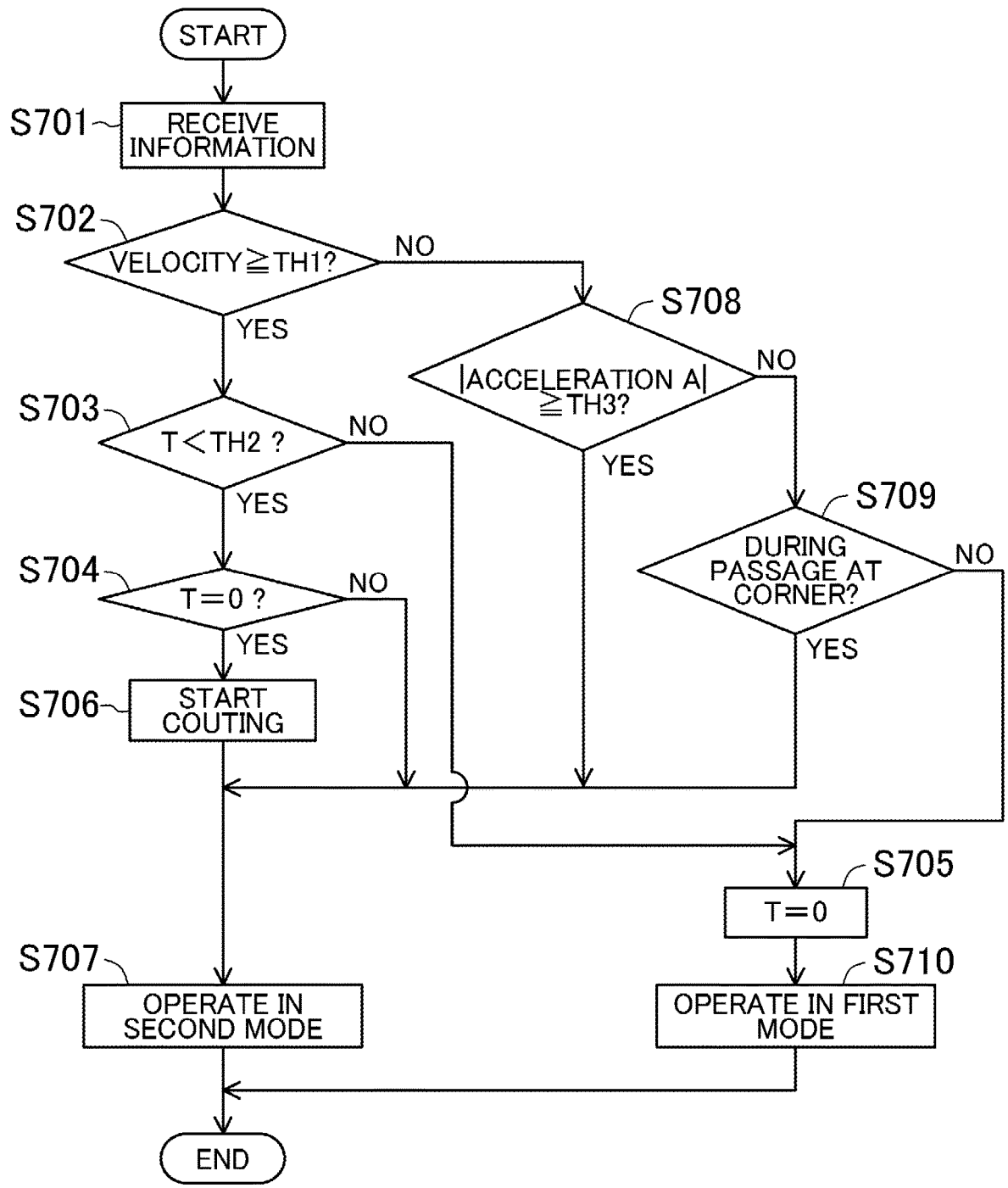
FIG. 21 is a flowchart depicting an example operation of a display light emitting device according to a sixth embodiment.

FIG. 21 shows control according to a sixth embodiment of the present disclosure. The sixth embodiment is different from the first embodiment in that if it is determined that a predetermined information deletion condition is not satisfied, an operation is performed in a first mode in which an image representing first information and second information is generated as a display image, whereas if it is determined that the information deletion condition is satisfied, an operation is performed in a second mode in which an image representing the first information but not representing the second information is generated as a display image. In the following description, components already described in the first embodiment are denoted by the same reference characters, and only different components will be described in detail.

Figure 22:
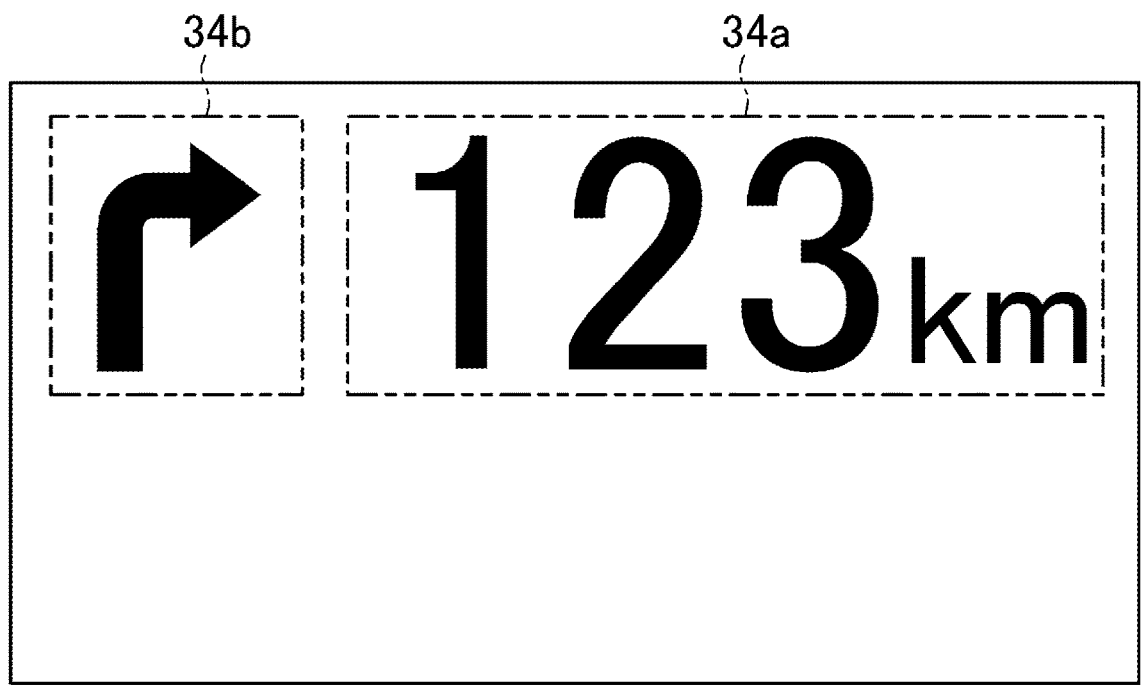
FIG. 22 illustrates an example image displayed in a second mode according to the sixth embodiment.

Based on guide information received by a Bluetooth module 31, an image output section 32 generates a display image representing, for example, a distance to a guide point. The image output section 32 is operable in the first and second modes. In the first mode, the image output section 32 generates, as a display image, an image representing a distance 33a indicated by guide information and a traveling direction 33b indicated by guide information as first information, and representing an icon indicating that a time shown at the right is an estimated arrival time to a guide point and an estimated arrival time 33c to the guide point as second information. On the other hand, in the second mode, as illustrated in FIG. 22, the image output section 32 generates, as a display image, an image representing the distance 33a indicated by guide information and the traveling direction 33b indicated by guide information but not representing none of an icon and an estimated arrival time 33d.

After start-up, while wireless communication to a smartphone 10 by the Bluetooth module 31 is connected, the display light emitting device 30 repeatedly performs an operation depicted by the flowchart in FIG. 21 every when the Bluetooth module 31 receives new information from the smartphone 10. At the start-up of the display light emitting device 30, a value of T indicating an elapsed time from the start of an operation in the second mode is initialized to zero.

In the operation depicted by FIG. 21, first, in step S701, the Bluetooth module 31 receives guide information, velocity information, and acceleration information transmitted from the smartphone 10, and the process proceeds to step S702. The acceleration information can be acquired based on an output value of a known acceleration sensor (not shown) that detects accelerations in XYZ-axis directions and is incorporated in the smartphone 10. The smartphone 10 also includes a gyro sensor (not shown) that detects an angular velocity of rotation of the smartphone 10.

In step S702, a microcomputer 32a of the image output section 32 acquires velocity information received by the Bluetooth module 31 in step S701, and determines whether a condition that a velocity V indicated by the velocity information is greater than or equal to a predetermined threshold TH1 is established or not. If the condition that the velocity V is greater than or equal to the threshold TH1 is established, the process proceeds to step S703, whereas if the condition that the velocity V is greater than or equal to the threshold TH1 is not established, the process proceeds to step S708. The threshold TH1 can be set at, for example, 20 km per hour, but may be set at a value other than 20 km per hour.

In step S703, the microcomputer 32a of the image output section 32 compares an elapsed time T from the start of operation in the second mode with a predetermined time TH2 to thereby determine whether a condition that the operation in the second mode continues for the predetermined time TH2 is established or not. If the elapsed time T is shorter than the predetermined time TH2, that is, the operation in the second mode does not continue for the predetermined time TH2, the process proceeds to step S704. If the elapsed time T is greater than or equal to the predetermined time TH2, that is, the operation in the second mode continues for the predetermined time TH2, the process proceeds to step S705.

In step S704, the microcomputer 32a of the image output section 32 determines whether the elapsed time T from the start of operation in the second mode is zero or not. If the elapsed time T from the start of operation in the second mode is zero, the process proceeds to step S706, whereas if the elapsed time T from the start of operation in the second mode is not zero, the process proceeds to step S707.

In step S705, the microcomputer 32a of the image output section 32 initializes the elapsed time T from the start of operation in the second mode to zero, and the process proceeds to step S710.

In step S706, the microcomputer 32a of the image output section 32 starts counting (count-up) of the elapsed time T, and the process proceeds to step S707. Subsequently, the value of the elapsed time T increases with time.

In step S707, the image output section 32 operates in the second mode. That is, a GDC 32c of the image output section 32 generates, as a display image, an image representing the distance 33a indicated by guide information and the traveling direction 33b indicated by guide information and not representing any of an icon and the estimated arrival time 33c, in response to an instruction of the microcomputer 32a.

In step S708, the microcomputer 32a of the image output section 32 determines whether an acceleration/deceleration condition that an absolute value of an acceleration A indicated by acceleration information received by the Bluetooth module 31 in step S701 is greater than or equal to a predetermined threshold TH3 is established or not. If the absolute value of the acceleration A is greater than or equal to the predetermined threshold TH3, that is, the acceleration/deceleration condition is established, the process proceeds to step S707, whereas the absolute value of the acceleration A is less than the predetermined threshold TH3, that is, the acceleration/deceleration condition is not established, the process proceeds to step S709.

In step S709, the microcomputer 32a of the image output section 32 determines whether a traveling direction condition that a user is passing at a corner point is established or not, based on a condition that a traveling direction indicated by the guide information received by the Bluetooth module 31 in step S701 is a right turn or a left turn and whether a distance indicated by the guide information is less than or equal to a predetermined comparison value or not. The comparison value is set at, for example, 10 m, but may be set at a value other than 10 m.

If the traveling direction indicated by the guide information is a right turn or a left turn, the guide point is a corner point, and thus, the distance indicated by the guide information is a distance between the current position and the corner point. If the traveling direction indicated by the guide information is a right turn or a left turn and the distance indicated by the guide information is less than or equal to the comparison value, it is determined that the traveling direction condition is established, and the process proceeds to step S707, whereas if the traveling direction indicated by the guide information is neither a right turn nor a left turn and the distance indicated by the guide information exceeds the comparison value, it is determined that the traveling direction condition is not established, and the process proceeds to step S705.

In step S710, the image output section 32 operates in the first mode. That is, the GDC 32c of the image output section 32 generates, as a display image, an image representing the distance 33a indicated by guidance information and the traveling direction 33b indicated by guidance information, and representing an icon indicating that a time shown at the right is an estimated arrival time to a destination and the estimated arrival time 33c to a destination, in response to an instruction of the microcomputer 32a.

Thus, in this embodiment, since the image output section 32 can be operated in the mode in which the display image does not represent any of the icon and the estimated arrival time 33c, the helmet wearer is less likely to feel annoyed by a display image, as compared to a case where the distance 33a, the traveling direction 33b, the icon, and the estimated arrival time 33c are always shown in the display image.

In addition, information represented in the display image can be reduced as compared to a situation where the user wearing the helmet is traveling straight at a constant velocity less than the threshold TH1 during traveling at a velocity of a predetermined threshold or more, acceleration/deceleration, or passage at a corner point. Thus, the helmet wearer is less likely to be hindered by the display image or to feel annoyed by the display image in seeing outside scenery.

In addition, the helmet wearer is capable of checking the icon and the estimated arrival time 33c in a generally relatively safe state, such as a straight-traveling state at a constant velocity less than a predetermined threshold or a stationary state.

Furthermore, since the Bluetooth module 31 of the helmet 20 receives velocity information from the smartphone 10, the helmet 20 does not need to be equipped with a velocity sensor for acquiring velocity information. Thus, as compared to the case of providing the helmet 20 with a velocity sensor, manufacturing costs of the helmet 20 can be reduced.

Since it is determined whether the user is passing by a corner point or not by using guide information received from the smartphone 10 by the Bluetooth module 31 of the helmet 20, the helmet 20 does not need to be provided with a gyro sensor in order to determine whether the user is passing by a corner or not. As a result, manufacturing costs of the helmet 20 can be reduced.

In addition, since the Bluetooth module 31 of the helmet 20 receives acceleration information from the smartphone 10, the helmet 20 does not need to be provided with an acceleration sensor to acquire an acceleration. As a result, manufacturing costs of the helmet 20 can be reduced, as compared to a case where the helmet 20 is provided with an acceleration sensor.

Even if the velocity V is greater than or equal to the threshold TH1, as long as the elapsed time T from the start of operation in the second mode is greater than or equal to the predetermined time TH2, the image output section 32 operates in the first mode. Thus, if traveling at a velocity of the threshold TH1 or more continues for a long time, the helmet wearer can check the icon and the estimated arrival time 33c at every predetermined time.

In the embodiment describe above, in step S709, determination on whether the traveling direction condition is established or not is performed based on the guide information, but may be performed based on angular velocity information indicating an angular velocity (detection result) detected by a gyro sensor of the smartphone 10. That is, the microcomputer 32a of the image output section 32 may perform determination based on angular velocity information received by the Bluetooth module 31 of the helmet 20 by transmitting the angular velocity information from the wireless communication interface 11 of the smartphone 10 through wireless communication and causing the Bluetooth module 31 to receive the transmitted angular velocity information.

In the sixth embodiment, the condition for operating the image output section 32 in the second mode (information deletion condition) is established if at least one of the condition that the velocity V is greater than or equal to the threshold TH1 and the elapsed time T from the start of operation in the second mode is shorter than the predetermined time TH2 (velocity condition), the acceleration/deceleration condition, or the traveling direction condition is established, but may be other conditions.

In the sixth embodiment, the first information is the distance 33a indicated by the guide information and the traveling direction 33b indicated by the guide information, and the second information is the icon indicating that the time shown at the right is an estimated arrival time to a guide point and the estimated arrival time 33c to a guide point, but may be other information. For example, the first and second information may include information other than the information included in the first and second information in the embodiment described above, such as a current time, a distance to a destination, a traveling lane, and/or a name of an intersection at a guide point.

Seventh Embodiment

Figure 23:
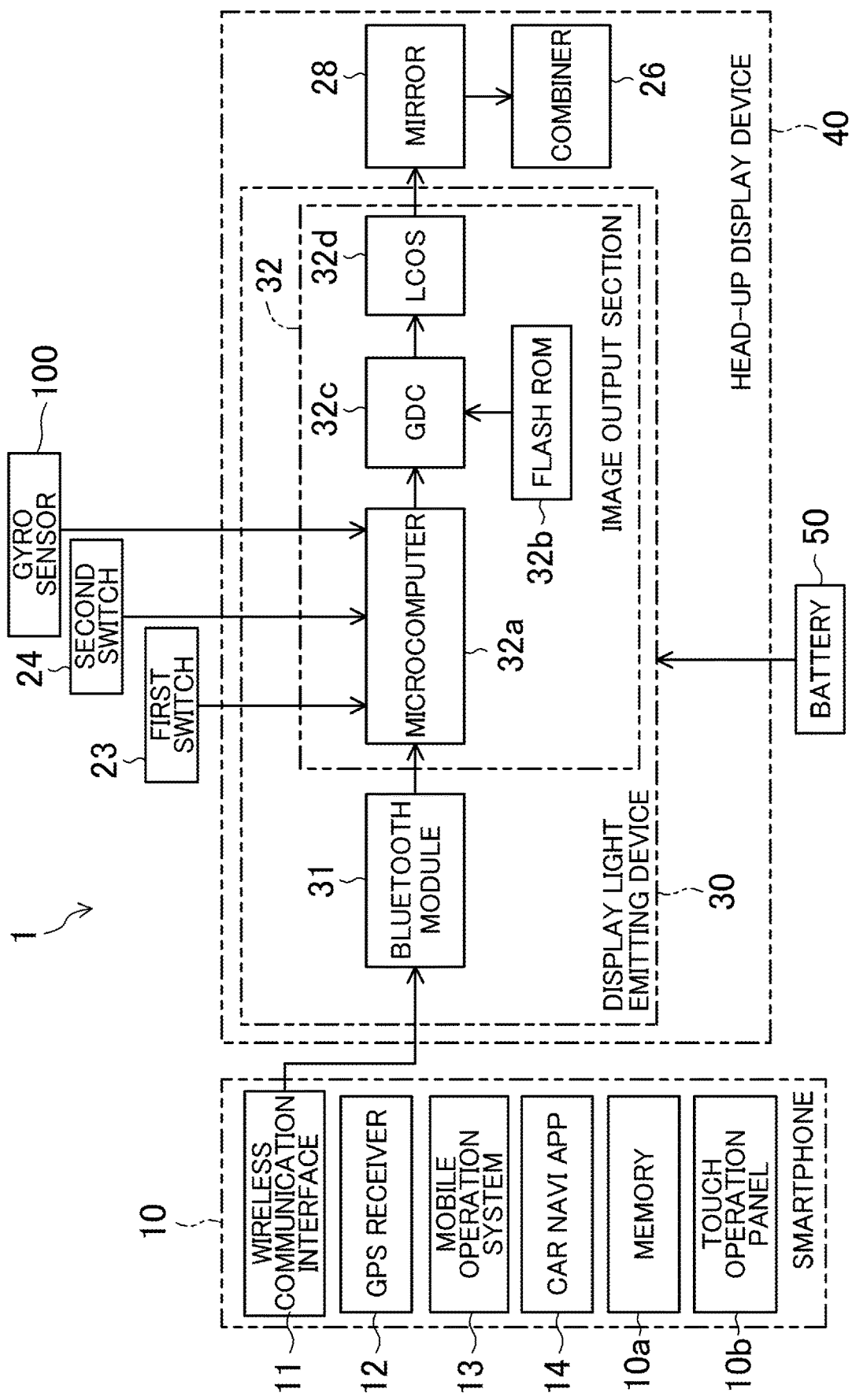
FIG. 23 is a view for a seventh embodiment and corresponds to FIG. 2.

FIG. 23 illustrates a seventh embodiment of the present disclosure. The seventh embodiment is different from the first embodiment in that a displacement process of displacing a display position of a display image when rotation of a helmet is detected. In the following description, components already described in the first embodiment are denoted by the same reference characters, and only different components will be described in detail.

A display light emitting device 30 includes a gyro sensor 100, as illustrated in FIG. 23. The display light emitting device 30 is configured to be started by pressing and holding a first switch 23. The gyro sensor 100 detects an angular velocity of rotation in the left-right direction when seen from a wearer of a helmet 20.

Based on the angular velocity detected by the gyro sensor 100, a microcomputer 32a detects rotation in the left-right direction when seen from the wearer of the helmet 20, and calculates an angle of the detected rotation. The gyro sensor 100 and the microcomputer 32a constitute a detector.

A GDC 30c generates a guide image I as illustrated in FIG. 24, based on guide information and velocity information received by a Bluetooth module 31 and a detection result and a calculation result of the rotation angle of the helmet 20. The guide image I will be described later in detail. While the microcomputer 32a does not detect rotation, the GDC 30c controls an LCOS 32d such that a display position of the guide image I is at a steady position P (see FIG. 25) at which the display image I is visually recognizable by the helmet wearer. The steady position P is located in front of the right eye of the helmet wearer, and even when the helmet 20 moves, a relative position of the steady position P to the helmet 20 is constant. On the other hand, when the microcomputer 32a detects rotation in one of the left direction or the right direction when seen from the wearer of the helmet 20, the LCOS 32d is controlled such that the display position of the guide image I is rotated from the steady position P by the calculated angle in a direction (in the other one of the left direction or the right direction) opposite to the direction of the rotation detected by the microcomputer 32a. If rotation of the other one of the left direction or the right direction when seen from the wearer of the helmet 20 is detected after the display position of the guide image I is rotated from the steady position P by a combiner 26, the LCOS 32d is controlled such that the display position of the guide image I returns to the steady position P. When the first switch 23 is pressed shortly, the microcomputer 32a forcibly stops emission of display light by the LCOS 32d. These functions are implemented by the microcomputer 32a.

A flash ROM 32b stores characters and patterns displayed in the guide image I described later. Based on an instruction of the microcomputer 32a, the GDC 32c generates a guide image I as illustrated in FIG. 24 by combining characters and patterns stored in the flash ROM 32b. The guide image I represents a distance to a guide point, a traveling direction at the guide point, and an estimated time of arrival at a guide point.

Figure 24A:
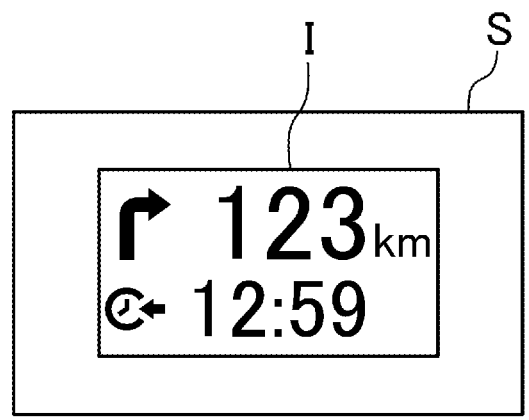
FIG. 24A illustrates a display screen by display light emitted by a LCOS in a case where a display position of a guide image is a steady position.
Figure 24B:
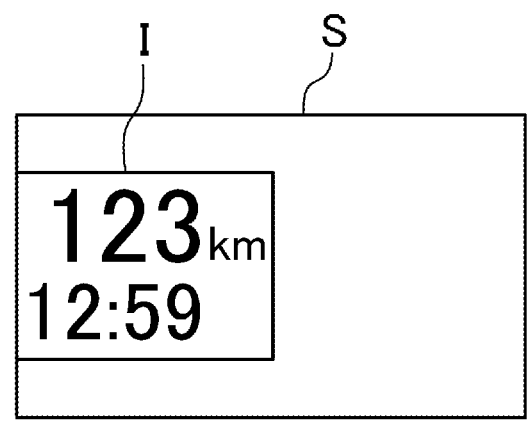
FIG. 24B illustrates an example of a display screen by display light emitted by the LCOS in a case where a displacement process of rotating a display position of a guide image to the left.

The LCOS 32d emits display light for causing the combiner 26 to display the guide image I generated by the GDC 32c. If the microcomputer 32a detects rotation of the head of the helmet wearer in the left direction or the right direction, by control of the microcomputer 32a, a displacement process of emitting display light is performed such that the display position of the guide image I displayed by the LCOS 32d is rotated from the steady position P by a calculated angle to a direction opposite to the direction of the detected rotation. If rotation of the head of the helmet wearer in the left direction or the right direction is detected, display light for causing the combiner 26 to display a guide image I after the displacement process is emitted. FIG. 24A illustrates a display screen S by display light emitted by the LCOS 32d in a case where the display position of the guide image I is the steady position P. FIG. 24B illustrates an example of the display screen S by display light emitted by the LCOS 32d in a case where the displacement process of rotating the display position of the guide image to the left direction is performed.

When the display light emitting device 30 is actuated, guide information and velocity information are received by the Bluetooth module 31 of the display light emitting device 30 by execution of the car navi app 14 of the smartphone 10. Based on the guide information and the velocity information, the guide image I is generated by the GDC 32c, and display light in accordance with the guide image I is emitted from the LCOS 32d, reflected on a mirror 28, and then projected to the combiner 26.

Figure 25A:
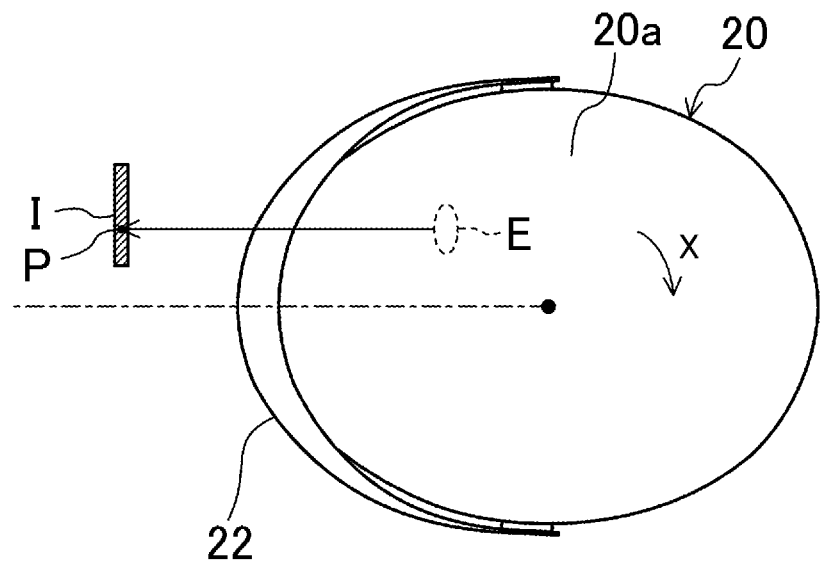
FIG. 25A is a plan view of a helmet while a display position of a guide image is in a steady position.
Figure 25B:
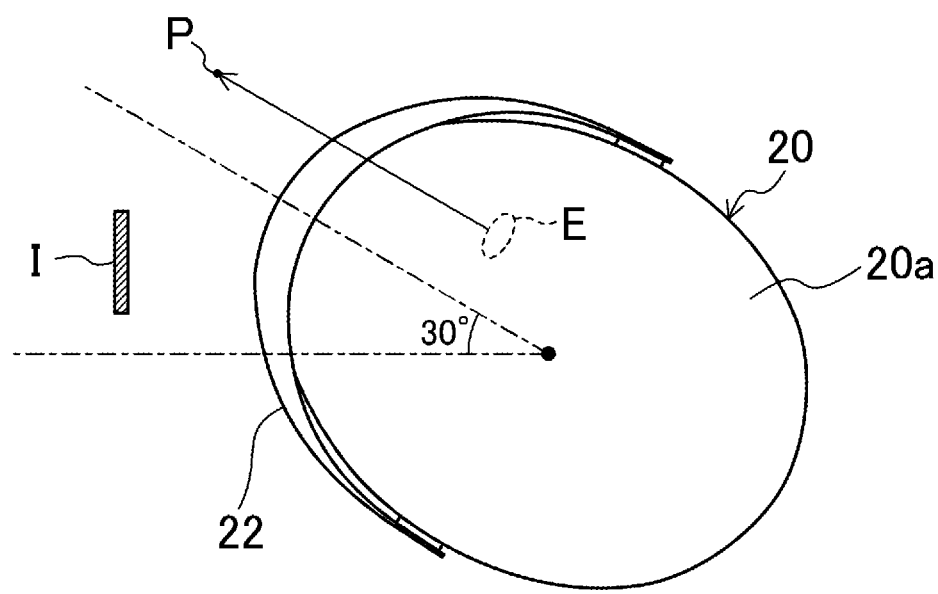
FIG. 25B is a view corresponding to FIG. 25A and illustrates a state where a helmet wearer rotates his/her head by 30 degrees to the right from the state of FIG. 25A.

As illustrated in FIG. 25A, when the helmet wearer rotates the head to the right direction (in the direction indicated by arrow X in the drawing) when seen from the helmet wearer for checking from a state where the display position of the guide image I is the steady position P and a view point of the helmet wearer is at the steady position P, the gyro sensor 100 detects an angular velocity of rotation of the helmet 20, and based on the angular velocity detected by the gyro sensor 100, the microcomputer 32a detects rotation to the right direction when seen from the wearer of the helmet 20, and acquires 30 degrees as the detected rotation angle. As illustrated in FIG. 25B, the LCOS 32d rotates the display position of the guide image I from the steady position P to the left direction when seen from the helmet wearer by 30 degrees. Accordingly, the guide image I displayed by the combiner 26 moves away from the steady position P after rotation, that is, a view point of the helmet wearer after rotation. Thus, the helmet wearer is less likely to be hindered by the guide image I in seeding outside scenery. In addition, the guide image I does not move relative to outside scenery by rotation of the helmet 20, and thus, the helmet wearer feels as if the guide image I were a part of the outside scenery, and can easily see the outside scenery.

As a variation of the seventh embodiment, the gyro sensor 100 may be replaced by a tilt sensor (not shown) as a detector that detects a tilt in the left-right direction when seen from the wearer of the helmet 20 and acquires an angle of the detected tilt. If the tilt sensor does not detect a tilt, the microcomputer 32a controls the GDC 32c such that the display position of the guide image I is the steady position P at which the guide image I is visually recognizable by the helmet wearer. Here, the steady position P is a position in front of the right eye of the helmet wearer and a position at which v can be visually recognized by the helmet wearer without a tilt. Even when the helmet 20 moves, the relative position of the steady position P to the helmet 20 is constant. On the other hand, if the tilt sensor detects a tilt in one of the left direction or the right direction when seen from the wearer of the helmet 20, the microcomputer 32a controls the GDC 32c such that the display position of the guide image I tilts from the steady position P by an angle detected by the tilt sensor to a direction (the other of the left direction or the right direction) opposite to the direction of the tilt detected by the tilt sensor. If the tilt sensor does not detect a tilt any more with the guide image I tilted from the steady position P, that is, the tilt angle acquired by the tilt sensor becomes zero, the microcomputer 32a controls the GDC 32c such that the display position of the guide image I returns to the steady position P. Thus, if the tilt sensor detects a tilt in one of the left direction or the right direction when seen from the wearer of the helmet 20, the GDC 32c performs the displacement process of tilting the display position of the guide image I from the steady position P by an angle detected by the tilt sensor in a direction (the other of the left direction or the right direction) opposite to the direction of the tilt detected by the tilt sensor.

Figure 26A:
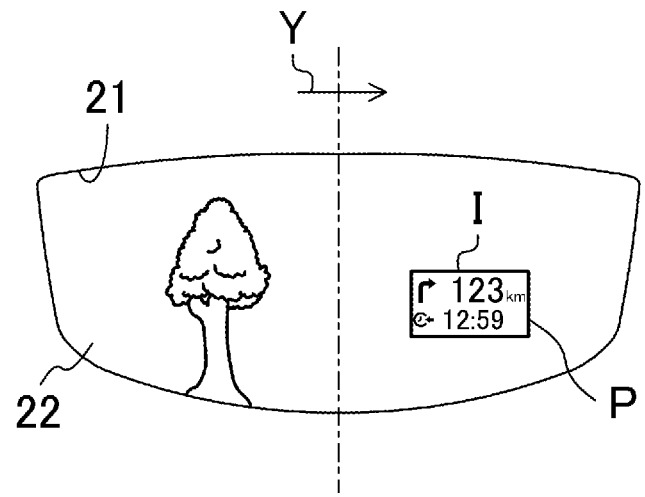
FIG. 26A is a view seen through a window opening from the inside and illustrates a state where a helmet wearer stands his/her upper body straight and a display position of a guide image is in a steady position.
Figure 26B:
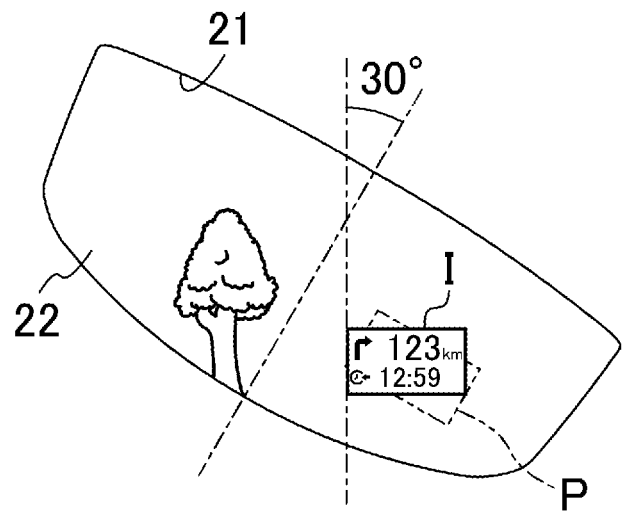
FIG. 26B is a view corresponding to FIG. 26A and illustrates a state where the helmet wearer tilts his/her head by 30 degrees to the right from the state of FIG. 26A.

FIG. 26A illustrates a state where a helmet wearer riding on, for example, a two-wheeled vehicle with his/her upper body straight (along the vertical direction) and the display position of the guide image I is at the steady position P. From this state, when the helmet wearer tilts the entire body to the right when seen from the helmet wearer, the helmet 20 also tilts by 30 degrees to the right (direction indicated by arrow Y in the drawing) seen from the helmet wearer, and the tilt sensor detects a tilt to the right when seen from the wearer of the helmet 20, and acquires 30 degrees as the detected tilt angle. Then, the GDC 32c generates, as a guide image I, an image in which the guide image I displayed at the steady position P is tilted by 30 degrees to the left when seen from the helmet wearer. Accordingly, as illustrated in FIG. 26B, the display position of the guide image I tilts by 30 degrees to the left from the steady position P when seen from the helmet wearer. As described above, the guide image I tilts and a relative tilt of the guide image I to scenery outside the helmet 20 does not occur. Thus, an incongruity sense caused by a tilt of the guide image I to the scenery outside the helmet 20 can be reduced, and the helmet wear easily see the outside scenery.

In the seventh embodiment, the gyro sensor 100 is used for detecting rotation in the left-right direction when seen from the wearer of the helmet 20. However, as well as the gyro sensor 100, another sensor such as a three-axis acceleration sensor may be used for detecting rotation in the left-right direction when seen from the wearer of the helmet 20.

In the seventh embodiment, the smartphone 10 may be further provided with a gyro sensor for detecting an angular velocity. Accordingly, the traveling direction of a two-wheeled vehicle can be detected with the smartphone 10 held in a bag or a case attached to the two-wheeled vehicle or a pocket of the helmet wearer, for example. If the helmet 20 does not rotate relative to the smartphone 10, the displacement process may not be performed. That is, based on an angular velocity of the smartphone 10, the microcomputer 32a detects rotation of the smartphone 10 and acquires an angle of the rotation, and if the rotation direction of rotation of the smartphone 10 is the same as the direction of rotation of the helmet 20 or if the rotation direction of the smartphone 10 and the rotation direction of the helmet 20 are the same and a rotation angle of the smartphone 10 and a rotation angle of the helmet 20 are equal, the displacement process may not be performed. Accordingly, while the helmet wearer faces in the traveling direction, rotation of the display position of the guide image I can be restricted.

In the seventh embodiment, the smartphone 10 may determine whether the current position is a corner or not based on map information and the current position by execution of the car navi app 14, and if the smartphone 10 determines that the current position is a corner, the microcomputer 32a assumes that the helmet 20 rotates left-right direction, and the displacement process may be performed. That is, the smartphone 10 may serve as a detector.

In the seventh embodiment, in a case where the display position of the guide image I by the combiner 26 is rotated from the steady position P and then rotation in the other one of the left direction or the right direction when seen from the wearer of the helmet 20 is detected by a computation unit 30b, the display position of the guide image I is returned to the steady position P. Alternatively, when a predetermined time has elapsed from rotation of the display position of the guide image I by the combiner 26 from the steady position P, the display position of the guide image I may be returned to the steady position P. In a case where the calculated rotation angle is greater than or equal to a predetermined angle, when rotation in the other one of the left direction or the right direction when seen from the wearer of the helmet 20 is detected, the display position of the guide image I may be returned to the steady position P, whereas if the calculated rotation angle is less than the predetermined angle, the display position of the guide image I may be returned to the steady position P after a lapse of a predetermined time. In this manner, it is possible to prevent or reduce continuation of a state where only a part of the guide image I is seen by the helmet wearer.

In a variation of the seventh embodiment, the tilt sensor provided on the helmet 20 detects a tilt of the helmet 20. Alternatively, the smartphone 10 may be configured such that it is determine whether the current position is a corner or not based on map information and the current position by execution of the car navi app 14, and only if the current position is the corner and the tilt sensor detects a tilt in one of the left direction or the right direction when seen from the wearer of the helmet 20, the displacement process is performed. Accordingly, in the case where the current position is not a corner, it is possible to prevent or reduce execution of the displacement process by tilting the neck for purposes irrelevant to driving, such as a neck flexing exercise.

In the variation of the seventh embodiment, the display light emitting device 30 may further include the gyro sensor 100 to provide the function of rotating the display position of the guide image I from the steady position P by a calculated angle in a direction opposite to the direction of the detected rotation, as described in the seventh embodiment.

What is claimed is:

1. A display light emitting device comprising:
an information acquirer configured to acquire distance information and direction information, the distance information indicating a distance from a current position to a predetermined guide point, the distance information indicating a traveling direction at the guide point; and
an image output section configured to generate a guide image representing a traveling direction at the guide point and to emit display light for causing a combiner provided on a helmet to display the guide image, based on the direction information acquired by the information acquirer, wherein
the image output section is configured such that if it is determined that the distance from the current position to the guide point is less than a predetermined distance based on the distance information acquired by the information acquirer, the image output section repeatedly performs a normal output process of emitting display light for displaying the guide image and a stop process of stopping emission of display light, and when a priority display request for the guide image is detected, the image output section continuously performs a priority output process of emitting display light for displaying the guide image prior to the stop process, and
the image output section is configured such that when the priority output process is performed, interval estimation of estimating an interval from end of the priority output process to start of the normal output process performed after the priority output process is performed, and if the interval obtained by the interval estimation is less than a predetermined value, the image output section continuously performs the priority output process until the normal output process starts.

2. The display light emitting device according to claim 1, wherein
the image output section is configured to perform the interval estimation based on the distance information acquired by the information acquirer.

3. The display light emitting device according to claim 1, wherein
the image output section is configured to detect a display operation of a guide image performed by a ser as a priority display request for the guide image.

4. The display light emitting device according to claim 1, wherein
the information acquirer is connected to a cellular phone and is configured to acquire a state of the cellular phone, and
the image output section is configured to detect that the information acquirer acquires an incoming call state of the cellular phone as a priority display request for the guide image, and the guide image represents information indicating an incoming call state.

5. A display light emitting device comprising:
an information acquirer configured to acquire distance information and direction information, the distance information indicating a distance from a current position to a predetermined guide point, the distance information indicating a traveling direction at the guide point; and
an image output section configured to generate a guide image representing a traveling direction at the guide point and to emit display light for causing a combiner provided on a helmet to display the guide image, based on the direction information acquired by the information acquirer, wherein
the image output section is configured such that if it is determined that the distance from the current position to the guide point is less than a predetermined distance based on the distance information acquired by the information acquirer, the image output section repeatedly performs a normal output process of emitting display light for displaying the guide image and a stop process of stopping emission of display light, and when a priority display request for the guide image is detected, the image output section continuously performs a priority output process of emitting display light for displaying the guide image prior to the stop process, and
the image output section is configured such that when the priority output process is performed, interval estimation of estimating an interval from end of the priority output process to start of the normal output process performed after the priority output process is performed, and if the interval obtained by the interval estimation is less than a predetermined value, the image output section inhibits the normal output process.

6. A display light emitting device comprising:
an information acquirer configured to acquire distance information, direction information, and velocity information, the distance information indicating a distance from a current position to a predetermined guide point, the direction information indicating a traveling direction at the guide point, the velocity information indicating a moving velocity from the current position to the predetermined guide point; and
an image output section configured to generate a guide image representing a traveling direction at the guide point and to emit display light for causing a combiner provided on a helmet to display the guide image, based on the direction information received by the information acquirer, wherein
the image output section is configured to perform distance determination on whether the distance indicated by the distance information acquired by the information acquirer is less than a first predetermined distance or not and velocity determination on whether the moving velocity indicated by the velocity information acquired by the information acquirer is greater than or equal to a predetermined velocity or not, and
the image output section is configured such that if the distance is determined to be less than the first predetermined distance in the distance determination and the moving velocity is determined to be greater than or equal to the predetermined velocity in the velocity determination, the image output section performs continuous output of continuously emitting display light for displaying the guide image, whereas if the distance is determined to be less than the first predetermined distance in the distance determination and the moving velocity is determined to be less than the predetermined velocity in the velocity determination, the image output section emits display light for displaying the guide image for a predetermined time and then performs a stop process of stopping emission of the display light.

7. The display light emitting device according to claim 6, wherein
the image output section is configured to determine whether the distance indicated by the distance information acquired by the information acquirer is less than a second predetermined distance shorter than the first predetermined distance, and if the distance indicated by the distance information is determined to be less than the second predetermined distance, the image output section performs continuous output of continuously outputting display light for displaying the guide image.

8. The display light emitting device according to claim 6, wherein
the image output section is configured to continuously emit display light for displaying the guide image until a user wearing the helmet reaches the guide point, if the distance indicated by the distance information is determined to be less than the first predetermined distance in the distance determination and the moving velocity is determined to be greater than or equal to the predetermined velocity in the velocity determination.

9. The display light emitting device according to claim 8, wherein
the image output section is configured such that if the distance indicated by the distance information is determined to be greater than or equal to the first predetermined distance in the distance determination, the image output section does not perform the velocity determination and emits display light for displaying the guide image for a predetermined time and then performs a stop process of stopping emission of the display light.

10. The display light emitting device according to claim 6, wherein
the image output section is configured to continuously emit display light for displaying the guide image until a user wearing the helmet reaches the guide point, if the distance indicated by the distance information is determined to be less than the first predetermined distance in the distance determination and the moving velocity is determined to be greater than or equal to the predetermined velocity in the velocity determination, and then the moving velocity indicated by the velocity information acquired by the information acquirer decreases to be less than the predetermined velocity.

11. A display light emitting device for a motorcycle, the display light emitting device comprising:
an information acquirer configured to acquire information indicating a traveling direction at a guide point on a previously set path; and
an image output section configured to perform an image output process before a user wearing a helmet reaches the guide point, the image output process being a process in which the image output section generates a guide image representing a traveling direction indicated by the information acquired by the information acquirer and emits display light for causing a combiner provided on the helmet to display the guide, wherein
the information acquirer is configured to acquire first information and second information, the first information indicating a traveling direction at a first guide point closest to a current position, the second information indicating a traveling direction at a second guide point the user is to reach next after the first guide point, and
the image output section is configured to perform interval estimation of estimating an interval between the first guide point and the second guide point, and if the interval obtained by the interval estimation is less than or equal to a predetermined value, the image output section generates, as the guide image, a plurality of display images representing a first arrow indicating the traveling direction at the first guide point and a second arrow indicating the traveling direction at the second guide point, without displaying a position of the motorcycle, a map, and an enlarged view of an intersection.

12. The display light emitting device according to claim 11, wherein
the information acquirer is configured to acquire inter-guide point distance information indicating a distance between the first guide point and the second guide point, and
the image output section is configured to perform interval estimation of estimating an interval between the first guide point and the second guide point based on the distance indicated by the inter-guide point distance information acquired by the information acquirer.

13. The display light emitting device according to claim 11, wherein
the information acquirer is configured to acquire inter-current position distance information indicating a distance from the current position to the first guide point, and
the image output section is configured to determine whether the distance indicated by the inter-current position distance information acquired by the information acquirer is less than a predetermined distance or not, and if the distance indicated by the inter-current position distance is determined to be greater than or equal to the predetermined distance, the image output section does not display the second arrow.

14. The display light emitting device according to claim 13, wherein
the image output section is configured to display the first arrow for a predetermined time if the distance indicated by the inter-current position distance information acquired by the information acquirer is determined to be greater than or equal to the predetermined distance.

15. The display light emitting device according to claim 14, wherein
the image output section is configured to continuously display the first arrow until a user wearing a helmet reaches the first guide point if the distance indicated by the inter-current position distance information acquired by the information acquirer is determined to be less than the predetermined distance.

16. The display light emitting device according to claim 15, wherein
the image output section is configured to continuously display the first arrow and the second arrow until the user wearing the helmet reaches the first guide point if the distance indicated by the inter-current position distance information acquired by the information acquirer is determined to be less than the predetermined distance and the interval obtained by the interval estimation is less than or equal to the predetermined value.

17. A display light emitting device for a motorcycle, the display light emitting device comprising:
an image generator configured to generate a display image; and
an emitter configured to emit display light for projecting the display image generated by the image generator onto a field of view of a helmet wearer, wherein
the image generator determines whether a predetermined information deletion condition is satisfied or not, and if it is determined that the information deletion condition is not satisfied, the image generator operates in a first mode of generating, as the display image, an image representing first information including a first arrow indicating a traveling direction at a first guide point closest to a current position and second information including a second arrow indicating a traveling direction at a second guide point the helmet wearer is to reach next after the first guide point, whereas if it is determined that the information deletion condition is satisfied, the image generator operates in a second mode of displaying an image representing the first information but not representing the second information as the display image, and
the information deletion condition includes a condition that a velocity of the motorcycle is greater than or equal to a threshold and that an elapsed time from start of an operation in the second mode is shorter than a predetermined time.

* * * * *